US012534307B2

(12) United States Patent
Gamboa et al.

(10) Patent No.: US 12,534,307 B2
(45) Date of Patent: Jan. 27, 2026

(54) FOOD DELIVERY SYSTEM FOR PACKAGING OF FOOD AND METHOD OF DELIVERING FOOD TO BE PACKAGED

(71) Applicant: Grupo Bimbo, S.A.B. de C.V., Mexico D.F. (MX)

(72) Inventors: Jose Antonio Contreras Gamboa, Fort Worth, TX (US); Gerald Edward Holt, St. Charles, MO (US); Pablo Rodriguez, Plymouth, IN (US)

(73) Assignee: Grupo Bimbo, S.A.B. de C.V., Santa Fe (MX)

( * ) Notice: Subject to any disclaimer, the term of this patent is extended or adjusted under 35 U.S.C. 154(b) by 144 days.

(21) Appl. No.: 18/639,552

(22) Filed: Apr. 18, 2024

(65) Prior Publication Data
US 2024/0351795 A1  Oct. 24, 2024

Related U.S. Application Data

(63) Continuation-in-part of application No. 18/303,794, filed on Apr. 20, 2023, now Pat. No. 12,258,158.

(51) Int. Cl.
  *B65G 43/08* (2006.01)
  *B65G 47/248* (2006.01)

(52) U.S. Cl.
  CPC .......... *B65G 43/08* (2013.01); *B65G 47/248* (2013.01); *B65G 2201/0202* (2013.01); *B65G 2203/0225* (2013.01); *B65G 2203/042* (2013.01)

(58) Field of Classification Search
  CPC .............. B65G 43/08; B65G 47/248; B65G 2201/0202; B65G 2203/0225; B65G 2203/042
  (Continued)

(56) References Cited

U.S. PATENT DOCUMENTS 5,630,496 A * 5/1997 Mims ............... B65G 47/252
                                                  198/374
6,471,044 B1  10/2002 Isaacs et al.
(Continued)

FOREIGN PATENT DOCUMENTS

CN   109533446 A   3/2019
CN   114926435 A   8/2022
(Continued)

OTHER PUBLICATIONS

Notification of the Transmittal of the International Search Report (1) page; International Search Report (4 pages); and the Written Opinion of the International Searching Authority (12 pages) out of corresponding PCT Application PCT/US2024/025173 (17 pages total); Date of Mailing: Oct. 18, 2024.
(Continued)

*Primary Examiner* — Gene O Crawford
*Assistant Examiner* — Lester Rushin, III
(74) *Attorney, Agent, or Firm* — Crowell & Moring LLP; John C. Freeman

(57) ABSTRACT

A delivery system that includes a surface having a surface upon which a food item is placed. An array of sensors positioned above the surface and which takes multiple readings of the food item on the surface. A processor that analyzes the multiple readings and generates a height profile for the food item and determines a characteristic of the food item based on the height profile, wherein the characteristic is selected from the group consisting of 1) whether the food item is right side up or upside down, 2) whether the food item is misoriented; 3) whether the food item is missing a portion of food; and 4) whether the food item is damaged.

16 Claims, 36 Drawing Sheets

(58) Field of Classification Search
USPC .......................................................... 198/373
See application file for complete search history.

(56) References Cited

U.S. PATENT DOCUMENTS

| | | | | |
|---|---|---|---|---|
| 7,450,247 | B2* | 11/2008 | Sandberg | G01B 11/245 |
| | | | | 250/559.22 |
| 9,014,434 | B2* | 4/2015 | Bajema | G06T 7/0004 |
| | | | | 382/110 |
| 12,258,158 | B2* | 3/2025 | Gamboa | B65B 57/20 |
| 2004/0151364 | A1 | 8/2004 | Kenneway et al. | |
| 2005/0099620 | A1 | 5/2005 | De La Ballina et al. | |
| 2006/0070927 | A1 | 4/2006 | Henry | |
| 2008/0251350 | A1 | 10/2008 | Alexander et al. | |
| 2010/0101191 | A1 | 4/2010 | Lindee | |
| 2011/0050880 | A1 | 3/2011 | Bourg, Jr. et al. | |
| 2016/0311628 | A1 | 10/2016 | Roehring et al. | |
| 2019/0000094 | A1 | 1/2019 | Hjalmarsson et al. | |
| 2019/0389665 | A1 | 12/2019 | Sherman et al. | |
| 2020/0055678 | A1 | 2/2020 | Shaw et al. | |
| 2020/0379427 | A1 | 12/2020 | Tao et al. | |
| 2021/0100256 | A1 | 4/2021 | Youngs et al. | |
| 2021/0321820 | A1 | 10/2021 | Hendershot et al. | |
| 2022/0118483 | A1 | 4/2022 | Kjaer | |
| 2022/0270269 | A1 | 8/2022 | Pattison et al. | |
| 2023/0148640 | A1 | 5/2023 | Takai et al. | |
| 2024/0013544 | A1* | 1/2024 | Walz | G16H 50/30 |
| 2024/0025650 | A1 | 1/2024 | Lawrence | |
| 2024/0053277 | A1 | 2/2024 | Ookita et al. | |

FOREIGN PATENT DOCUMENTS

| | | |
|---|---|---|
| EP | 4 202 765 A1 | 6/2023 |
| IT | TN 20090011 A1 | 3/2011 |

OTHER PUBLICATIONS

U.S. Appl. No. 19/005,320, filed Dec. 30, 2024, Gamboa et al..
U.S. Appl. No. 19/005,418, filed Dec. 30, 2024, Gamboa et al..
PCT/ISA/206 Invitation to Pay Additional Fees and, Where Applicable, Protest Fee (Date of Mailing: Jun. 25, 2024) out of corresponding PCT Application PCT/US2024/025173 (two pages).
U.S. Appl. No. 18/303,794, filed Apr. 20, 2023, Jose Antonio Contreras Gamboa et al..
PCT/IB/326 Notification Concerning Transmittal of International Preliminary Report on Patentability (Chapter 1 of the Patent Cooperation Treaty) (Date of Mailing: Oct. 30, 2025) and PCT/IB/373 International Report on Patentability (Date of Issuance: Oct. 16, 2025) out of PCT priority application PCT/US2024/025173 (14 total pages).

* cited by examiner

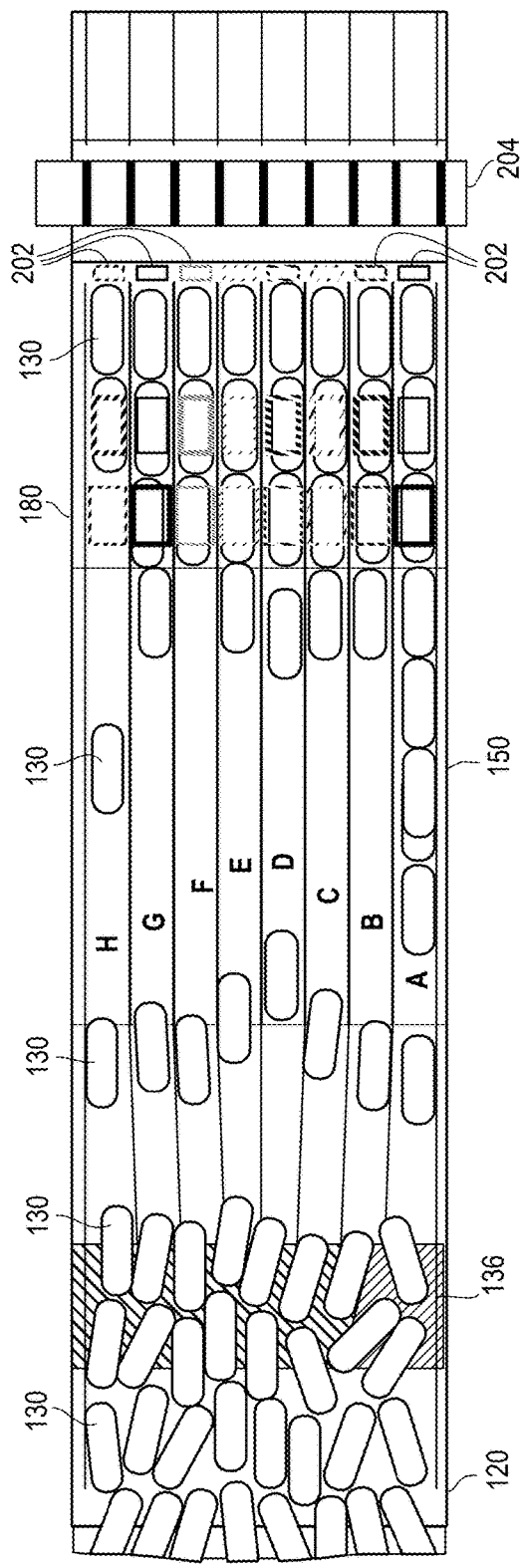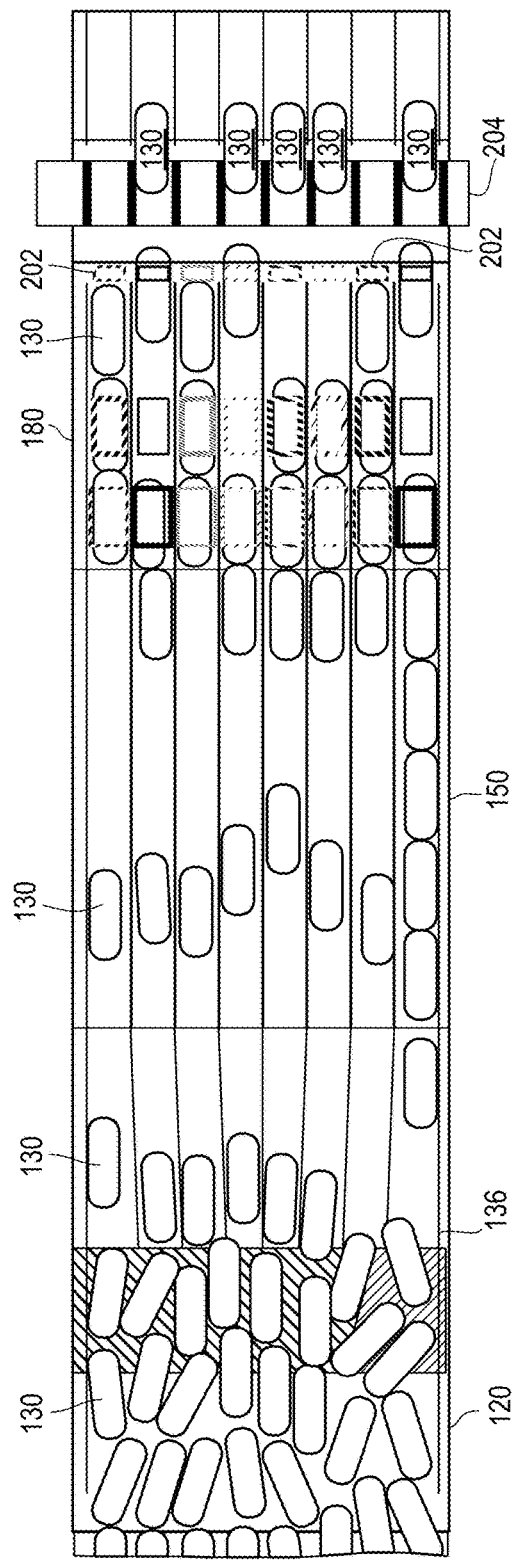

FIG. 5F
| GROUPS | LANES<br>1 2 3 4 5 6 7 8 | Comments |
|---|---|---|
| 1 | 9 7 7 5 7 7 7 7 | Initial Quantity of Buns in the Lanes of 150 |
| 1.B<br>1.A | 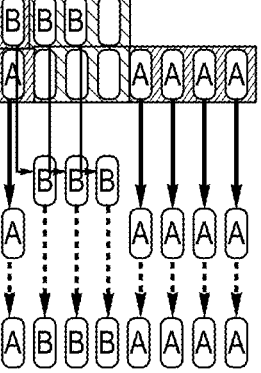 | |
| | | Balancer Station |
| 1.Result | | Onward to Next Step |
| 2 | 7 6 6 5 6 6 6 6 | Remaining Quantity in Lanes of 150 after Step 1 |
| 2.B<br>2.A | 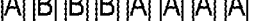 | |
| 2.Result | | Onward to Next Step |
| 3 | 5 5 5 5 5 5 5 5 | Resultant Quantity in the Lane of 150 |
| 3.B<br>3.A | 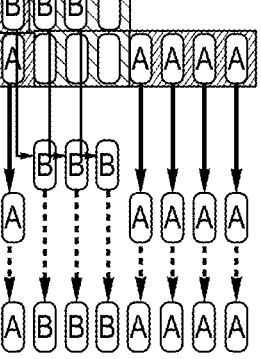 | |
| 3.Result | | To Bagger |

FIG. 5G

| 4 | 4 4 4 4 4 4 4 4 | Resultant Quantity in the Lane of 150 |
|---|---|---|
| 4.B<br>4.A<br><br><br>4.Result | | <br><br><br><br>To Bagger |
| 5 | 3 3 3 3 3 3 3 3 | Resultant Quantity in the Lane of 150 |
| 4.B<br>5.A<br><br><br>5.Result | | <br><br><br><br>To Bagger |
| 6 | 2 2 2 2 2 2 2 2 | Resultant Quantity in the Lane of 150 |
| 6.B<br>6.A<br><br><br>6.Result | | <br><br><br><br>To Bagger |
| 7 | 1 1 1 1 1 1 1 1 | Resultant Quantity in the Lane of 150 |
| 7.B<br>7.A<br><br><br>7.Result | | <br><br><br><br>To Bagger |

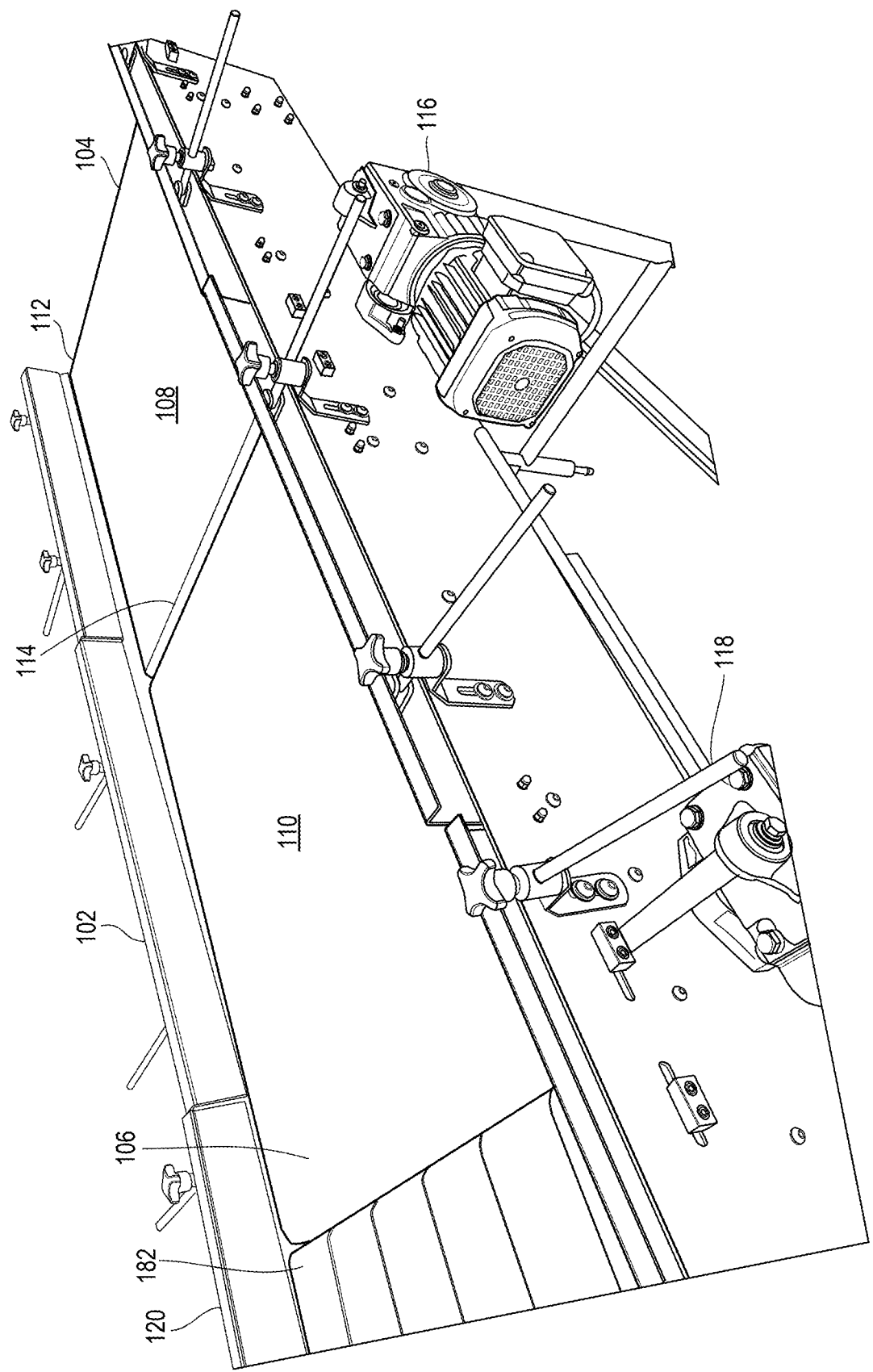

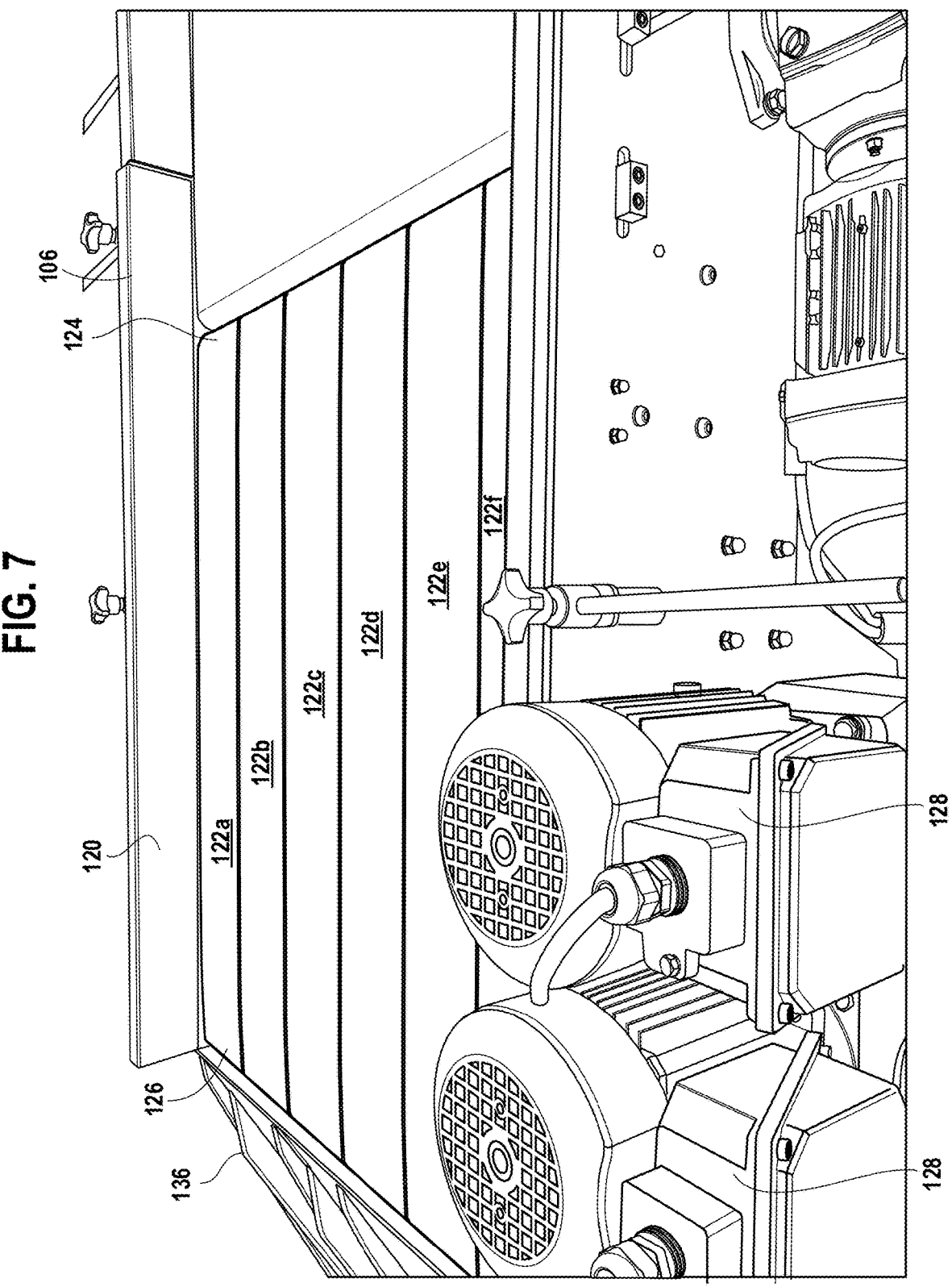

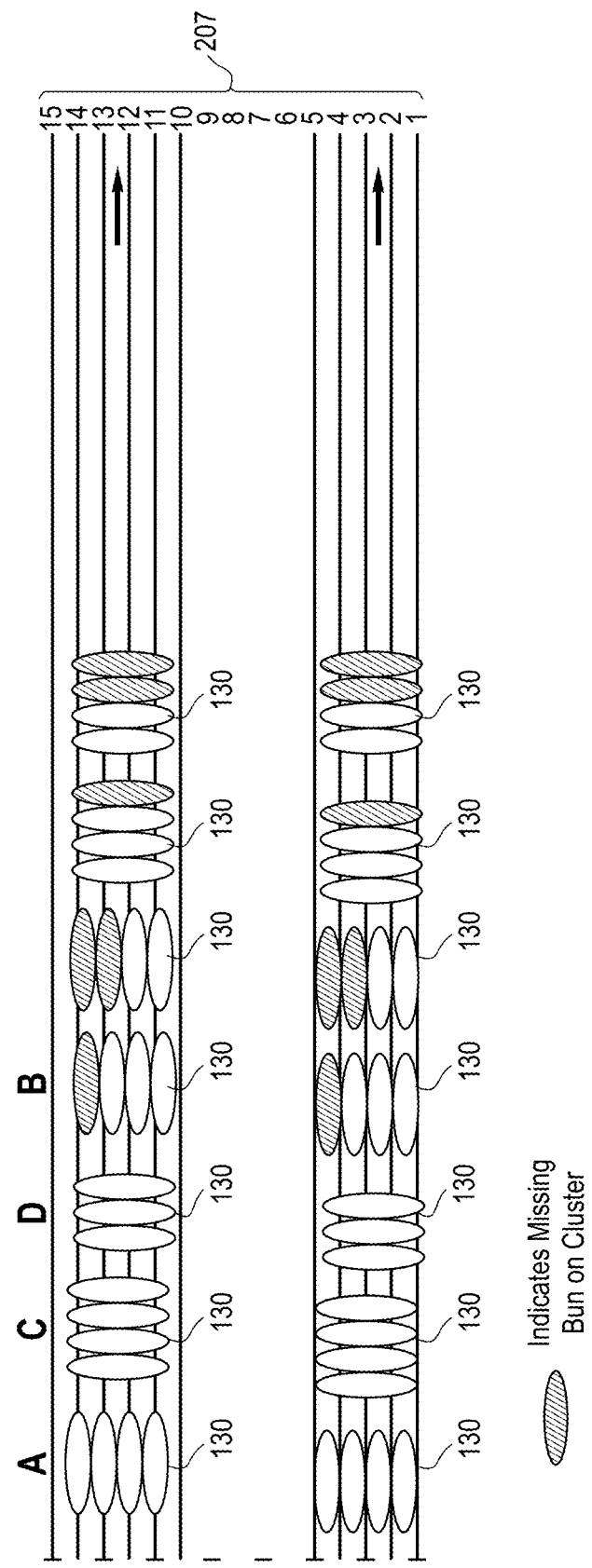

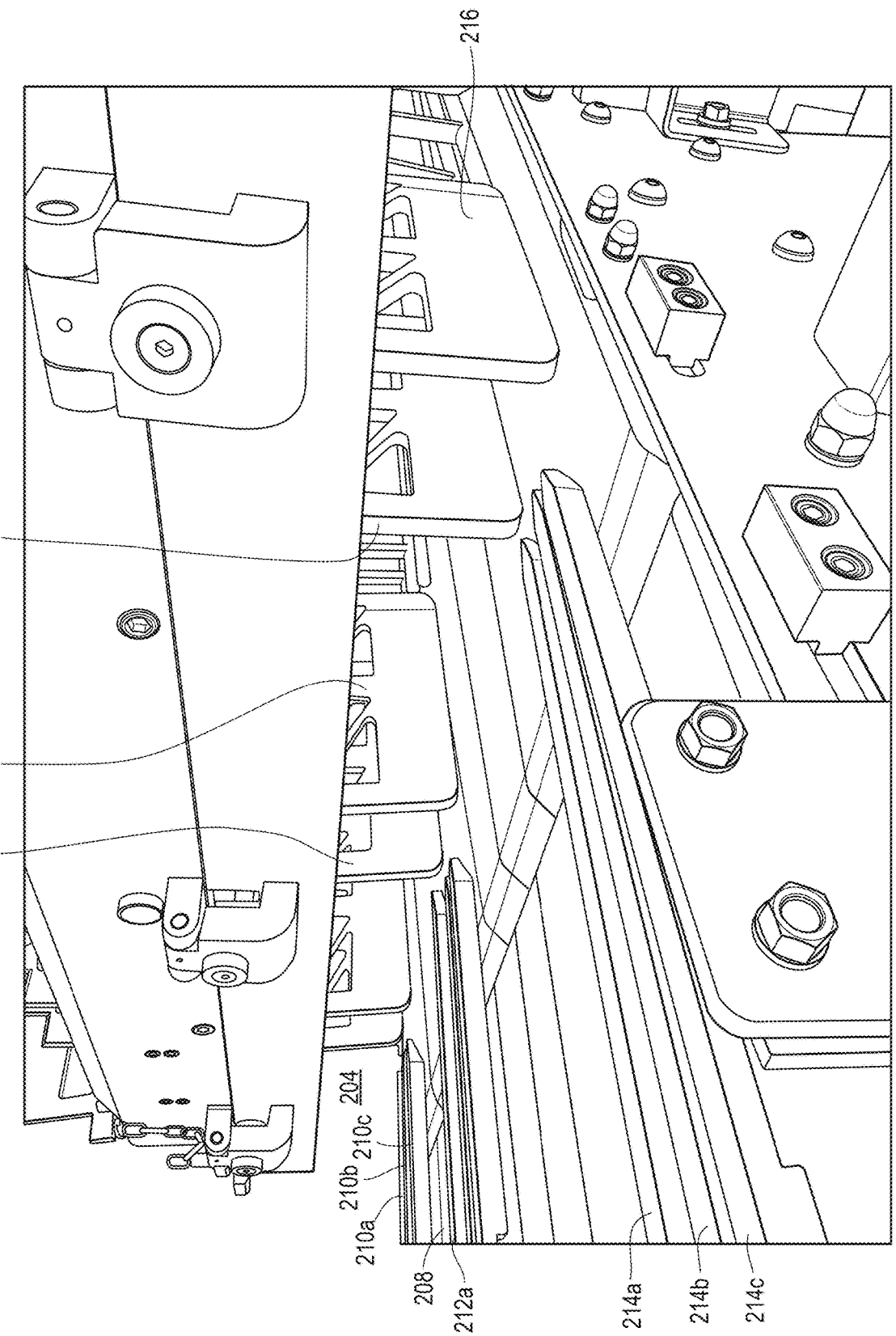

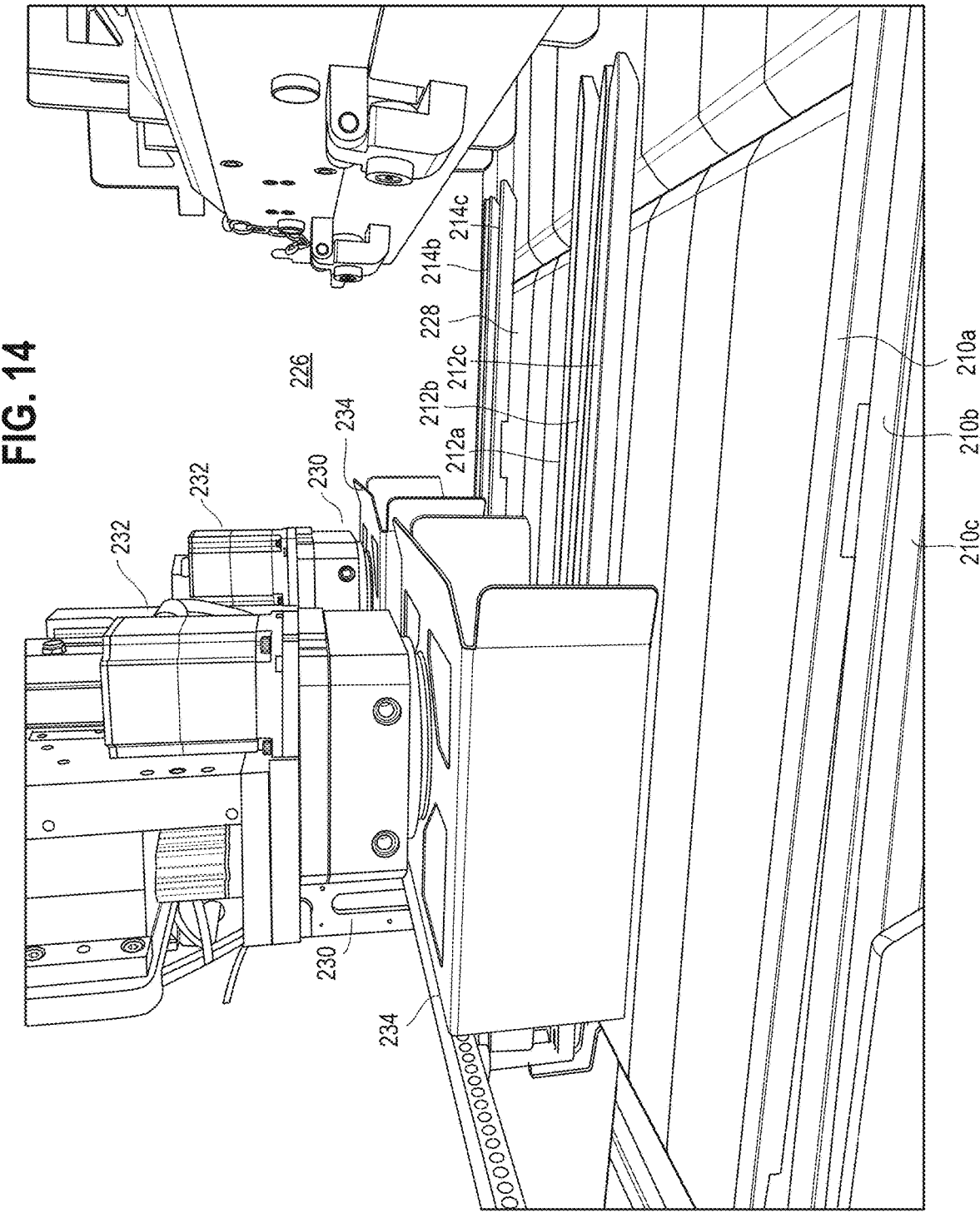

FOOD DELIVERY SYSTEM FOR PACKAGING OF FOOD AND METHOD OF DELIVERING FOOD TO BE PACKAGED

The present patent application is a continuation-in-part patent application of U.S. patent application Ser. No. 18/303,794, filed on Apr. 20, 2023, the entire contents of which are incorporated herein by reference.

BACKGROUND OF THE INVENTION

Technical Field

The present invention is directed to a delivery system and a method of delivering a product that allow the product to be properly fed to a packaging system. In particular, the delivery system and method of delivering a product are directed to properly feeding and orienting baked foods, such as bread rolls and buns, which include hot dog buns and hamburger buns, so as to be properly oriented to be inserted into a bag.

Background Art

It is well known to orient food by hand prior to the food being placed in a package. In the case of the packaging of hot dog buns, two pieces of dough are placed on a pan and placed in an oven. After baking is completed, two sets of four hot dog buns are present on the pan. Since the top portions of the sets of hot dog buns were directly exposed to the heat of the oven, they have a brown color. The bottom portions of the sets of hot dog buns were not directly exposed to the heat of the oven and so they have a lighter brown color when compared with the top portions of the sets of hot dog buns. In addition, if there was flour accidently present on the surface of the pan during the baking process, white spots can appear on those areas of the bottom portions of the sets of hot dog buns that were in contact with the flour. As shown in FIG. 1A, the tops 10 of the hot dog buns 12 in a set have a consistent brown color. As shown in FIG. 1B, the bottoms 14 of the hot dog buns 12 in a set have a lighter brown color with white patches 16 present. Thus, there is a color differential between the tops 10 and the bottoms 14 of the hot dog buns 12. In addition, there is a difference between the contour/profile of the tops 10 and the contour/profile of the bottoms 14 when viewed from the left side or right side of the hot dog buns 12. In particular, the bottoms 14 will have a flatter contour/profile than that of the tops 10.

It is well known that the packaging of sets of hot dog buns is accomplished by delivering recently baked set of hot dog buns on a conveyor that moves the sets of hot dog buns to a machine called a bagger. The conveyor can have one to twelves lanes of food to be packaged. The bagger places one or more sets of hot dog buns into a bag. When the bag contains the desired number of sets of hot dog buns (two sets of four hot dog buns in most cases), it is closed in a well-known manner and later shipped to a store for sale to consumers.

While on the conveyor and prior to being processed by the bagger, the sets of hot dog buns are positioned randomly on the conveyor, such that some sets are upside down and some sets are not aligned parallel to the direction of travel of the conveyor toward the bagger. One or more persons, known as operators, are positioned besides the conveyor and must manually execute essentially four things:

a) Ensure there is an even flow of single hot dog buns or sets of hot dog buns (depending on the hot dog buns to be packaged) in product lanes that direct the single hot dog buns or sets of hot dog buns to the bagger. Achieving such an even flow requires an operator to manually balance the flow of the single hot dog buns or sets of hot dog buns by moving the single hot dog buns or sets of hot dog buns around and across the product lanes.

b) Ensure that each of the single hot dog buns or sets of hot dog buns are positioned so their tops are correctly right-side up so that the bottoms of the single hot dog buns or sets of hot dog buns contact the moving surface of the conveyor.

c) Ensure that each of the single hot dog buns or sets of hot dog buns are correctly oriented relative to the conveyor and the bagger. As shown schematically in the top view of FIG. 2, a set of hot dog buns 12 are located on a conveyor belt 18 that is moving downward as indicated by the arrow. The conveyor belt 18 defines a longitudinal axis $L_c$. As show in FIG. 2, the longitudinal axis $L_B$ of a hot dog bun 12 defines an acute angle θ relative to the longitudinal axis $L_c$. Typically, the acute angle is approximately 90°. Correct orientation of a hot dog bun 12 on the conveyor 18 is achieved when either of the ends 20, 22 of the hot dog buns 12 are pointed downstream towards the bagger along or parallel with the longitudinal axis $L_c$ so that the angle θ has a value of 0°.

d) Ensure that the single hot dog buns or sets of hot dog buns are complete in that the single hot dog buns are not attached to other hot dog buns or the set of hot dog buns has the correct number of hot dog buns, and the single hot buns or the sets of hot dog buns do not contain damaged or misshapen buns. For example, as shown in FIGS. 1A-B and 2, the sets of hot dog buns 12 present are complete since they are not damaged and they each have the correct number of four hot dogs 12.

When an operator determines that a single hot dog bun or a set of hot dog buns does not achieve one or more of goals a)-c) mentioned previously, the operator manually manipulates the single hot dog bun or the set of hot dog buns in question to achieve the one or more goals a)-c). When an operator determines that goal d) is not achieved for a particular single hot dog bun or a set of hot dog buns, that particular single hot dog bun or set of hot dog buns is removed from the conveyor 18.

Note that it is well known to manually orient other sets of hot dog buns that contain different numbers of hot dogs, such as 3, 2, or 1. In such situations, human operators are charged with the same goals a)-d) mentioned previously with respect to the set of four hot dog buns described previously and shown in FIGS. 1A-B and 2.

It is also well known to have human operators orient other foods pursuant to one or more of the goals a)-d) mentioned previously depending on the food being handled. For example, in the case that the food to be packaged is a set of four hamburger buns that form two rows and two columns, the longitudinal axis $L_B$ of goal c) is taken along a line connecting the centers of two hamburger buns in the same row or in the same column. In the case that there are only single hamburger buns to be packaged, then goal c) does not apply due to the circular and symmetric shape of each single hamburger bun.

In each of the prior described tasks for operators, there are errors performed by the operators. For example, due to the speed of the conveyor and the number of pieces and/or sets of food on the conveyor, it may be difficult to evenly feed the pieces and/or sets of the food delivered to the bagger. If the food is not evenly fed, then there may be a back-up that develops at the bagger that would cause the conveyor to be shut down so that either the pieces and/or sets of the food can be rearranged or scrapped as waste for better feeding of the bagger. Such a shutdown results in the packaging process being less efficient.

Another problem with the use of human operators in performing the prior described tasks, is that it can be difficult to determine whether pieces and/or sets of the food are right-side up. Accordingly, some packaged foods may have the food incorrectly positioned upside down within the package relative to the other food within the package.

Another problem with the use of human operators in performing the previously described tasks is that the operators are positioned on the side of the conveyor and so there will be errors in correctly determining whether pieces and/or sets of the food are correctly oriented to be received by the bagger. If they are not correctly oriented, then the bagger may not be able to receive and package such foods and, thus, a log jam may result at the bagger. Again, the conveyor will need to be shut down to reposition the food or scrap some of the food so that the bagger can accept food on the conveyor.

Another problem with the use of human operators in performing the prior described tasks is that the conveyor must be run at a speed so that the human operators can perform tasks a)-d) mentioned previously. Thus, the amount of food being processed per hour is limited by the human operator's ability to identify that one of the tasks a)-d) needs to be performed and perform such an identified task. While increasing the number of operators to perform one or more of tasks a)-d) can improve the amount of food being process per hour, it will lead to increased labor costs that will need to be passed on to the consumer.

SUMMARY OF THE INVENTION

A first aspect of the present invention regards a delivery system that includes a surface having a surface upon which a food item is placed. An array of sensors positioned above the surface and which takes multiple readings of the food item on the surface. A processor that analyzes the multiple readings and generates a height profile for the food item and determines a characteristic of the food item based on the height profile, wherein the characteristic is selected from the group consisting of 1) whether the food item is right side up or upside down, 2) whether the food item is misoriented; 3) whether the food item is missing a portion of food; and 4) whether the food item is damaged.

A second aspect of the present invention regards a method of delivery that includes placing a food item on a surface and taking multiple readings of the food item on the surface. Analyzing the multiple readings and generating a height profile for the food item and determining a characteristic of the food item based on the height profile, wherein the characteristic is selected from the group consisting of 1) whether the food item is right side up or upside down, 2) whether the food item is misoriented; 3) whether the food item is missing a portion of food; and 4) whether the food item is damaged.

One or more aspects of the present invention provide the advantage of more accurate orientation of food to be delivered to and packaged by a bagger.

One or more aspects of the present invention provide the advantage of increasing the number of food delivered to and packaged by a bagger per hour.

One or more aspects of the present invention provide the advantage of reducing the costs of orienting food to be delivered to and packaged by a bagger.

BRIEF DESCRIPTION OF THE DRAWINGS

The various features, advantages and other uses of the present apparatus and method will become more apparent by referring to the following detailed description and drawings in which:

FIG. 5 shows a top schematic view of the delivery system of FIG. 3 when delivering food in accordance with the present invention;

FIG. 5A shows a top schematic view of a possible arrangement of buns on a conveyor belt that need to be balanced;

FIG. 5B shows a top schematic snap shot view of a balancing process applied to the arrangement of buns on the conveyor of FIG. 5A;

FIG. 5F shows a first set of schematic snap shot views of an example of a balancing process;

FIG. 5G shows a second set of schematic snap shot views of the balancing process of FIG. 5F;

FIG. 6 shows a perspective view of an embodiment of a filler station of the delivery system of FIG. 3;

FIG. 7 shows a perspective view of an embodiment of a metering balancer station of the delivery system of FIG. 3;

FIG. 11E schematically shows various clusters of hot dog buns prior to being scanned by an array of photo eyes or photoelectric sensors in accordance with the present invention;

FIG. 13 shows a perspective view of an embodiment of a lane balancer station of the delivery system of FIG. 3;

FIG. 14 shows a perspective view of an embodiment of a turning station of the delivery system of FIG. 3;

FIG. 16 schematically shows a flow chart of a possible method of delivering sets of hot dog buns to a bagger;

DETAILED DESCRIPTION

Figure 1A:
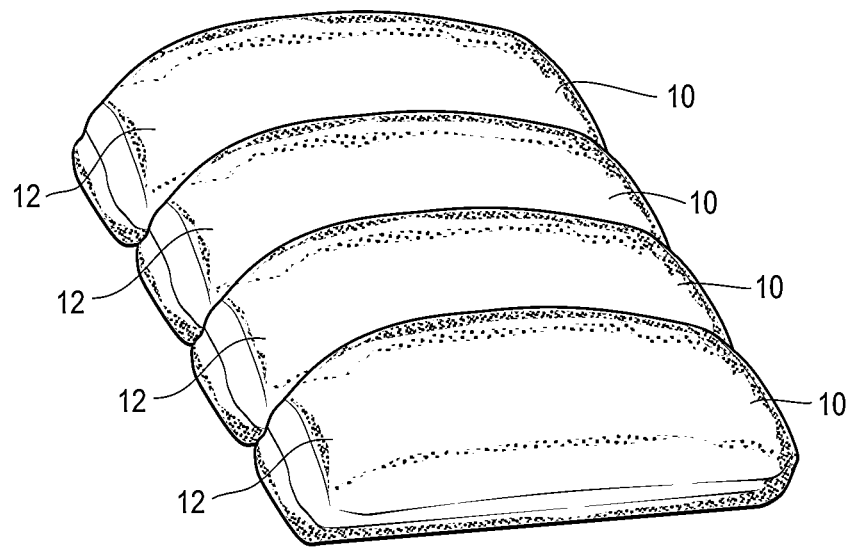
FIG. 1A shows a top perspective view of the tops of typical hot dog buns.

As shown in the exemplary drawing figures is an embodiment of a delivery system that allows for the delivery and orientation of food prior to being delivered to a bagger, wherein like elements are denoted by like numerals.

FIGS. 3-15 show an embodiment of a delivery system 100. The delivery system 100 includes a filler station 102 as shown in FIGS. 3-6. The filler station 102 has two or more filler conveyors 104, 106 that are in series with one another. Each filler conveyor 104, 106 is identical in structure and has a plastic conveyor belt 108, 110, respectively, that is blue in color and made of polypropylene.

Figure 3:
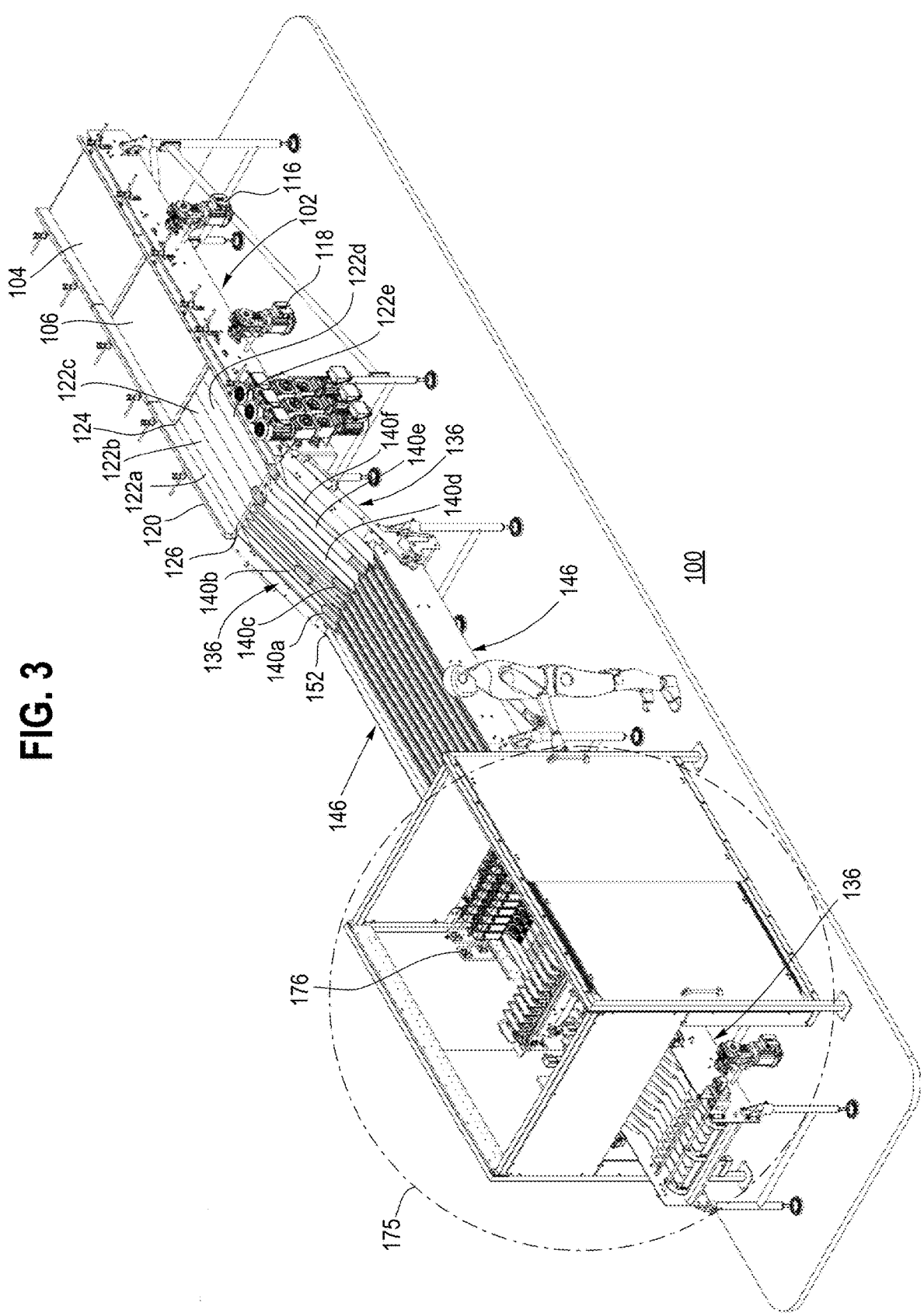
FIG. 3 shows a right elevational perspective view of an embodiment of a delivery system in accordance with the present invention.

In the case of conveyor 104, a grid of brackets is formed from longitudinal brackets 111 extending parallel to the direction of travel of the conveyor belt 108 and attached to brackets 113 that extend perpendicular to the direction of travel of the conveyor belt 108. The grid of brackets is attached to a pair of stainless-steel cover plates 115, 117. The plastic conveyor belt 108 is looped over the grid of brackets and has a width of approximately 30 inches and a length of approximately 72 inches prior to being looped. The looped plastic conveyor belt 108 has a rear end 112 that receives a roller 119, as shown in FIGS. 3B-3C, that engages the interior surface of the plastic conveyor belt 108 in a well-known manner. The front end 114 of the plastic conveyor belt 108 receives a drive roller 121 that engages the interior surface of the plastic conveyor belt 108. The distance between the roller 119 and the drive roller 121 is approximately 36 inches. The drive roller 121 is rotated by a motor 116 which results in the drive roller 121 moving the plastic conveyor belt 108 about the roller 119 at the rear end 112. The speed of the plastic conveyor belt 108 is in the range of 15 ft/min to 70 ft/min.

Figure 3A:
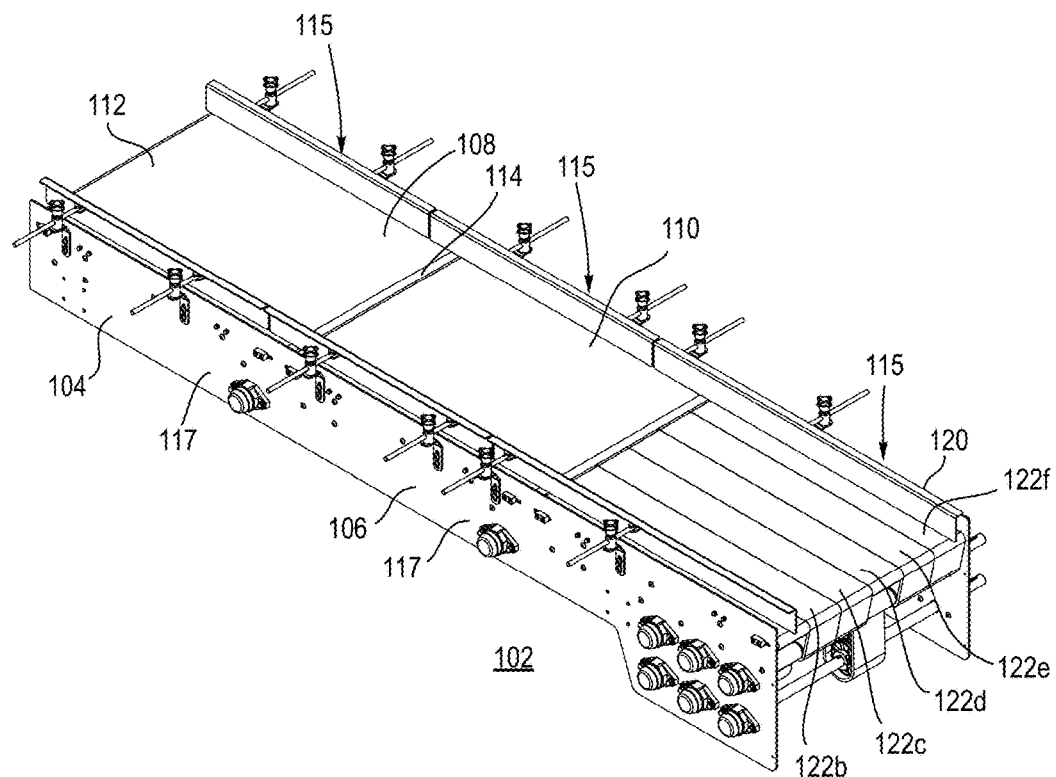
FIG. 3A shows a left elevational perspective view of an embodiment of a filler station of the delivery system of FIG. 3.
Figure 3B:
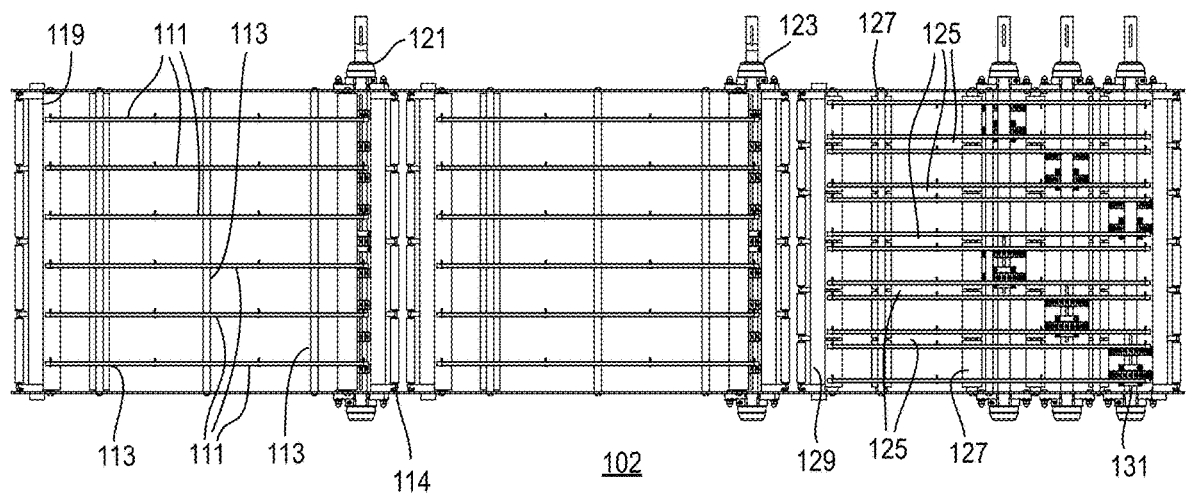
FIG. 3B shows a op view of the filler station of FIG. 3A with the conveyor belt removed.
Figure 3C:
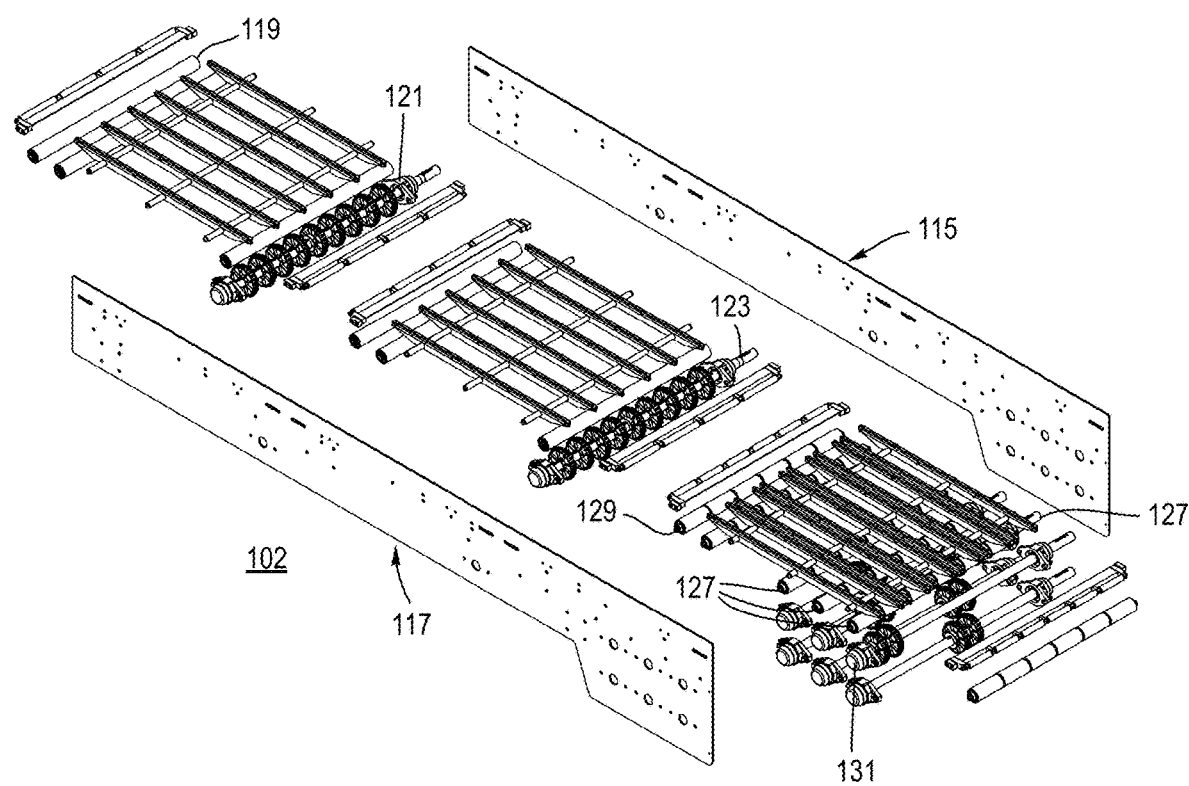
FIG. 3C shows an exploded perspective view of the filler station of FIG. 3A.
Figure 4:
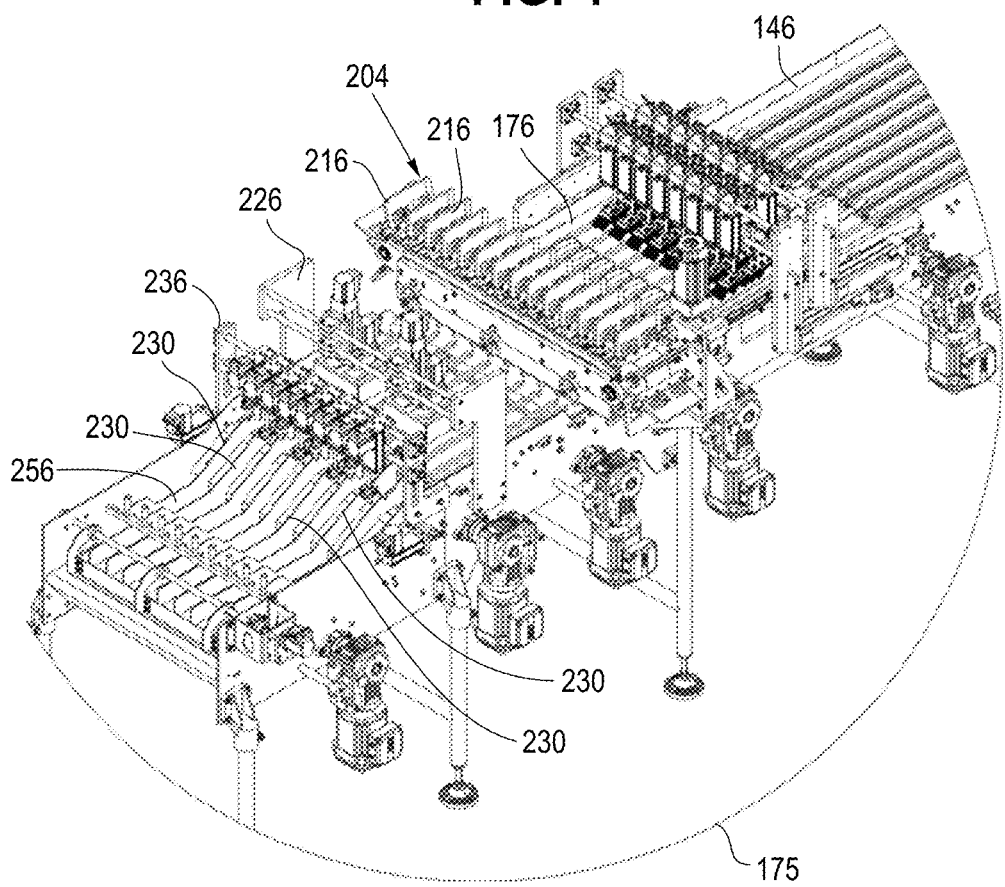
FIG. 4 shows an enlarged and exposed portion of an orientation system of the delivery system of FIG. 3.

As mentioned previously, conveyor 106 has an identical structure as conveyor 104, which is shown in FIGS. 3A-C. The drive roller 123 of the conveyor 106 is driven by a motor 118 so that the plastic conveyor belt 110 of the conveyor 106 moves at a speed ranging from 15 ft/min to 70 ft/min. Preferably, the plastic conveyor belt 110 moves simultaneously with and in the same direction as the plastic conveyor belt 108. The speed of the plastic conveyor belt 110 can be the same as the speed of the plastic conveyor belt 108 or it can be adjusted to a slower speed to allow some slight backup of the sets of hot dog buns 130 on the plastic conveyor belt 110.

Figure 5C:
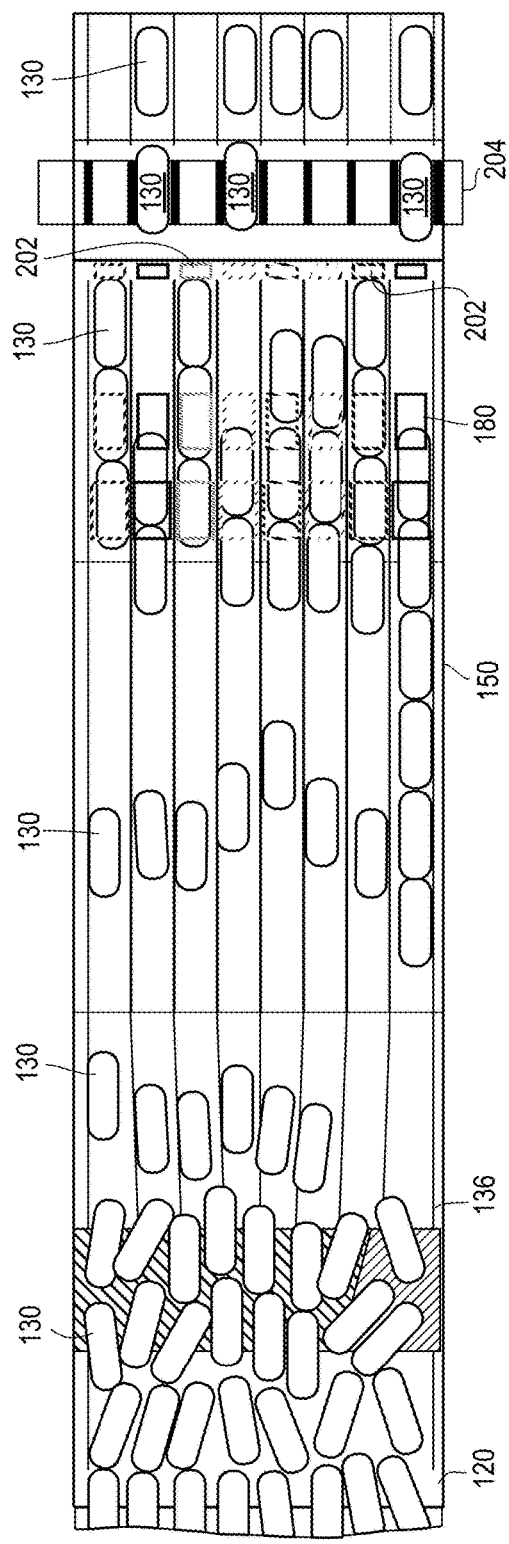
FIG. 5C shows a second top schematic snap shot view of the balancing process applied to the arrangement of buns on the conveyor of FIG. 5A.
Figure 5D:
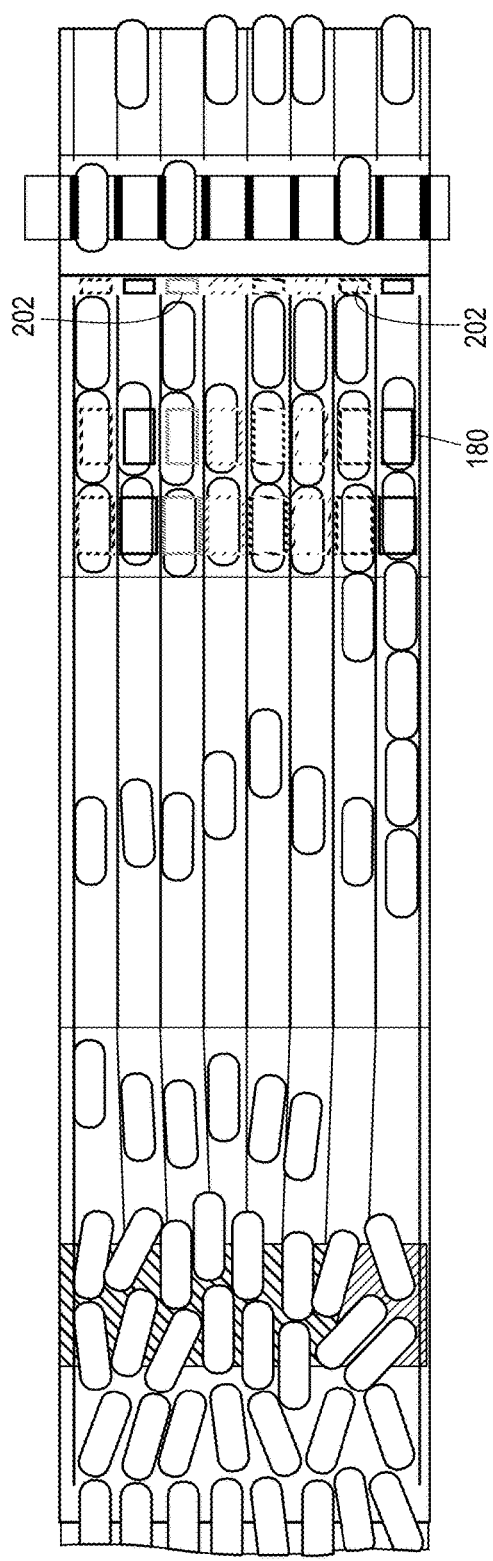
FIG. 5D shows a third top schematic snap shot view of the balancing process applied to the arrangement of buns on the conveyor of FIG. 5A.
Figure 5E:
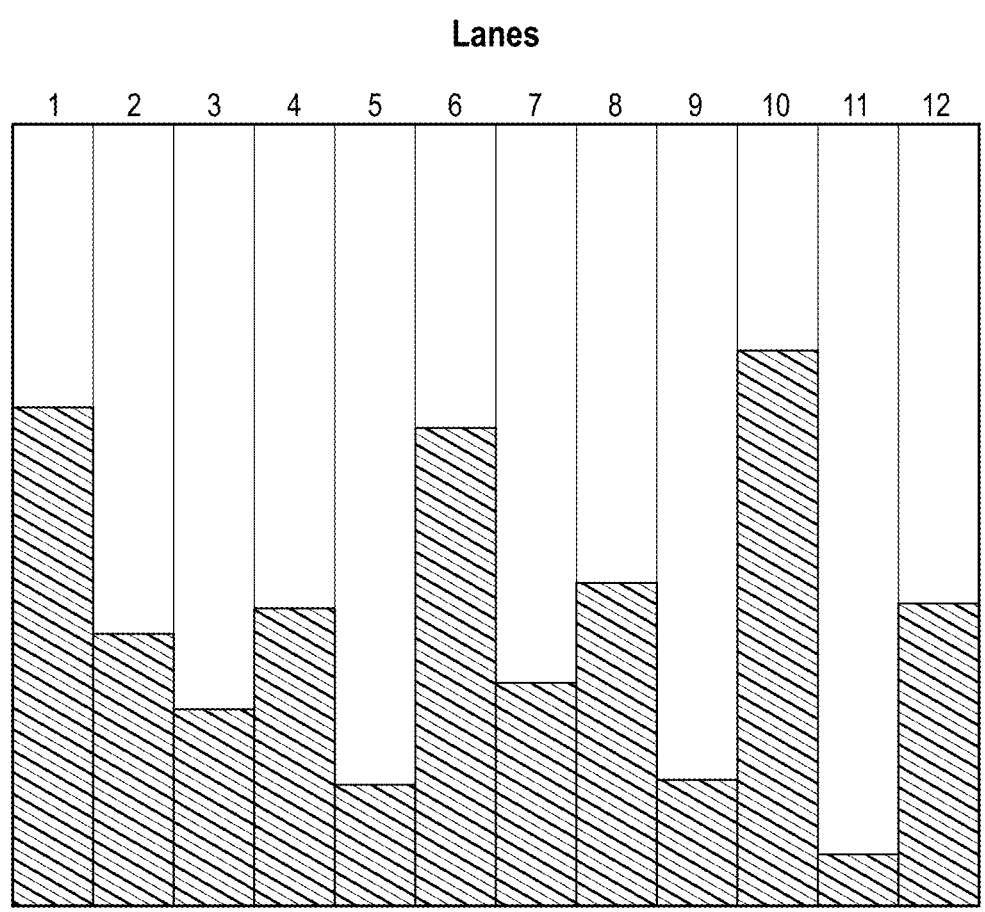
FIG. 5E schematically shows an example of cumulative lengths of single hot dog buns for each lane of a conveyor belt of a bun feed grouper station of the delivery system of FIG. 3 that are used to balance the distribution of the single hot dog buns on the conveyor belt.
Figure 5H:
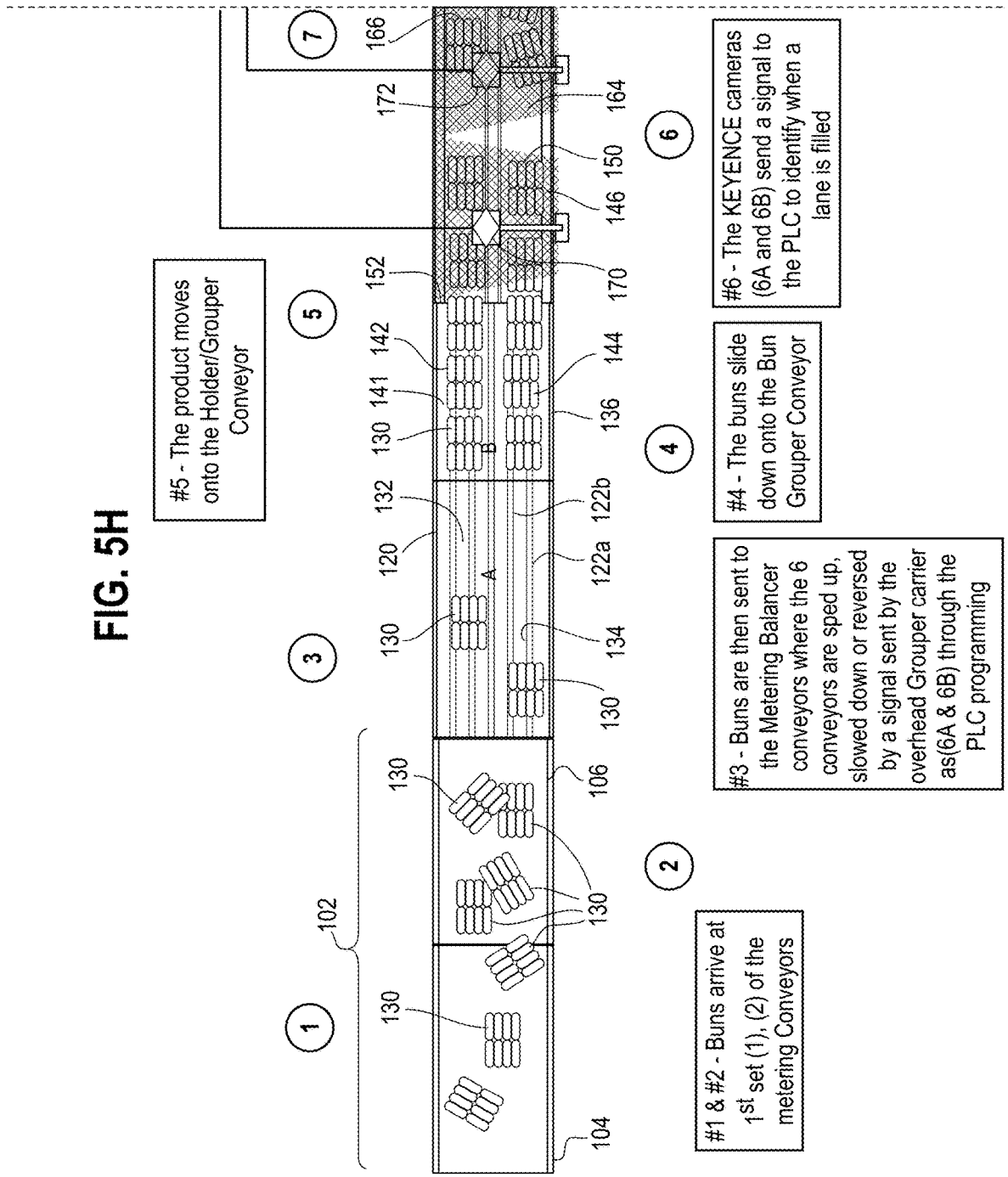
FIG. 5H shows a left portion of the top schematic view of FIG. 5.

In operation, food is fed or loaded onto moving conveyor 104 so that the food is moved to moving conveyor 106, which in turn delivers the food to a metering balancer station 120 as shown in FIGS. 3, 3A-C, 5 (see left portion of the top view of FIG. 5 as shown in FIG. 5H), and 7. While the food can be any food, for the purpose of this discussion the food will be hot dog buns 130 that are in sets of four. Other numbers of hot dog buns in a set are possible, such as 2 and 3. Single hot dog buns can be processed as well. In addition, the food can be sets of hamburger buns, wherein the number of hamburger buns in a set are, for example, 4, 3, or 2. Single hamburger buns can be processed by the delivery system 100.

As shown in FIGS. 3, 3A-C, 5 (see left portion of the top view of FIG. 5 as shown in FIG. 5H), and 7, the metering balancer station 120 is in series with and downstream of the moving conveyor 106. As shown in FIGS. 3B-C, the metering balancer station 120 includes a grid of brackets formed from longitudinal brackets 125 extending parallel to the direction of travel of multiple conveyor belts 122a-f and attached to brackets 127 that extend perpendicular to the direction of travel of the conveyor belts 122a-f. The grid of brackets is attached to the pair of stainless-steel cover plates 115, 117. The plastic conveyor belts 122a-f are looped over the grid of brackets. The metering balancer station 120 has six plastic conveyor belts 122a-f. Each plastic conveyor belt 122a-f is essentially identical to each other. Regarding plastic conveyor belt 122a, it has a width of approximately 5 inches and a length end to end prior to being looped of approximately 72 inches. The plastic conveyor belt 122a is made of a material similar to the materials of the plastic conveyor belts 108 and 110 described previously. The plastic conveyor belt 122a is looped and has a rear end 124 that receives a roller 129 that engages the interior surface of the plastic conveyor belt 122a in a well-known manner. The front end 126 of the plastic conveyor belt 122a receives a drive roller 131 that engages the interior surface of the plastic conveyor belt 122a. The distance between the roller 129 and the drive roller 131 is approximately 36 inches. The drive roller 131 is rotated by a motor 128 which results in the drive roller 131 moving the plastic conveyor belt 122a about the roller 129 at the rear end 124. The speed of the plastic conveyor belt 122a is in the range of 15 ft/min to 70 ft/min.

The plastic conveyor belts 122b-f have a structure similar to plastic conveyor belt 112a described previously. Each of the plastic conveyor belts 122b-f share a roller at their rear end and have their own drive roller at their front end, wherein each drive roller is driven by its own motor. Thus, the plastic conveyor belts 122a-f can be driven independently of each other and can be driven at different directions and speeds relative to one another. Such flexibility in speed and direction for each of the plastic conveyor belts 122a-f allows for the metering balancer station 120 to perform a balancing process as will be described hereinafter.

As shown in FIG. 5 (see left portion of the top view of FIG. 5 as shown in FIG. 5H), the sets of hot dog buns 130 delivered to the moving conveyors 104 and 106 are initially randomly strewn on the top surfaces of the plastic conveyor belts 108 and 110. Such random positioning of the sets of hot dog buns 130 is not ideal when compared with the preferable arrangement where all sets of hot dog buns 130 are located in either a left lane 132 or a right lane 134 of the metering balancer station 120 (see left portion of the top view of FIG. 5 as shown in FIG. 5H). Note that hereinafter left is taken from the perspective of a person looking downstream of the delivery system 100 from the rear of the filler station 102.

In order to accomplish having the sets of hot dog buns 130 on the metering balancer station 120 being directed to a left lane or a right lane, the sets of hot dog buns 130 are fed to a chute 136 that has multiple channels 138a-e defined by stainless steel ribs 140a-f as shown in FIGS. 3 and 7-9. The chute 136 has a surface 141 made of stainless steel that is inclined downward from the plastic conveyor belts 122a-f by an angle ranging from 15 to 20 degrees. The ribs 140a-f are slidable relative to the surface 141 and can be locked in position thereon. The spacing between adjacent ribs is selected so as to approximate the width of the food, such as a set of hot dog buns 130, that is being delivered from metering balancer station 120. In the example shown in FIGS. 3-15, the ribs 140a-f are arranged to define two lanes. The number of lanes formed across the entire width of the chute 136 can be increased up to twelve in number to accommodate different sizes of foods to be packaged, wherein the width of each lane is equal to each other and approximates the width of the food being delivered from the metering balancer station 120. For example, twelve lanes would be formed when single hot dog buns are conveyed by the metering balancer station 120. In addition, the ribs 140 are aligned with guides 158, 160, and 162 of the bun feed grouper station 146 as will be described hereinafter.

Figure 8:
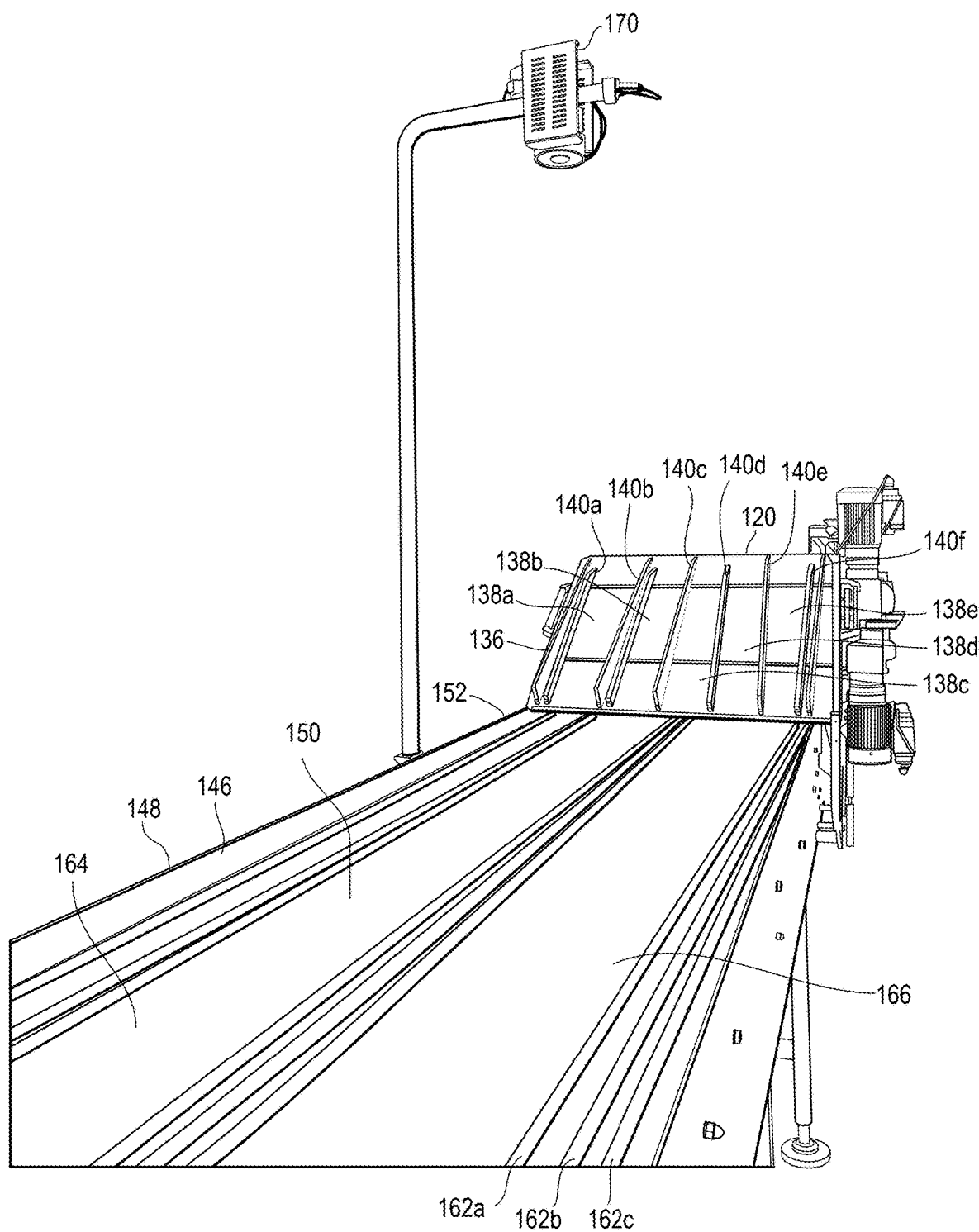
FIG. 8 shows a perspective view of an embodiment of a bun feed grouper station of the delivery system of FIG. 3.
Figure 9:
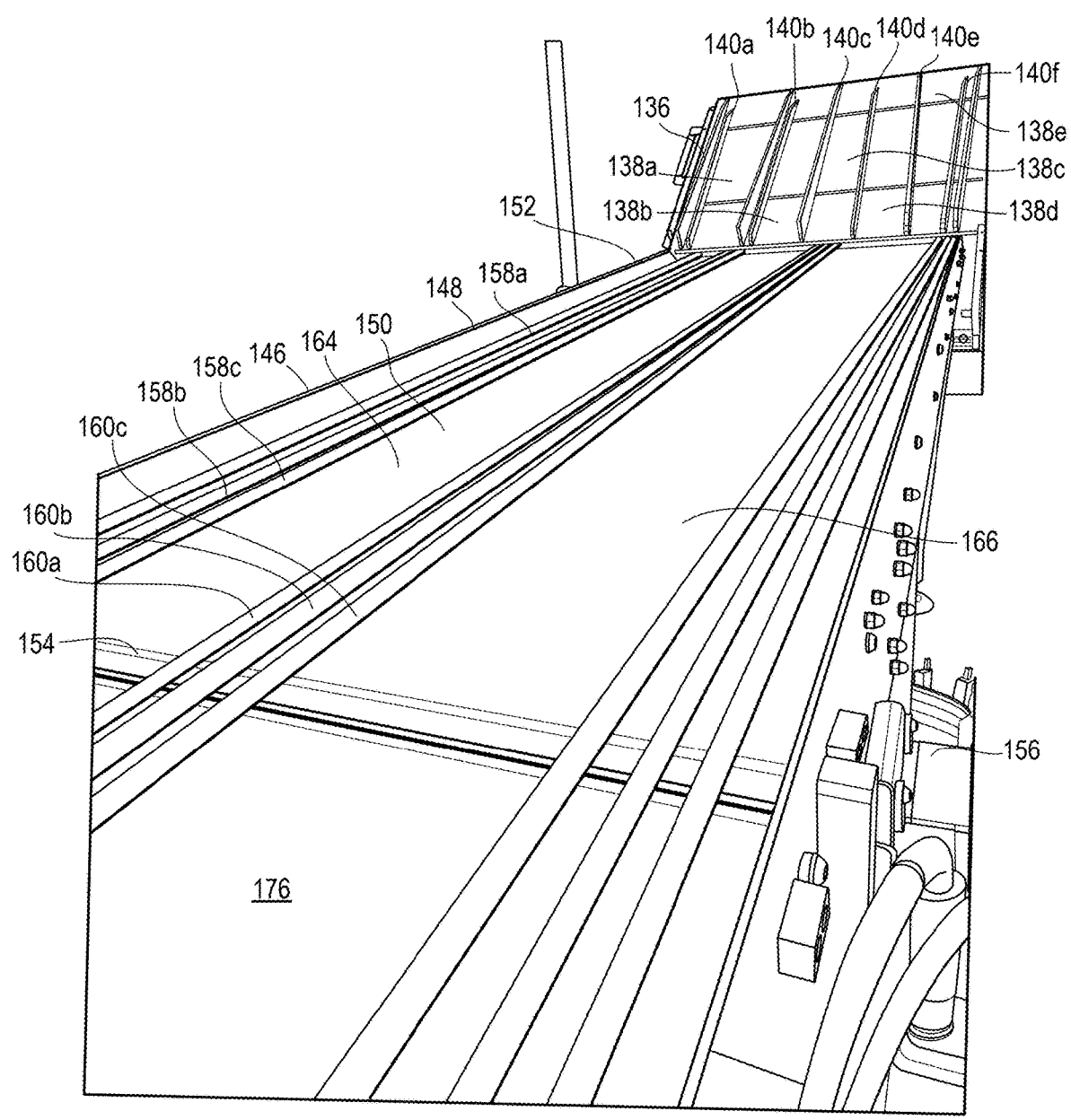
FIG. 9 shows a second perspective view of the bun feed grouper station of FIG. 8.

As shown in the top view of FIG. 5, and in particular the left portion of the top view of FIG. 5 as shown in FIG. 5H, when the sets of hot dog buns 130 pass through the chute 136, they travel down either a left lane 142 or a right lane 144. The sets of hot dog buns 130 are delivered by the chute 136 to a rear end of a conveyor belt 150 of a bun feed grouper station 146 located at the bottom of the chute 136. As shown in FIGS. 3, 8, and 9, the bun feed grouper station 146 includes a conveyor 148 with the conveyor belt 150, wherein the conveyor belt 150 has a width of approximately 31 inches and a length from end to end prior to being looped of approximately 204 inches. An example of a possible conveyor belt 150 to use is a conveyor belt of similar dimensions available from Intralox Co. The conveyor belt 150 has a rear end 152 that receives a roller (not shown) that engages the interior surface of the looped conveyor belt 150 in a well-known manner. The front end 154 of the looped conveyor belt 150 receives a drive roller (not shown) that engages the interior surface of the conveyor belt 150. The distance between the roller and the drive roller is approximately 102 inches. The drive roller is rotated by a motor 156 which results in the drive roller moving the conveyor belt 150 about the roller at the rear end 152. The speed of the conveyor belt 150 is in the range of 30 ft/min to 50 ft/min.

As shown in FIGS. 8 and 9, right cylindrical metal guides 158a-c, central cylindrical metal guides 160a-c, and left cylindrical metal guides 162a-c are positioned above the top surface of the conveyor belt 150. Each of the metal guides 158, 160, and 162 is made of stainless steel, has a length of approximately 144 inches, and has a diameter of approximately 0.5 inches. As shown in FIGS. 6 and 7, the guides 158c and 160a define a right lane 164 and the guides 160c and 162a define a left lane 166 that receive the two lanes of sets of hot dog buns 130 from the metering balancer station 120 and the chute 136. Each of the right lane 164 and the left lane 166 has a width that is approximately the width of the food being delivered from the chute 136 and are aligned with the left and right lanes, respectively, of the chute 136. As with the chute 136, the width and number of lanes formed by the guides 160, 162, and 164 can be varied to approximate the size of the food being delivered by the metering balancer section 120. This is accomplished by moving the guides 158a-c, 160a-c, and 162a-c to positions so that lanes are formed for the bun feed grouper station 146 that correspond with and are aligned with the lanes of the chute 136.

As shown in FIG. 8, a digital camera 170 is positioned above the top surface of the conveyor belt 150 and located approximately 12 inches from the rear end 152 of the conveyor belt 150. Similarly, a second digital camera 172 is positioned above the top surface of the conveyor belt 150 and located approximately directly above the front end 154 of the conveyor belt 150. Note that other possible locations for the digital cameras 170 and 172 are possible as long as the digital cameras 170 and 172 are able to image the entire top surface of the conveyor belt 150. The digital cameras 170 and 172 take digital images of the sets of the hot dog buns 130 that are distributed along the entire length of the conveyor belt 150. Each camera is identical in structure. Examples of cameras that can be used are the model CV-X322F camera manufactured and sold by Keyence and the model VS-160 camera manufactured and sold by Keyence.

The digital cameras 170 and 172 synchronously and simultaneously take digital color images of the sets of hot dog buns 130 on the top surface of the conveyor belt 150 and those portions of the top surface of the conveyor belt 150 that are not covered by the sets of hot dog buns 130. Each digital camera 170 and 172 independently takes a digital image of a portion of the entire top surface of the conveyor belt 150 and the sets of hot dog buns 130 positioned thereon, wherein when the images taken by the cameras 170 and 172 are combined they encompass the entire top surface of the conveyor belt 150. The period between consecutive digital images taken is at most 110 ms. Note that the use of two cameras 170 and 172 helps to ensure that the entire top surface of the conveyor belt 150 is digitally imaged and an adequate resolution for each digital image is achieved. Note that each of the digital cameras 170 and 172 has a processor that is programmed to discern the brown colors of the sets of hot dog buns 130 observable by the digital cameras 170 and 172 (cameras will see brown colors regardless of whether the sets of hot dog buns 130 are right-side up or upside down) while ignoring pixels associated with the conveyor belt 150. Obviously, it is preferable that the exterior surface of the conveyor belt 150 has a color, such as green, blue, or gray, that is easily discernable from the brown color of the sets of hot dog buns 130 on the top surface of the conveyor belt 150. For its corresponding digital image taken of the sets of hot dog buns 130, each camera 170 and 172 counts for each lane of the conveyor belt 150 the number of pixels along a longitudinal direction along the length of the conveyor belt 150 that have a brown value (either brown values typically seen for right-side up sets of hot dog buns 130 or lighter brown values typically see for upside-down sets of hot dog buns 130). The number of pixels is preferably taken along the middle of each set of hot dog buns 130. From the number of brown pixels in a particular longitudinal direction, the length of hot dog buns 130 along that particular longitudinal direction can be calculated. To do the calculation, it must be determined the linear size of a pixel. So, in the case that 100 brown colored pixels are counted along a longitudinal direction of a lane and it is known that each pixel represents a length of 0.12 inches, then the length of hot dogs in the lane is 12 inches (0.12 inches/pixel*100 pixels). Counting pixels and calculating lengths of hot dog buns in the other lanes of conveyor belt 150 are performed in a similar manner by the cameras 170 and 172. Note that while the counting of pixels and the calculation of lengths of buns is performed by the cameras 170 and 172 for delivery system 100, it is possible to have digital color cameras send the pixel information of their digital images to a programmable logic controller (PLC) 174, which performs the counting and calculation of hot dog lengths in each lane as mentioned previously.

In an alternative way to analyze the digital image of the cameras 170 and 172, the cameras 170 and 172 or the PLC 174 can calculate the number of hot dog buns in each lane. For example, the number, N, of hot dog buns along a particular longitudinal direction of a lane will be equal to the number, P, of pixels counted along the longitudinal direction times the length, $L_p$, of a pixel in inches and then divided by the length, $L_b$, of a single hot dog bun—$N=P*L_p/L_b$, wherein $L_b$ typically has a value of 6 inches.

This calculation is performed for each lane and performed for one particular longitudinal direction for each lane. In the case of single hot dog buns, the calculation gives the number of single hot dog buns 130 in a particular lane. For sets of hot dog buns that are in a 2×2 pattern, the number of sets of hot dog buns 130 in a lane is equal to N/2, since there are two hot dog buns along the longitudinal direction for each set of hot dog buns. Thus, for each lane, the number of single hot dog buns or sets of hot dog buns can be calculated.

Once the length or number of single hot dog buns 130 or sets of hot dog buns 130 present in each lane is calculated by the cameras 170 and 172 per the processes discussed previously, balancing of the hot dog buns 130 on the conveyor 150 can be accomplished. Balancing can be understood by reviewing the distribution of single hot dog buns 130 on conveyor 150 at various points in time as shown in FIGS. 5A-D. In particular, FIG. 5A shows a point in time when hot dog buns 130 have been fed from conveyor belts 122a-f of metering balancer station 120 to chute 136 and to conveyor belt 150. The hot dog buns 130 are jumbled and randomly distributed in the balancer station 120. The hot dog buns 130 are directed to one of 8 lanes by chute 136 and so the hot dog buns 130 become more ordered in their distribution by the chute 136 onto the rear end of the conveyor belt 150. At the front end of the conveyor belt 150, the hot dog buns 130 congregate with each other at the gates 202 associated with each lane and that are in an up position. As shown in FIG. 5A, there are 8 hot dog buns 130 in the bottom lane A of conveyor belt 150. Lanes B-H have 5, 5, 5, 5, 4, 5, and 4 hot dog buns, respectively. Thus, lane A has more hot dog buns 130 than the other lanes and there is a need to find a way to reduce the number of hot dog buns 130 in lane A while increasing hot dog buns in lane F and, thus, trying to even out the number of hot dog buns 130 in each lane. In response to the imbalance, hot dog buns 130 are delivered to lanes C-H and not lanes A-B by balancer station 120 and chute 136 and gates 202 for lanes A, C-E, and G are lowered allowing hot dog buns 130 to enter the balancer station 204, as shown in FIG. 5B. The hot dog buns 130 in balancer station 204 are allowed to remain in their lane and move on to the next station. As shown in the subsequent snapshot of FIG. 5C, the hot dog buns 130 on the conveyor belt 150 have moved further towards the gates 202 that have not changed their positions shown in FIG. 5B. Thus, the hot dog buns 130 in lanes A, E, and G are moved into the balancer station 204. In contrast to the situation of FIG. 5B, the three hot dog buns 130 in lanes A, E, and G of the balancer station 204 are shifted one lane to their left to lanes B, F, and H, as shown in FIG. 5D. This results in the number of hot dog buns 130 in lane A (and lanes E and G) being reduced and the number of hot dog buns 130 in lane F (and lanes B and H) being increased, which was desired in the point of time represented by FIG. 5A. Of course, with the shifting of hot dog buns 130 there may be a need to balance lanes B, E, G, and H. This balancing process is ongoing from time to time and will be discussed in more detail hereinafter.

So, the question is when is a lane of conveyor belt 150 deemed sufficiently filled so that balancing of that lane is not a priority? A lane is deemed to be sufficiently filled when the total length of food items in the lane determined by the cameras 170 and 172 is at least a threshold value equal to 1.5*typical length of a single product being photographed (in the example of FIGS. 5A-5D, the typical length of a single hot dog bun is approximately 6 inches and so the threshold value is 9 inches). When a lane is below the threshold value, that indicates the lane needs additional food product. Note that if a lane has a total length of food product determined by cameras 170, 172 that reaches a value that is at least a second threshold value of 11*length of product, then that indicates that the lane is too full with product With the above summary of the balancing process to be performed at conveyor belt 150 in mind, balancing of the conveyor belt 150 shown in FIGS. 8 and 9 will be described hereafter. As described previously, the conveyor belt 150 and the guides 158, 160, and 162 define a right lane 164 and a left lane 166 to receive sets of hot dog buns 130 that define a 4 by 1 grouping of hot dog buns 130. The distribution of the sets of hot dog buns 130 is accomplished by the metering balancer station 120 and a lane balancer station 204.

As explained previously, the metering balancer station 120 has six independently controlled plastic conveyor belts 122*a-f*. The metering balancer station 120 can perform either coarse or fine balancing functions for the conveyor belt 150. In the case of coarse balancing, the conveyor belts 122*a-f* will each move in unison with each other at a speed that ranges from 10 ft/min to 30 ft/min when each of the lanes has a total length of product in its lane as determined by cameras 170 and 172 that is below the second threshold value associated with a 4 by 1 set of hot dog buns 130. Such movement in unison provides some balancing for the conveyor belt 150 in view of the random nature of the distribution of sets of hot dog buns 130 and the funneling effect of the chute 136. Should the cameras 170 and 172 determine that total length value for the sets of hot dog buns 130 on the conveyor belt for either lane is at least the second threshold value, then all of the conveyor belts 122*a-f* associated with the lane that is at least the second threshold value are either stopped or reversed in direction so that no additional sets of hot dog buns 130 are supplied to the lane in question for the conveyor belt 150.

Fine balancing by the metering balancer station 120 is accomplished by controlling each conveyor belt 122*a-f* based on the total length value for the sets of hot dog buns 130 measured in each lane 164 and 166 by the cameras 170 and 172. For examples, if the cameras 170 and 172 indicate that the right lane 164 has a total length value that is at least the first threshold value and is below the second threshold value, then that indicates that the lane is sufficiently filled with sets of hot dog buns 130 for further processing by the delivery system 100. In that case, the programmable logic controller (PLC) 174 previously mentioned receives signals from the cameras 170, 172 indicative of the total length value and the PLC 174 determines that the first threshold value is met and the second threshold value is not met and consequently does not change the speeds and directions of the left-most plastic conveyor belts 122*a-c*. Similarly, if the total length value for the left lane 166 is at least the first threshold value, then that indicates that the lane 166 is sufficiently filled with sets of hot dog buns 130 for further processing by the delivery system 100. In that case, the PLC 174 does not change the speeds and directions of the right-most plastic conveyor belts 122*d-f*. Note that if the total length value for the right lane 164 and/or the left lane 166 reaches the second threshold value, then that signals that the lane(s) that reaches the second threshold value is too full with product, such as the sets of hot dog buns 130. For a lane that reaches the second threshold value, the PLC 174 will direct the conveyor belts 122*a-f* to either stop or reverse their direction so that the sets of hot dog buns 130 on the conveyor belts 108, 110, 122, and 150 can be manually rearranged so the lane(s) is not too full.

If the PLC 174 determines that the total length value for either or both lanes 164 and 166 sent to it by the cameras 170 and 172 is less than the first threshold value, that indicates that the lane in question is not sufficiently filled with sets of hot dog buns 130. In this situation, the PLC 174 will balance one or more lanes by continuously adjusting the speeds and directions of the plastic conveyor belts 122*a-f* associated with the lane(s) that need more sets of hot dog buns 130 so as to provide more sets of hot dog buns to particular ones of the lane(s) in an efficient manner so that each lane is sufficiently filled (i.e., each lane of the conveyor belt 150 has a total length value of at least the first threshold value mentioned previously). As mentioned previously, FIGS. 5A-5D give an example of balancing of single hot dog buns on the conveyor belt 150. As can be seen in FIG. 5A, the conveyor belt 150 initially has more buns in lane A and the least in lanes F and H. The cameras 170 and 172 recognize this imbalance and sends signals to the PLC 174 which results in the conveyor belts 122*a-h* of meter balancing station 120 being controlled so that more hot dog buns are delivered to lanes of the metering balancer station 120 corresponding to lanes F and H of conveyor belt 150 than in lanes of metering balancer station 120 corresponding to lane A of conveyor belt 150. Accordingly, when the buns from metering balancing station 120 reach the buns on conveyor belt 150, there will approximately the same number of buns in each lane of conveyor belt 150. Note that while the balancing principles described with respect to FIGS. 5A-5D regards single hot dog buns, such balancing principles can be applied when there are single hamburger buns or sets of hot dog buns or hamburger buns.

Balancing of the sets of hot dog buns 130 on the conveyor belt 150 is performed by both the metering balancer station 120 and the lane balancer station 204 that work in conjunction with one another via PLC 174. Note that the above balancing process performed by the metering balancer station 120 and the lane balancer station 120 is a real-time and continuous process in that while the pictures are being taken and processed, the moving conveyor belts 122*a-f,* 180, and 208 are controlled by the PLC 174. Explanation of the operation of the lane balancer station 204 and the conveyor belts 180 and 208 will be explained later in this description. PLC 174 can also control the speed and direction of hot dog buns 130 to an orientation system 175 to be described hereinafter.

As shown in FIGS. 4, 10A, 11, and 12, sets of hot dog buns 130 at the front end 154 of the conveyor belt 150 are transferred to the orientation system 175 that includes a holding conveyor station 176, a lane balancer station 204, a turning station 226, and a flipping station 236 that are in series with one another. The holding conveyor station 176 includes a conveyor 178 with conveyor belt 180 that a width of approximately 31 inches and a length of approximately 36 inches. The conveyor belt 180 is available from Intralox Co. The conveyor belt 180 is looped and has a rear end 182 that receives a roller (not shown) that engages the interior surface of the conveyor belt 180 in a well-known manner.

The front end 184 of the conveyor belt 180 receives a drive roller (not shown) that engages the interior surface of the conveyor belt 180. The distance between the roller and the drive roller is approximately 8 inches (4 inches back and 4 inches down). The drive roller is rotated by a motor (not shown), which results in the drive roller moving the conveyor belt 180 about the roller at the rear end 182. The speed of the conveyor belt 180 is in the range of 30 ft/min to 70 ft/min.

Figure 10A:
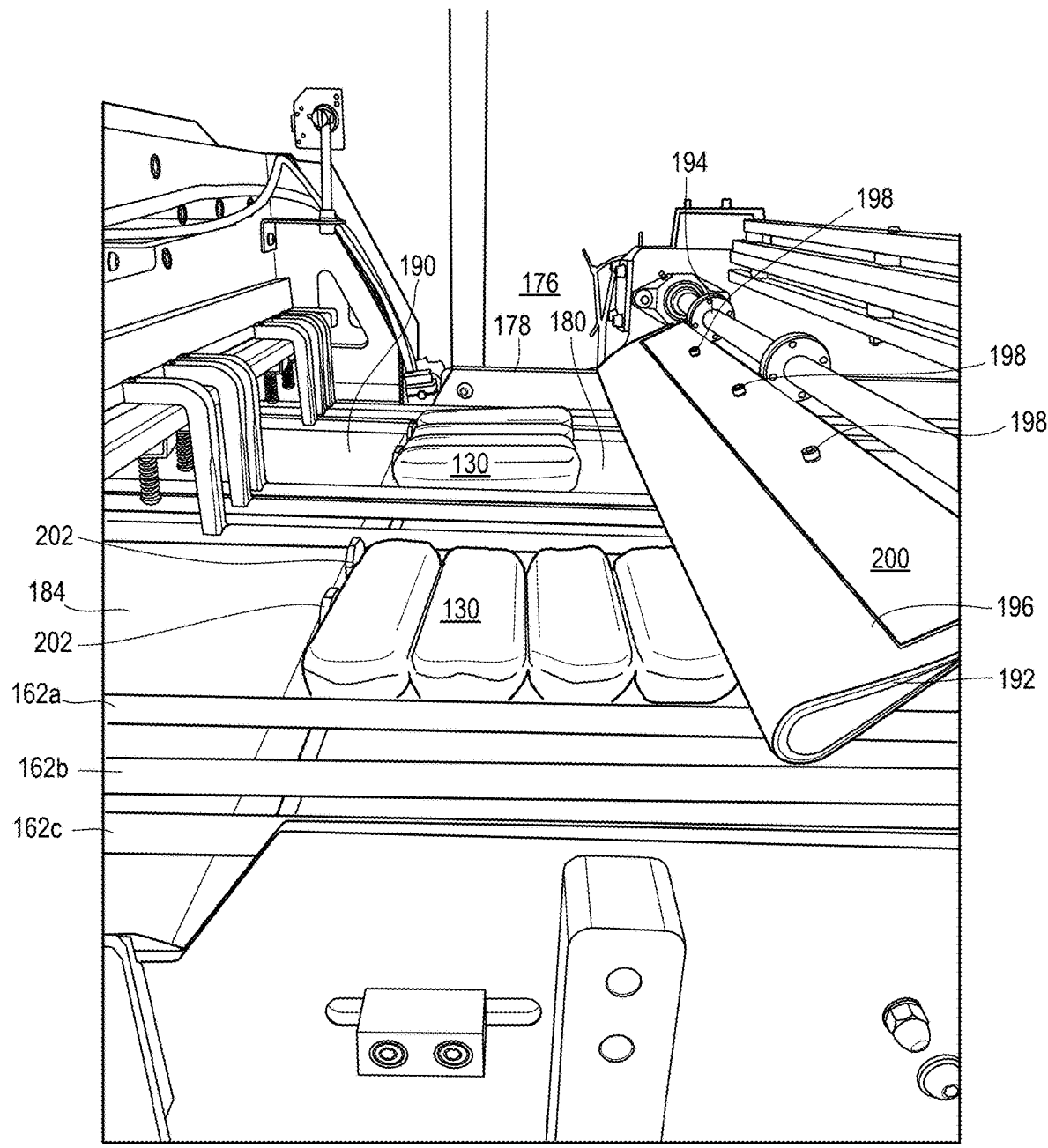
FIG. 10A shows a perspective view of an embodiment of a holding conveyor station of the delivery system of FIG. 3.
Figure 11:
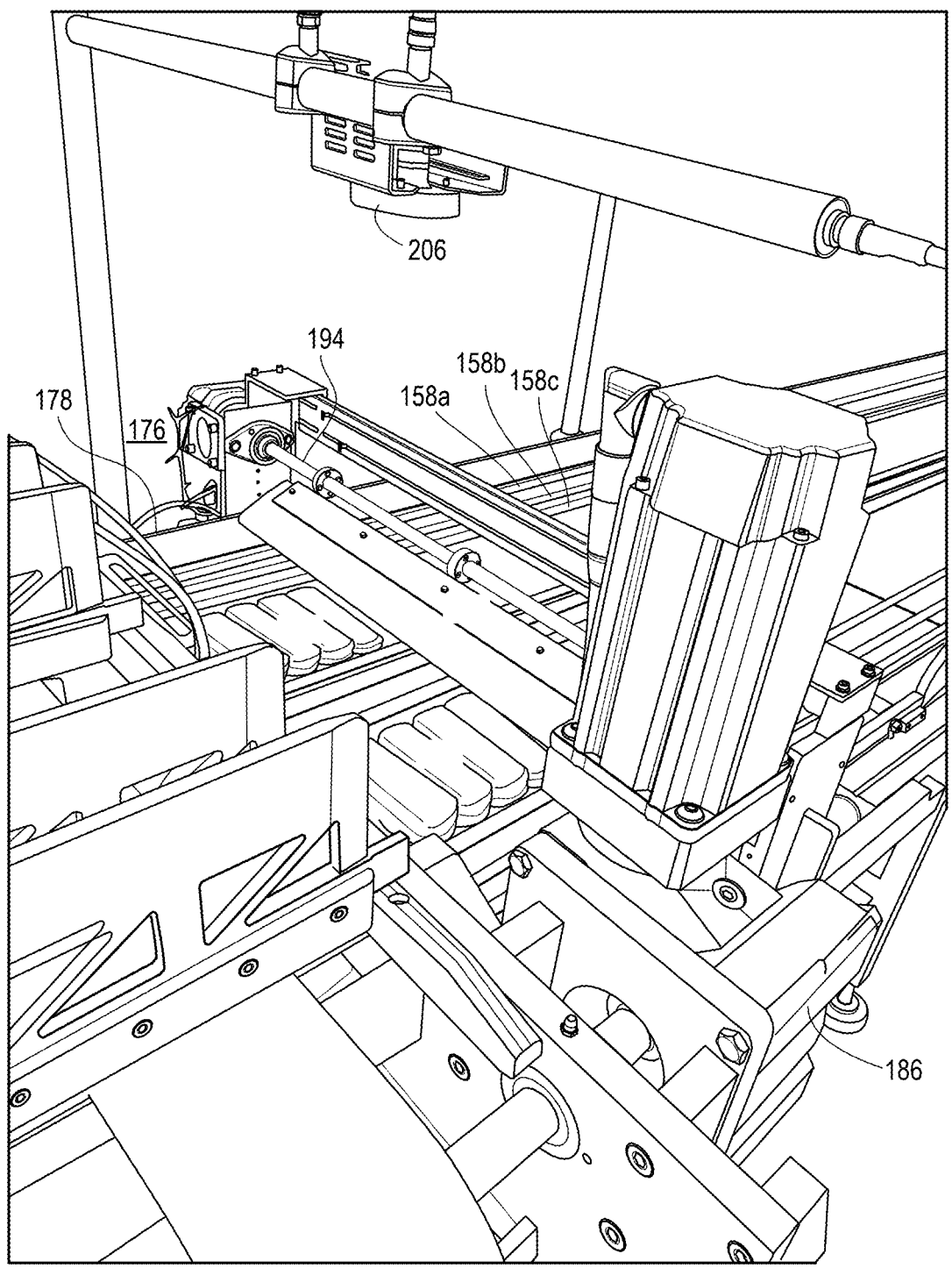
FIG. 11 shows a second perspective view of the holding conveyor station of FIG. 10.
Figure 12:
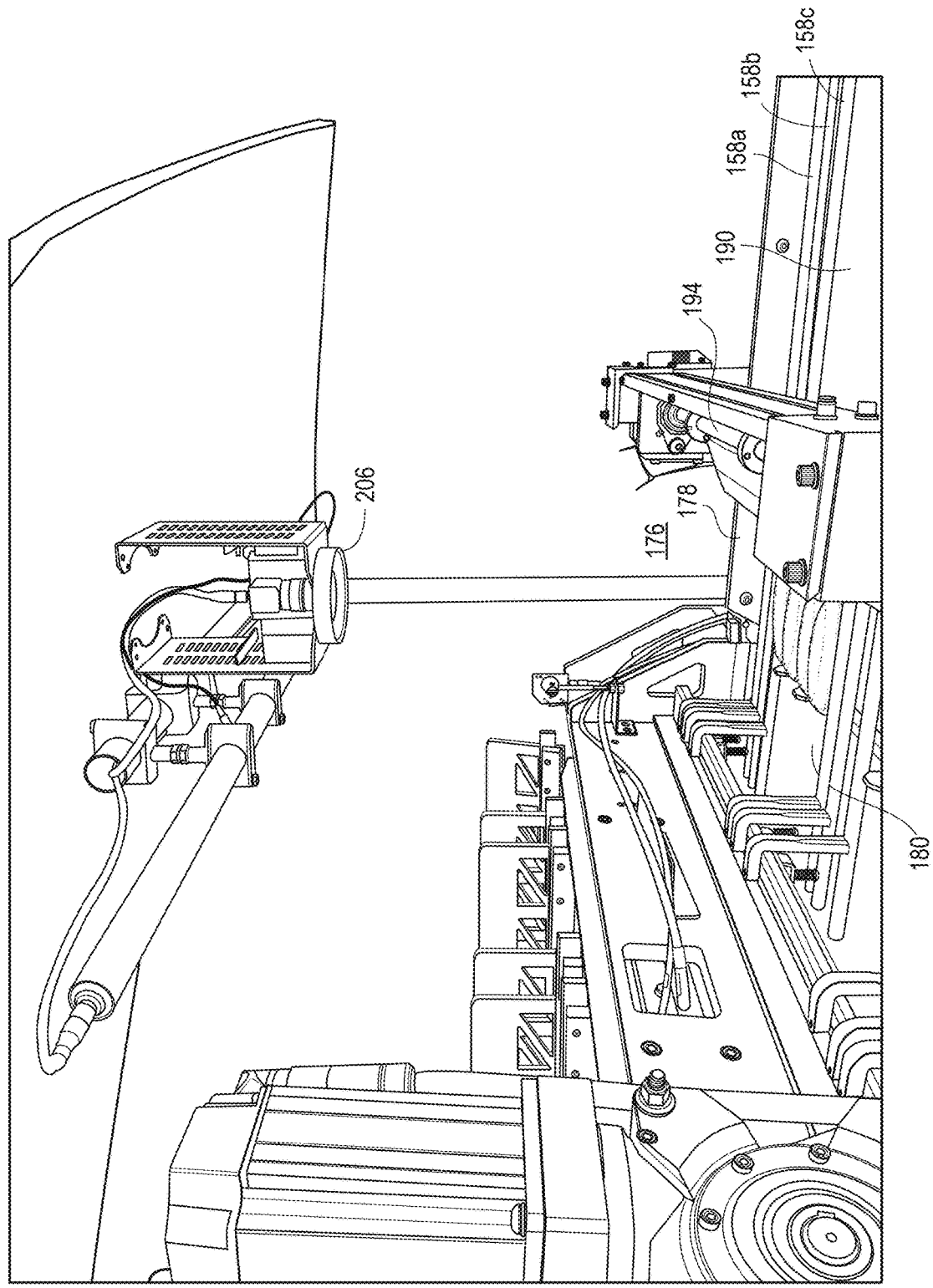
FIG. 12 shows a third perspective view of the holding conveyor station of FIG. 10.

As shown in FIGS. 10A, 11, and 12, the right cylindrical metal guides 158a-c, central cylindrical metal guides 160a-c, and left cylindrical metal guides 162a-c are positioned above the top surface of the conveyor belt 180. Accordingly, the guides 158, 160, and 162 define a left lane 188 and a right lane 190 in which the sets of hot dog buns travel. As shown in FIGS. 10A, 11, and 12, the holding conveyor station 176 includes a holding mat 192 that is supported above the lanes by a rotatable shaft 194. The holding mat 192 has a mat 196 folded upon itself, wherein the front and back edges contact one another and are attached to one another by bolts 198 of a metal flange 200. The metal flange 200 is attached to the rotatable shaft 194. The function of the holding mat 192 will be discussed later.

Just past the front end 184 of the conveyor belt 180 are a plurality of movable gates 202 (one per lane for single hot dog buns and single hamburger buns and up to twelve in number if twelve lanes are present for single buns; two per lane for sets of hot dog buns (see FIG. 10) and sets of hamburger buns) that when in an up position prevent sets of hot dog buns 130 from moving past the conveyor belt 180 to the lane balancer station 204 to be discussed hereafter. As shown in FIG. 10A, each gate 202 is made of metal, has a square-like body, and has a rounded top surface. When the movable gates 202 are in a down position, the sets of hot dog buns 130 are allowed to pass to the lane balancer station 200. Operation of the gates 202 will be discussed hereafter. Note that the conveyor belt 180 is moving at a constant speed during the processes mentioned above.

Figure 5I:
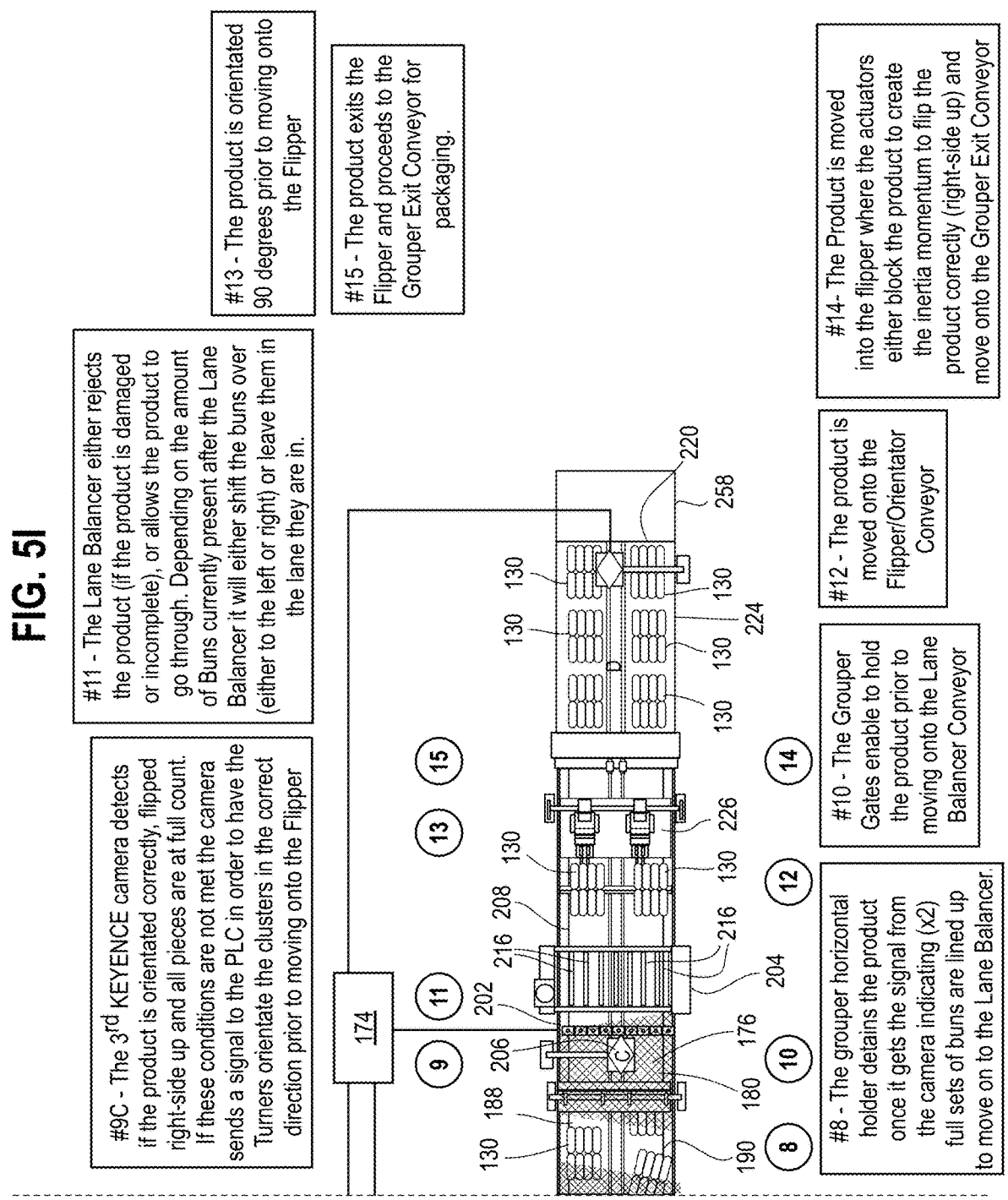
FIG. 5I shows a right portion of the top schematic view of FIG. 5.

As shown in FIG. 5 (see right portion of the top view of FIG. 5 as shown in FIG. 5I), 11, and 12, a digital camera 206 is positioned above the top surface of the conveyor belt 180 and located above and just before the gates 202. The digital camera 206 is similar to the digital cameras 170 and 172 discussed previously, but regards model C8-200C made by Keyence, which has a different mode high speed lens and is able to break up the image into four measurement zones, wherein the number of measurement zones depends on the type of product being imaged. The ability to analyze four measurement zones allows for detection of misalignment of partial sets of hot dog buns 130 while in the holding conveyor station 176. In operation, the digital camera 206 generates digital images of a target area of the top surface of conveyor belt 180 located between the holding mat 192 and the lane balancer station 204 and any sets of hot dog buns 130 lying in the target area. The digital camera 206 is programmed to analyze each of the measurement zones and perform the following measurements and calculations: 1) measure presence of a set of hot dog buns in a lane of the target area; 2) measure the color of a set of hot dog buns to be used for determining whether the set of hot dog buns is right-side up or upside down; 3) calculate whether a portion of the set of hot dog buns 130 is missing or misshaped; and 4) calculate orientation of the set of hot dog buns 130.

Figure 1B:
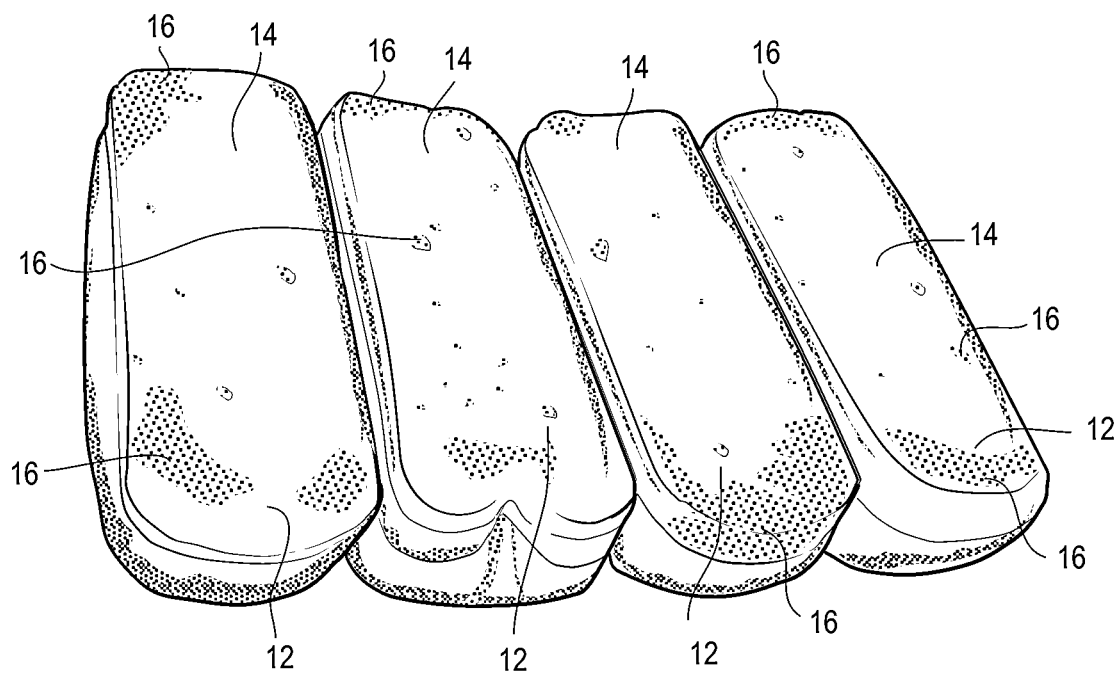
FIG. 1B shows a bottom perspective view of the bottoms of typical hot dog buns.

One thing the digital camera 206 does with the digital images is to determine whether sets of hot dog buns 130 exist in any of the lanes of the target area. Such a determination is done by measuring the color value a pixel in the middle of a lane and near the gate(s) 202 associated with the lane. If the value of the color of the pixel is a brown value found on either a bottom 14 (see FIG. 1B) or a top (see FIG. 1A) of a set of hot dog buns 130, then that indicates that a set of hot dog buns 130 is present in the lane and adjacent to the gate(s) 202 associated with the lane. This measurement process is performed by the camera 206 for each lane of the target area. Note that when a set of hot dog buns 130 is determined to be in the lane, the camera 206 associates a unique tag/identification with that set of hot dog buns 130.

After the digital camera 206 determines the presence of a set of hot dog buns 130 in a lane and associates a unique tag/identification with that set of hot dog buns 130, the digital camera 206 determines from the pixels of the image of the set of hot dog buns 130 whether the surface of the set of hot dog buns 130 facing the digital camera 206 has the white patches 16 and/or lighter brown color discussed previously with respect to FIG. 1B. In particular, the digital camera 206 looks at a color value of a pixel located at the center of the set of hot dog buns 130 and determines whether the side of the set of hot dog buns 130 facing the digital camera 206 is right-side up or upside down by comparing the color values of the side being examined with the known color values for a side being right-side up. If the color values of the side are sufficiently different than the known color values, then the set of hot dog buns 130 being analyzed is identified to be upside down. Otherwise, the set of hot dog buns 130 is identified to be right-side up. The above analysis takes into account that either side of the set of hot dog buns 130 will have brown color values, wherein there are a range of brown colors from a first threshold value to below a second threshold value that are the light brown colors of a bottom of the set of hot dog buns 130. Brown values at or above the second threshold value are the darker brown colors of a top of the set of hot dog buns 130. Thus, if a color pixel has a value at or above the first threshold value and below the second threshold, then detection of that color pixel denotes that camera 206 is facing an upside-down set of hot dog buns 130. Similarly, if a color pixel has a brown value at or above the second threshold value, then detection of that color pixel denotes that camera 206 is facing a right-side up set of hot dog buns 130. During this process, the camera 206 assigns a flag to the previously described unique tag or identifier associated with the set of hot dog buns 130, wherein the flag indicates whether the corresponding set of hot dog buns is right-side up or upside down. Such information is sent to the PLC 174.

Besides determining which ones of the sets of hot dog buns 130 are upside down, the digital camera 206 processes the digital image of the sets of hot dog buns 130 within the target area to see whether there are any sets of the hot dog buns 130 that are missing one or more hot dog buns or have a damaged hot dog bun. In this case, the digital camera 206 counts for each set of hot dog buns 130 the number of pixels that have a color value that is different from the color value of the conveyor belt 180 of the target area (such as the brown pixel values of the imaged right-side up hot dog buns and the lighter brown pixel values and white pixel values of the imaged upside-down hot dog buns). Each pixel defines an area and so the count of color values is calculated by the digital camera 206 to be the area of the set of hot dog buns 130 being imaged. If the calculated area is less than 80% of the average surface area of a top or bottom portion of complete set of hot dog buns 130, then the digital camera 206 designates the set of hot dog buns 130 as not acceptable for packaging (it is missing one or more hot dog buns and/or one or more hot dog buns are misshapen). During this process, the digital camera 206 assigns to each unique tag or identifier for each set of hot dog buns 130 a flag indicating whether or not the set of hot dog buns 130 is acceptable for packaging. Such information is sent to the PLC 174.

Figure 2:
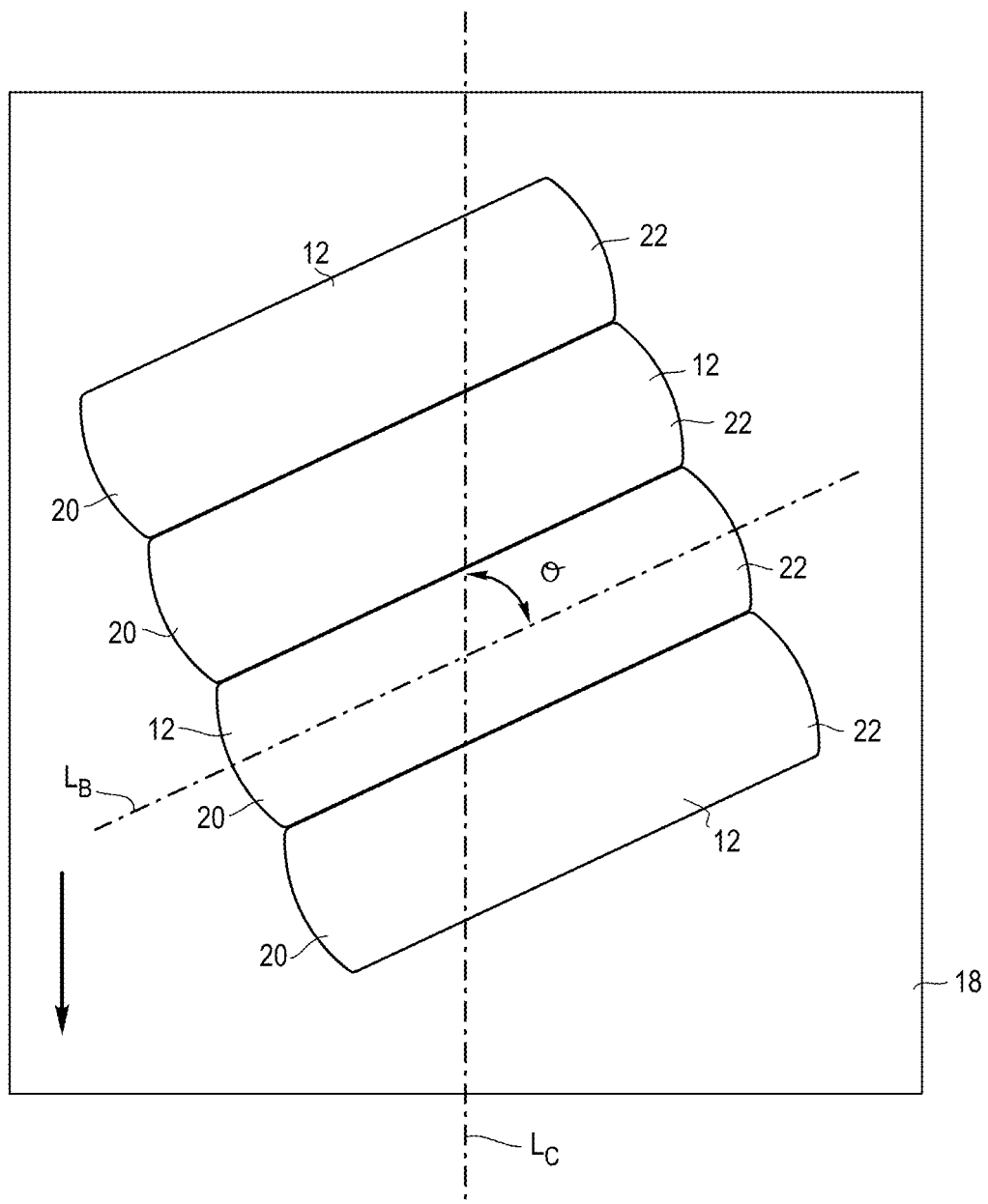
FIG. 2 schematically shows the orientation of a set of four hot dog buns relative to an axis of a conveyor.

The digital camera 206 also processes the digital image of the target area to determine whether each set of hot dog buns 130 is properly oriented to have an angle θ of approximately 0°, such as ±1° to 2° as defined previously with respect to FIG. 2. In particular, for each detected set of hot dog buns 130, the digital camera 206 calculates an angle between a longitudinal axis of the lane in which set of hot dog buns 130 lies and longitudinal axis defined by pixels of a hot dog bun of the set of hot dog buns 130. If the digital camera 206 determines that a set of hot dog buns 130 is not properly aligned, then the digital camera 206 will designate the set of hot dog buns 130 as not being properly oriented. It is believed that most sets of hot dog buns 130 that are identified as not being properly oriented will have an angle θ of approximately 90°. Note that the above-described determination of orientation is not performed for single hot dog buns and symmetric groups of buns (2×2, 3×3, etc.) since the guides 158, 160, 162 help to align such hot dog buns in a proper orientation. During this process, the digital camera 206 assigns to each unique tag or identifier for each set of hot dog buns 130 a flag indicating whether or not the set of hot dog buns 130 is properly oriented. Such information is sent to the PLC 174.

Besides each of the sets of hot dog buns 130 within the target area being categorized by the digital camera 206 as to whether it is: 1) present; 2) upside down; 3) unacceptable for packaging; and 4) oriented properly, each set of hot dog buns 130 in the target area is identified whether or not it is in a lane that needs to be balanced by the lane balancer station 204. As mentioned previously with respect to FIGS. 5A-D, such balancing pertains to the distribution of sets of hot dog buns 130 present on the conveyor belt 150. The lane balancer station 204 performs balancing in addition to the balancing performed by the metering balancer station 120 by either 1) allowing sets of hotdog buns 130 in the lanes of the target area and at the gates 202 to continue in those lanes on to the turning station 226 to be described hereinafter or 2) be shifted one or more lanes and passed on to the turning station 226.

In an alternative embodiment, digital camera 206 is replaced by a linear array of high resolution, high accuracy, high speed photo eyes or photoelectric sensors 207, wherein the array is positioned perpendicular to the direction of travel of the conveyor belt 150. The linear array can have approximately 15 photo eyes or photoelectric sensors 207. The linear array of photo eyes or photoelectric sensors 207 is positioned between the gates 202 and the lane balancer station 204. The linear array is positioned approximately 10.7 cm above the conveyor belt 208 and each photoelectric sensor 207 is spaced approximately 1.5 inches from adjacent photoelectric sensors 207. An example of a photo eye or photoelectric sensor 207 that can be used is the diffuse laser sensor sold under the LR-XH100 Laser Sensor name made by Keyence. Each of the photo eyes or photoelectric sensors 207 is in electrical communication with the PLC 174.

Note that depending on the type of food item being processed, certain ones of the linear array of photo sensors 207 are made operational. A rule to keep in mind is that for a particular food item being processed, there will be a certain number of lanes for the food items to travel along and there will be a photo sensor 207 associated with each lane to process food items that pass below in the lane. For example, if the food item is single hot dog buns, then there are 15 lanes of the conveyor belt 208 for the single hot dog buns to pass along and so there will be 15 photoelectric sensors 207 made operational, wherein a first photoelectric sensor 207 corresponds to a first lane, a second photoelectric sensor 207 corresponds to a second lane, and this continues so that a fifteenth photoelectric sensor 207 corresponds to the fifteenth lane. Similarly, if the food item is a cluster of four hot dog buns 130, then there will be two lanes of conveyor belt 208 for the clusters to pass along and thus, two of the fifteen photoelectric sensors 207 are made operational, wherein each operational photoelectric sensor 207 is positioned over a corresponding one of the two lanes of conveyor belt 208. In the case of single hamburger buns being processed, there will be four lanes of conveyor belt 208 for the clusters to pass along and thus, four of the fifteen photoelectric sensors 207 are made operational, wherein each operational photoelectric sensor 207 is positioned over a corresponding one of the four lanes of conveyor belt 208. When a cluster of four hamburger buns are being processed, two lanes of conveyor belt 208 for the clusters to pass along and thus, two of the fifteen photoelectric sensors 207 are made operational, wherein each operational photoelectric sensor 207 is positioned over a corresponding one of the two lanes of conveyor belt 208.

While each operational photo eye or photoelectric sensor 207 can take up to 600 readings on a sample, in practice, each operational photo eye or photoelectric sensors 207 takes from 100 to 200 readings or samples of the height and profile during the time a corresponding cluster of hot dog buns 130 passes the corresponding sensor 207 below. In this process, a single operational sensor 207 generates readings for only those clusters of hot dog buns 130 that pass below the sensor 207. The same process can be applied to individual hot dog buns, clusters of hamburger buns, or individual hamburger buns that replace the clusters of hot dog buns 130. In summary, the process generally involves each operational sensor 207 reading a unique single point on a front end of the exterior surface of the product facing the operational sensor 207 and being scanned initially as the product initially approaches and moves under the operational sensor 207. As the product continues to pass under the operational sensor 207, the operational sensor 207 continues to read additional discrete single points on the exterior surface of the product from the front end to the rear end of the product as the product passes under the operation sensor. Thus, a complete scan of discrete points on the exterior surface of the product is taken along a line parallel to the direction of travel of the conveyor belt 208. While taking a complete scan along the center of the product is preferred, scans taken at other portions of the product are possible so as to determine whether the product is right side up or upside down. The PLC 174 capture the readings (approximately 200) from each operational sensor 207 to generate a line profile for each product passing under an operational sensor 207.

From the readings or samples taken by the operational photo eyes or photoelectric sensors 207, a height profile for each food item passing below the operational sensors 207 is generated. In particular, the operational sensors 207 determine the distance from the operational sensors 207 to the conveyor belt 208 and distances from the operational sensors 207 to various single scanned points taken along an exterior surface of a slice or exterior line of the food item taken in a direction parallel to the direction of travel of the conveyor belt 208. The determination of distances from a sensor 207 to an object passing below the sensor 207 is well known. For example, the sensor 207 itself can determine the object height by using laser technology to detect objects within its operational range. By emitting a laser beam and measuring the intensity of the reflected signal, the sensor 207 can determine the distance and presence of objects with high precision. This distance determination and detection of the presence of objects is all done within the functionality of the sensor 207. With the determined distances, the height of each scanned point of the product is determined by subtracting the measured distances to the food item from the distance to the conveyor belt 150. Thus, a height profile of the food item can be generated. Examples of height profiles of a single hot dog bun 130 are shown in FIGS. 11A-C, wherein over 200 samples are taken of the hot dog bun 130 while under the sensors 207.

Figure 11A:
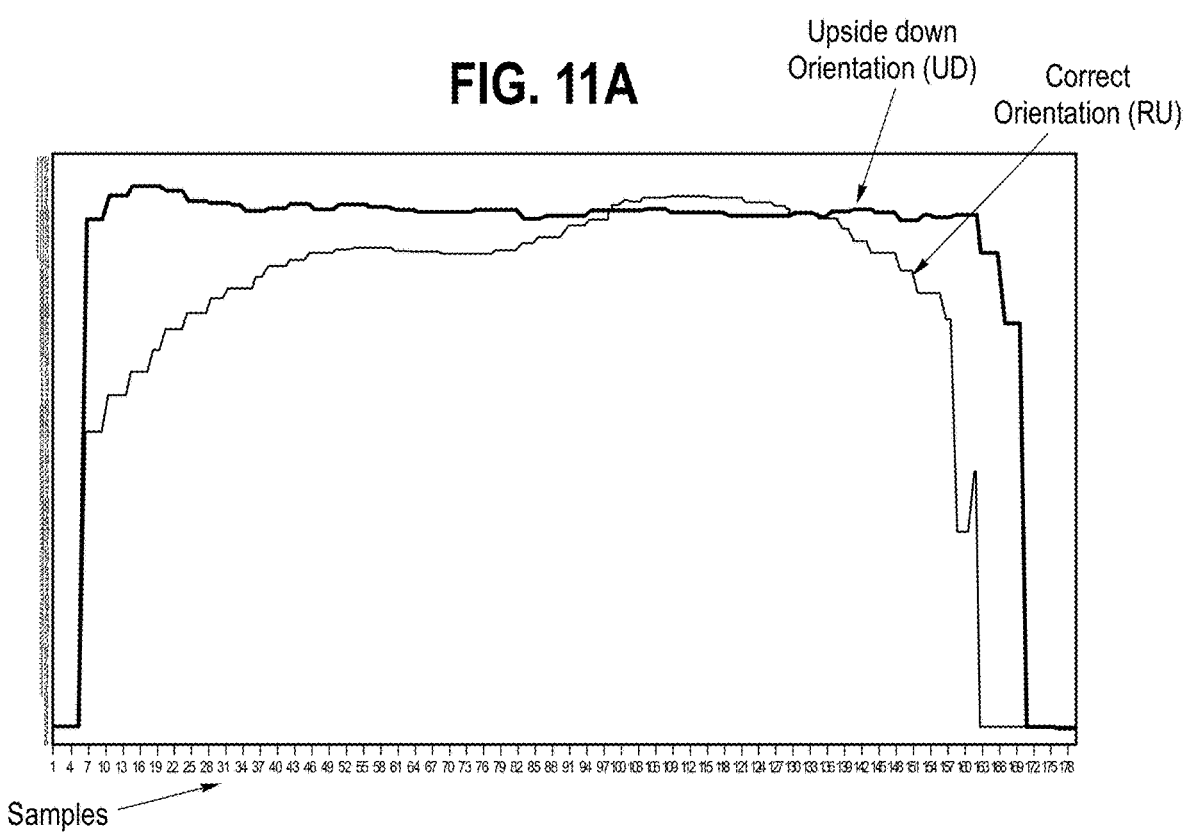
FIG. 11A shows a first set of possible height profiles of a hot dog bun as measured by an array of photo eyes or photoelectric sensors in accordance with the present invention.
Figure 11B:
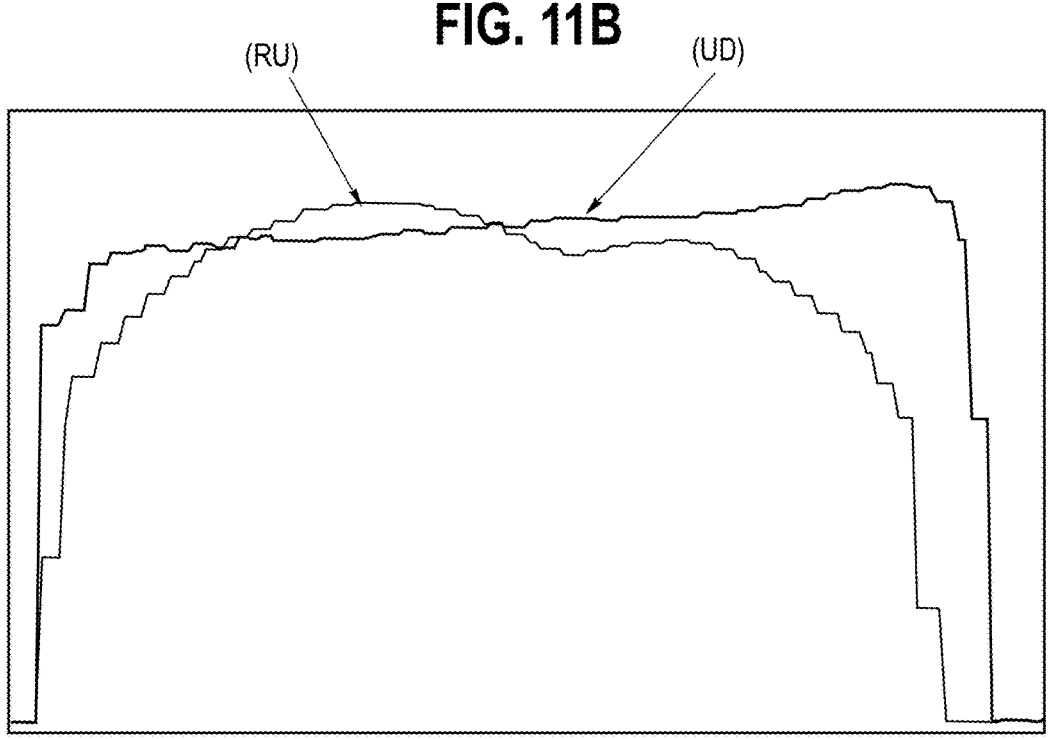
FIG. 11B shows a second set of possible height profiles of a hot dog bun as measured by an array of photo eyes or photoelectric sensors in accordance with the present invention.
Figure 11C:
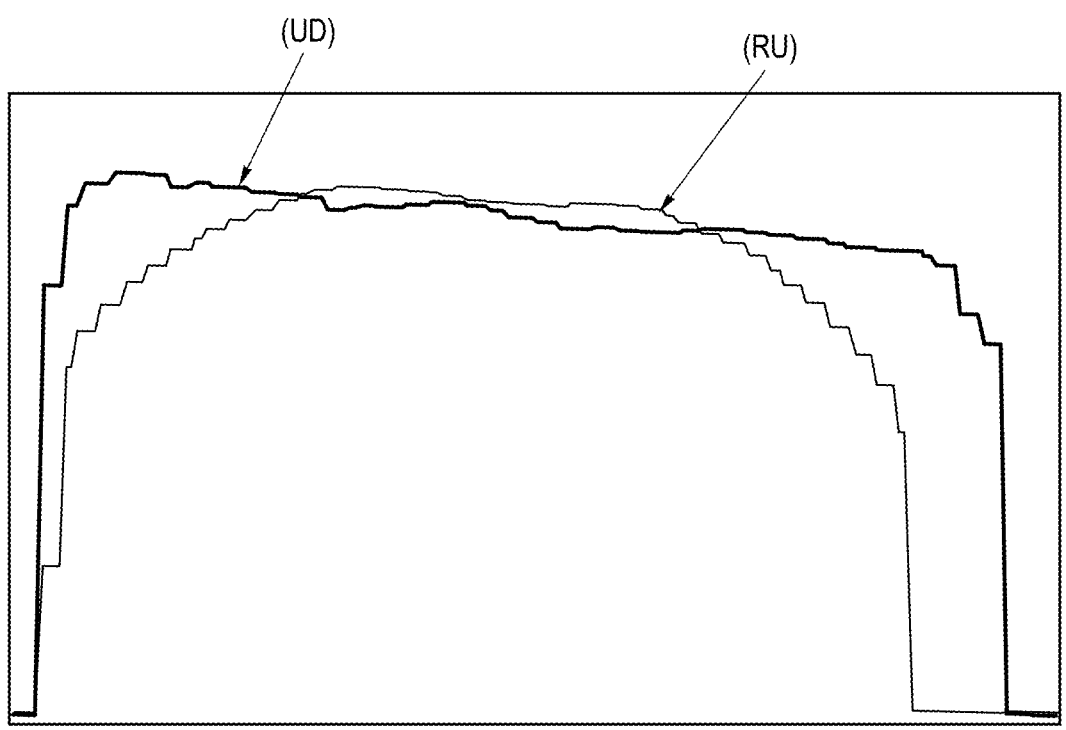
FIG. 11C shows a third set of possible height profiles of a hot dog bun as measured by an array of photo eyes or photoelectric sensors in accordance with the present invention.

As shown in FIGS. 11A-11C, the profiles labeled RU (Right-side Up) are curved between the left and right edges of the profile. This reflect that a right-side up hot dog bun has a curved profile at its top portion. The profiles labeled UD (Upside Down) are essentially flat between the left and right edges of the profile. This reflects that an upside down hot dog bun has an essentially flat shape at its top portion. The above description regards the situation where a visual review of a profile is used to make a visual determination whether the hot dog bun is right side up or upside down. A mathematical determination can also be performed as described below.

Figure 11D:
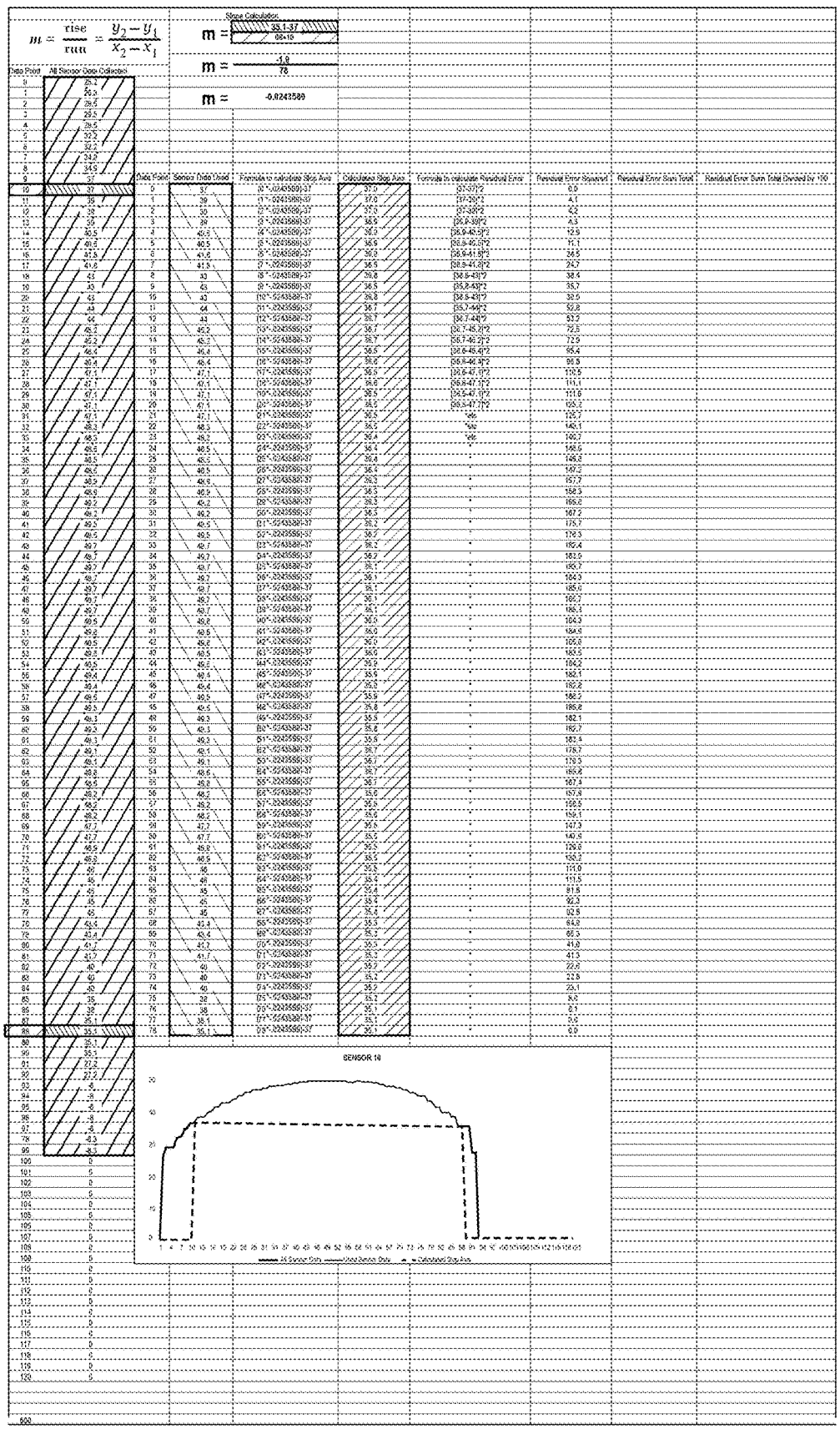
FIG. 11D shows a table of possible measurements and calculations for determining whether a hot dog bun is right side up or upside down based on a height profile in accordance with the present invention.
Figure 11F:
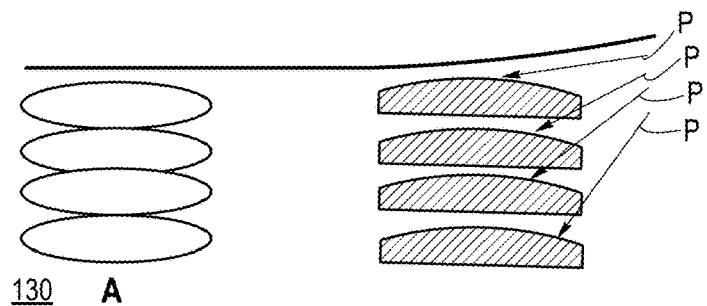
FIG. 11F schematically shows a cluster of hot dog buns A of FIG. 11E and its height profile as measured by an array of photo eyes or photoelectric sensors in accordance with the present invention.

FIG. 11D shows an example of a height profile with a corresponding table of measurements and calculations for determining whether a hot dog bun is right side up or upside down. The principles described below can be applied to other single products, such as a hamburger bun. As shown in the height profile, the determination is based on the data after 10% of the readings to the left and right of the central reading are eliminated. That leaves 80% of the readings to make the determination. The 10% points are represented by the upper left and right edges of the trapezoidal, or, in some instances, rectangular profile shown. Any data to the left of the vertical left leg of the trapezoidal or rectangular profile or to the right of the vertical right leg of the trapezoidal or rectangular profile is discarded or not used in the calculations to be described. With the two 10% points established, the determination will be based on a comparison of the actual height readings made by an operational sensor 207 (fourth column from the left of FIG. 11D and height readings between the two 10% points) with virtual readings calculated as described herein. As shown in FIG. 11D, the far left column represent the identification numeral of one of the readings taken on the surface of the hot dog bun. Up to 600 readings can be made, depending on the size of the food item. The next column to the right represents the calculated height corresponding to each reading. Since the readings near the front and rear ends of the height profile of the hot dog bun are less reliable, ten percent of the readings at either end of the height profile are removed/deleted from consideration as represented by the next two columns. The remaining height profile data regards the data from the left top edge of the trapezoidal or rectangular profile described previously to the right top edge of the trapezoidal or rectangular profile as shown in FIG. 11D. Note that the percentage of readings not considered is variable depending of the length of the hot dog bun and is chosen to provide data/readings centered on the hot dog bun analyzed. When the beginning point and end point of the readings are defined, the slope is then calculated in a well-known manner with respect to adjacent ones of such remaining points. Examples of such calculations are shown in the fifth and sixth columns of the table of FIG. 11D. The calculated slopes are the basis for determining a virtual line profile that will be compared with the real height profile measured (fourth column of FIG. 11D). Using the virtual line profile determined, each data point/reading collected by the sensors 207 as the hot dog bun passes thereunder is compared by the PLC 174 so as to calculate a residual error (difference) between the virtual line profile (sixth column of FIG. 11D) and the real height profile (see subtraction portion of calculation shown in fourth column of FIG. 11D) of the hot dog bun as shown in the seventh column of the table of FIG. 11D. With the objective of eliminating positive and negative differences and to refine the error analysis between the virtual line profile and the trapezoidal or rectangular height profile, each residual error is squared (see the eighth column of FIG. 11D) so as to filter out the negative values and exaggerating the error value, which can aid in distinguishing between different orientations of the hot dog bun. The squared error values are summed together (see ninth column of FIG. 11D) to obtain a comprehensive assessment of the overall error in the data analysis process. The cumulative error value is normalized by dividing it by 100 as shown in the tenth column of the table of FIG. 11D to make the cumulative error have a value that is more manageable for analysis. The resulting normalized cumulative error serves as an indicator of the orientation of the hot dog bun, wherein a higher error value indicates a higher likelihood that the product is right side up, while a value closer to zero suggests a higher likelihood of the hot dog bun being upside down. Typically, a normalized cumulative error that has a value that ranges from zero to approximately 10 denotes a hot dog bun that is upside down. When a determination is made as to whether the hot dog bun is right side up or upside down, the PLC 174 tags the hot dog bun with that characterization so that it can be processed by the flipping station 236 as will be described hereinafter.

Note that in the case of the hot dog bun being upside down, the hot dog bun is being supported on the conveyor belt 208 by the curved top surface of the hot dog bun. In such a situation, the hot dog bun has a tendency to tilt to one side or the other. With such tilting, the flat underside of the hot dog bun will be tilted and the measured height profile will look like an angled line. Steps can be taken to revise the profile for the upside down hot dog bun to diminish the effect of the tilting. The same principles regarding tilting can be applied when the food item is a single hamburger bun.

Besides single hot dog buns and single hamburger buns, the above described principles can be applied to clusters of food items that are connected to one another. Since such clusters are less likely to tilt when in an upside down position, the need for correction of tilting is less prevalent than for single food items. With the above said, FIG. 11E shows an example of where clusters of four hot dog buns 130 are being moved on conveyor belt 150 toward (see arrows) toward photo eyes and photoelectric sensors 207. As shown in FIG. 11E, some of the clusters are missing one or more hot dog buns (see dark ovals and cluster labeled B) and some of the clusters are misoriented (see clusters labeled C and D).

Figure 11G:
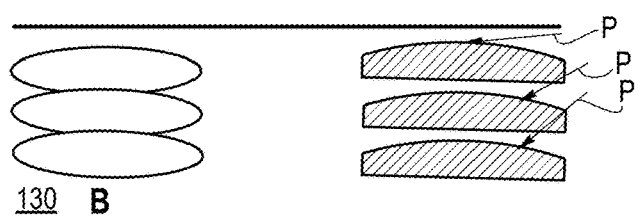
FIG. 11G schematically shows a cluster of hot dog buns B of FIG. 11E and its height profile as measured by an array of photo eyes or photoelectric sensors in accordance with the present invention.
Figure 11H:
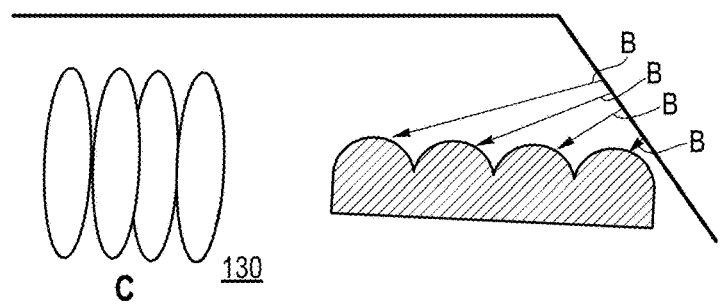
FIG. 11H schematically shows a cluster of hot dog buns C of FIG. 11E and its height profile as measured by an array of photo eyes or photoelectric sensors in accordance with the present invention.
Figure 11I:
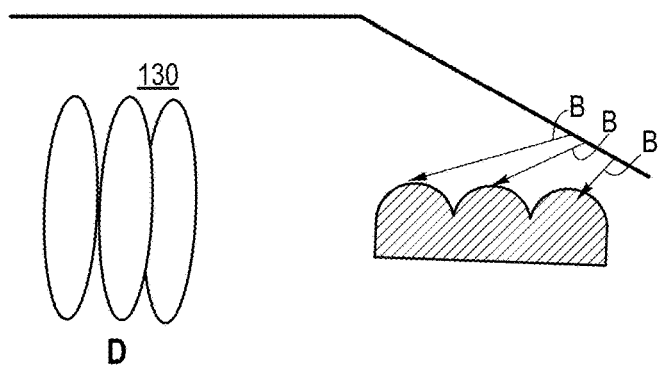
FIG. 11I schematically shows a cluster of hot dog buns D of FIG. 11E and its height profile as measured by an array of photo eyes or photoelectric sensors in accordance with the present invention.

Regarding the example of FIG. 11E, exemplary profiles for the hot dog bun clusters labeled A, B, C, and D are shown in FIGS. 11F-11I, respectively. Since this example regards the situation where there are four hot dog buns in a cluster, there will be one operational sensor 207 in each of the two lanes of conveyor belt 208 as described previously, wherein each operational sensor 207 will provide readings for a corresponding hot dog bun cluster that passes below the sensor 207. In the example of an acceptable cluster denoted as cluster A shown in FIG. 11F, four longitudinal profiles (P)

are generated wherein the top portion of each profile is curved from left to right denoting that the cluster is right-side up. The profile for cluster B shown in FIG. 11G shows only three longitudinal profiles like that shown in FIG. 11F and so the profile shows that one hot dog bun is missing. Cluster C regards the situation wherein the cluster is right-side up and the cluster is misaligned by 90°. With the 90° misalignment, the profile shown in FIG. 11H shows a curved top bump (B) corresponding to each hot dog bun in the cluster. In the case of cluster D and its profile shown in FIG. 11I, only three top bumps are present in the profile and so there are three hot dog buns present in the cluster. Thus, one hot dog bun is missing in cluster D. Besides using the profile to determine whether hot dog buns are missing in clusters, the profile can also be used to identify clusters that are severely damaged.

Figure 11J:
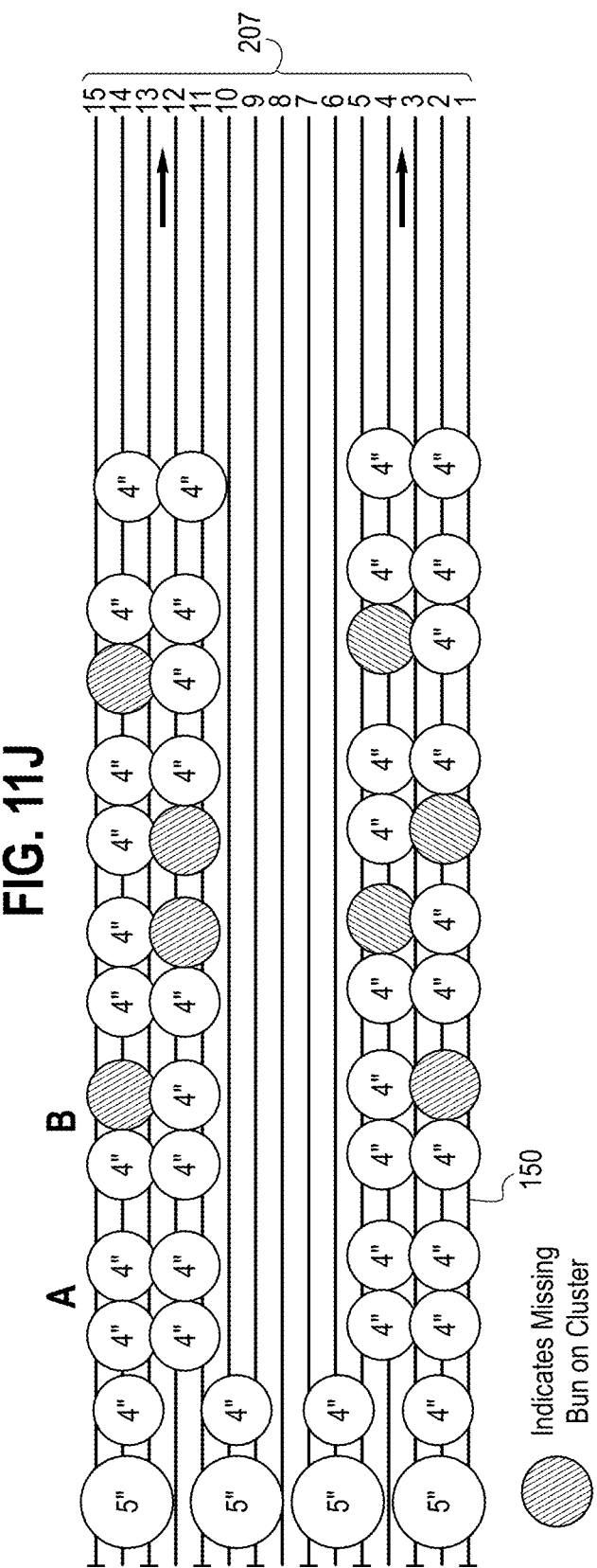
FIG. 11J schematically shows various clusters of hamburger buns prior to being scanned by an array of photo eyes or photoelectric sensors in accordance with the present invention.

A similar process for evaluating clusters of hamburger buns can be employed. In particular, FIG. 11J shows an example of where clusters of four hamburger buns are being moved on conveyor belt 150 toward (see arrows) toward photo eyes and photoelectric sensors 207. As shown in FIG. 11J, some of the clusters are missing one or more hamburger buns (see dark circles and cluster labeled B).

Figure 11L:
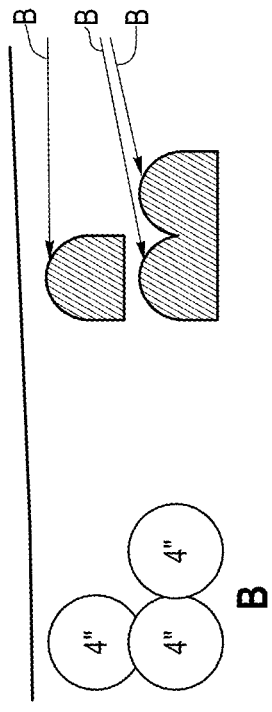
FIG. 11L schematically shows a cluster of hamburger buns B of FIG. 11J and its height profile as measured by an array of photo eyes or photoelectric sensors in accordance with the present invention.
Figure 11K:
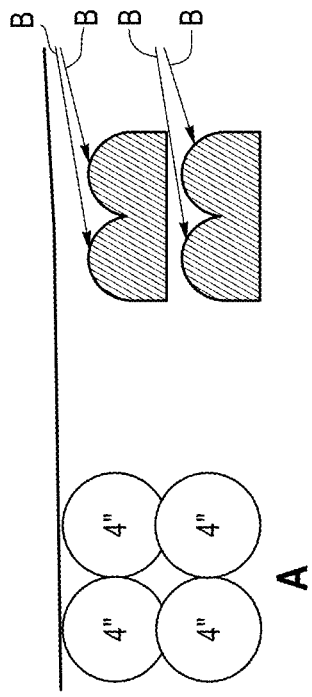
FIG. 11K schematically shows a cluster of hamburger buns A of FIG. 11J and its height profile as measured by an array of photo eyes or photoelectric sensors in accordance with the present invention.

Regarding the example of FIG. 11J, the exemplary profiles for the hamburger bun clusters labeled A and B are shown. In the example of an acceptable cluster denoted as cluster A, two longitudinal profiles (P) are generated as shown in FIG. 11K, wherein the top portion of each profile has two curved bumps (B) denoting that the cluster is right-side up and there are two rows of hamburger buns, wherein each row has two hamburger buns. The profile for cluster B as shown in FIG. 11L shows one row with two bumps and another row with only one bump. Thus, one hamburger bun is missing. Besides using the profile to determine whether hamburger buns are missing in clusters, the profile can also be used to identify clusters that are severely damaged.

Note that while the profiles shown in FIGS. 11E-K show food items in a right side up orientation, the principles described above apply equally when the food items are upside down. Of course, if a food item is deemed upside down, it can be flipped to be right side up by the flipping station 236 in the manner to be described subsequently.

In summary, the implementation of sensors 207 allows for the determination of the orientation of individual food items and clusters of food items by evaluating their profiles. Such information can be used by the PLC 174 to determine whether the food items need to be rejected or reoriented by turning or flipping the food items by using one or more of the lane balancer station 204 and the reuse and/or refuse/trash bin, the turning station 226, and the flipping station 236 in the manner described herein.

In an alternative embodiment, digital camera 206 is used as described previously and a linear array of photo eyes or photoelectric sensors 207 is employed and used as described previously. In this embodiment, the linear array of photo eyes or photoelectric sensors 207 is positioned between the gates 202 and the lane balancer station 204. In this embodiment, the digital camera system described previously is the main system and the photoelectric sensor system is the secondary system. In particular, the digital camera 206 measures the food items as described previously. Sometimes the baking process is such that the difference in color between the top and bottom sides of the food item is not great and so it is difficult to identify the top and bottom of the food item. When the PLC 174 determines that the difference in color between the top and bottom sides is not sufficient for determining orientation of the food item, then the PLC 174 uses the data from the photoelectric sensors 207 to generate a profile for the food item and determine whether the food item is upside down or not in the manner described previously. Whether the difference in color is sufficient can be left to the discretion of the operator of the system.

Delivery of the sets of hot dog buns 130 from the target area of the holding conveyor station 176 to the lane balancer station 204 is performed as follows. First, if any lanes of the target area contain sets of hot dog buns 130 adjacent to the gates 202 that have been identified not acceptable for packaging, the gates 202 for those lanes are lowered and the unacceptable sets of hot dog buns 130 in those lanes and adjacent to the gates 202 are fed into and processed by the lane balancer station 204 as described hereinafter. After the unacceptable sets of hot dog buns 130 enter the lane balancer station 204, the lowered gates 202 are raised to their up position.

After the unacceptable sets of hot dog buns 130 are processed by the lane balancer station 204, then for those sets of hot dog buns 130 at the gates 202 that are determined to accomplish balancing of sets of hot dog buns 130 by staying in their lanes, their corresponding gates 202 are lowered and the paddles 216 of the lane balancer station 204 are kept stationary so that the sets of hot dog buns 130 pass between the paddles 216 and are delivered to the turning station 226. After the sets of hot dog buns 130 pass the lowered gates 202, the gates 202 are raised to their up position.

For those sets of hot dog buns 130 at the gates 202 that are determined to accomplish balancing of sets of hot dog buns 130 by changing their lanes, their corresponding gates 202 are lowered, the sets of hot dog buns 130 travel past the gates 202 and between the paddles 216 of the lane balancer station 204, and the paddles 216 move so as to move the sets of hot dog buns 130 positioned between the paddles 216 to their new lanes. After the sets of hot dog buns 130 pass the lowered gates 202, the gates 202 are raised to their up position. Note that should there be sets of hot dog buns 130 at the gates 202 that need to stay in their lane for the sake of balancing and there are other sets of hot dog buns 130 at the gates 202 that need to shift lanes for the sake of balancing, the PLC 174 will determine which gates 202 are lowered and raised in order to achieve balancing of the sets of hot dog buns 130 on the conveyor 150.

FIG. 5E schematically illustrates a way of determining how to balance the conveyor 150 by using the lane balancer station 204. In the case of FIG. 5E, single hot dog buns are being processed and there are 12 lanes on the conveyor 150. FIG. 5E shows the total length value for each lane as calculated by the cameras 170 and 172. When there is a lane present that has a total length value that is 1.5 times the length of a single hot dog bun or less, then balancing of that lane is required to be performed by the lane balancer station 204. The lanes with the largest and smallest total length values are identified (lane 10 largest and lane 11 smallest) so as to identify primary tasks to be accomplished by balancing (decrease the length of the lane with the largest length value and increase the length of the lane with the smallest length value by receiving length from the lane with the largest length value). Balancing will be accomplished by shifting hot dog buns from large total length values to small total length values so that over several cycles of lower and raising of the gates 202, the total length values in each lane are similar in value. While it would be possible to shift hot dog buns from lane 1 to lane 11, such shifting is not optimal since it would lead to a large amount of time to shift the paddles 216 from lane 1 to lane 11. In this example, it would be more time efficient to shift hot dog buns from lane 10 to lane 11. Other possible lane shifts would be to shift hot dog buns from lanes 4, 8, and 10 to lanes 5, 9, and 11, respectively. Since such lane shifts are only one lane in magnitude, the balancing process is much more time efficient. The cameras 170 and 172 continuously calculate and monitor the total length values for each lane and the PLC 174 controls the gates 202 and lane balancer station 204 in order to define optimum moves to achieve balancing of the hot dog buns on the conveyor belt 150 without minimizing cycle times of the balancing process.

The balancing performed by the lane balancer station 204 can be understood by reviewing the balancing process schematically shown in FIGS. 5F and 5G for single hot dog buns. In the first phase (labeled Groups 1), there are 9, 7, 7, 5, 7, 7, 7, and 7 single buns in lanes 1-8, respectively. The gates for lanes 1 and 5-8 are lowered allowing single buns (denoted A) at the gates to move to the lane balancer station 204. Once the single buns for lanes 1 and 5-8 pass the gates, the gates for lanes 1 and 5-8 are raised to the up position. Single buns (denoted B) are directed to the gates 1-3 and the first phase of the balancing process is complete, wherein there are now 8, 7, 7, 5, 6, 6, 6, and 6 single buns in lanes 1-8, respectively.

In the second phase of balancing, gates 1-3 are lowered and gates 4-8 are maintained in the up position. During this process, the single buns in lanes 1 and 5-8 of the lane balancer station 204 pass through the lane balancer station 204 without being shifted to another lane. In addition, the single buns from gates 1-3 move to lanes 1-3 of the lane balancer station 204 and are each shifted one lane to lanes 2-4. Once the single buns for lanes 1-3 pass the gates, the gates for lanes 1-3 are raised to the up position. Single buns are directed to the gates 1 and 5-8 and the second phase of the balancing process is complete, wherein there are now 7, 6, 6, 5, 6, 6, 6, and 6 single buns in lanes 1-8, respectively. Since the numbers in the lanes are not equal, further balancing is needed.

As shown in FIG. 5F, the above two phases are repeated (labeled Groups 2). In the third phase, there are 7, 6, 6, 5, 6, 6, 6, and 6 single buns in lanes 1-8, respectively. The gates for lanes 1 and 5-8 are lowered allowing single buns (denoted A) at the gates to move to the lane balancer station 204. Once the single buns for lanes 1 and 5-8 pass the gates, the gates for lanes 1 and 5-8 are raised to the up position. Single buns (denoted B) are directed to the gates 1-3 and the third phase of the balancing process is complete, wherein there are now 6, 6, 6, 5, 5, 5, 5, and 5 single buns in lanes 1-8, respectively. Since the number of buns in each lane are still unequal, further balancing is required.

In the fourth phase of balancing, gates 1-3 are lowered and gates 4-8 are maintained in the up position. During this process, the single buns in lanes 1 and 5-8 of the lane balancer station 204 pass through the lane balancer station 204 without being shifted to another lane. In addition, the single buns from gates 1-3 move to lanes 1-3 of the lane balancer station 204 and are each shifted one lane to lanes 2-4. Once the single buns for lanes 1-3 pass the gates, the gates for lanes 1-3 are raised to the up position. Single buns are directed to the gates 1-8 and the fourth phase of the balancing process is complete, wherein there are now 5, 5, 5, 5, 5, 5, 5, and 5 single buns in lanes 1-8, respectively. With equal numbers of single buns in each lane, the conveyor belt 150 is balanced. In addition, two groups of single buns for lanes 1-8 are directed to the bagger.

As shown in FIGS. 5F and 5G, phases 5-9 (denoted Groups 3-7 in the figures) are performed, wherein each phase entails lowering the gates at lanes 1-8 and having the single buns in lanes 1-8 pass through the lane balancer station 204 without being shifted in their lanes by the lane balancer station 204 and passing on to the bagger since the number of single buns in each lane are equal at the start of the phase. After the single buns pass through the gates, the gates are received and single buns line up in lanes 1-8 and signaling the end of phase 5. The above described phase 5 is repeated four more times as shown in FIGS. 5F-G and resulting in one bun-being in each of lanes 1-8. Note that during the above balancing processes, the cameras 170 and 172 are continually monitoring the food items on the conveyor belt 150 to see whether the numbers in each lane become unequal and so balancing is required by lane balancer station 204.

As shown in FIG. 13, the lane balancer station 204 includes a conveyor belt 208 similar to conveyor belt 180 described previously. Note that when balancing is performed by the lane balancer station 204, the conveyor belt 208 is slowed down so that lane changing is achieved. For a portion of the conveyor belt 208, there are no guides present. At the rear portion of the conveyor belt 208, right metal guides 210a-c, central metal guides 212a-c, and left metal guides 214a-c are positioned above the top surface of the conveyor belt 208. The right metal guides 210a-c, the central metal guides 212a-c, and the left metal guides 214a-c are generally aligned with right guides 158a-c, central guides 160a-c, and left guides 162a-c, respectively, so that they define lanes. As shown in FIG. 13, there is a gap formed on the conveyor belt 208 between the right guides 158 and 210, the central guides 160 and 212, and the left guides 162 and 214. In this gap are positioned paddles 216 that are made of Acetal and grouped in pairs. For each pair of paddles 216 and in the case that the food being packaged is the set of hot dog buns 130, the paddles 216 are separated from one another by approximately 12 inches for sets of hot dog buns 130 as measured along a direction perpendicular to the direction of travel of the conveyor belt 208. In addition, adjacent pairs of paddles 216 are separated from one another by a distance of approximately 9 inches, wherein the distance is the distance between the paddles 216 of the adjacent pairs that are nearest to one another and as measured along the direction perpendicular to the direction of travel of the conveyor belt 208. The distance between adjacent pairs of paddles 216 allows for a set of hot dog buns 130 to be positioned therebetween. The pairs of paddles 216 are arranged on a conveyor 218 that is positioned above the conveyor belt 208 and move left or right along a direction perpendicular to the direction of travel of the conveyor belt 208. The conveyor is 218 is controlled by a servo motor 186, which is controlled by the PLC 174. The PLC 174 and the servo motor 186 are able to rotate the conveyor 218 such that the pairs of paddles 216 are positioned at the correct place above the conveyor belt 208 at the correct time.

Note that in the case of other foods being packaged, such as single hot dog buns, or sets of hot dog buns with 2 or 3 buns, or single hamburger buns, or sets of hamburger buns with 2, 3, or 4 hamburger buns, the separation between the paddles 216 of a pair of paddles and distance between the adjacent pairs of paddles are varied dependent on the size of the food being packaged. Adjustment of such separation and distance is accomplished by removing paddles or inserting paddles to accomplish the desired separation and distance for all pairs of paddles.

As discussed previously, lanes of sets of hot dog buns 130 enter the lane balancer station 204 from the gates 202 to be processed. After the lanes of sets of hot dog buns 130 are processed by the lane balancer station 204, the sets are moved to the turning station 226 and then the next lanes of sets of hot dog buns 130 are delivered to and processed by the lane balancer station 204. As shown in FIGS. 5A-5D, 5F-5G, gates 202 are being raised and lowered so as to selectively allow sets of hot dog buns 130 to be processed by the lane balancer station 204 as discussed below. Note that when the gates 202 are raised the holding mat 192 is rotated to a raised position so as to allow sets of hot dog buns 130 to enter the target area so that they can be analyzed and tagged by camera 206 in the manner described previously. In this situation, when the target area is filled with sets of hot dog buns, the PLC 174 will rotate the holding mat 192 to a lower position, which causes the holding mat 192 to trap the sets of hot dog buns 130 in the target area. The above process will repeat after gates 202 are raised for the next time. Note the conveyor belt 180 is always running at a constant speed while the previously described processes within the holding conveyor station 176 are performed.

Figure 10B:
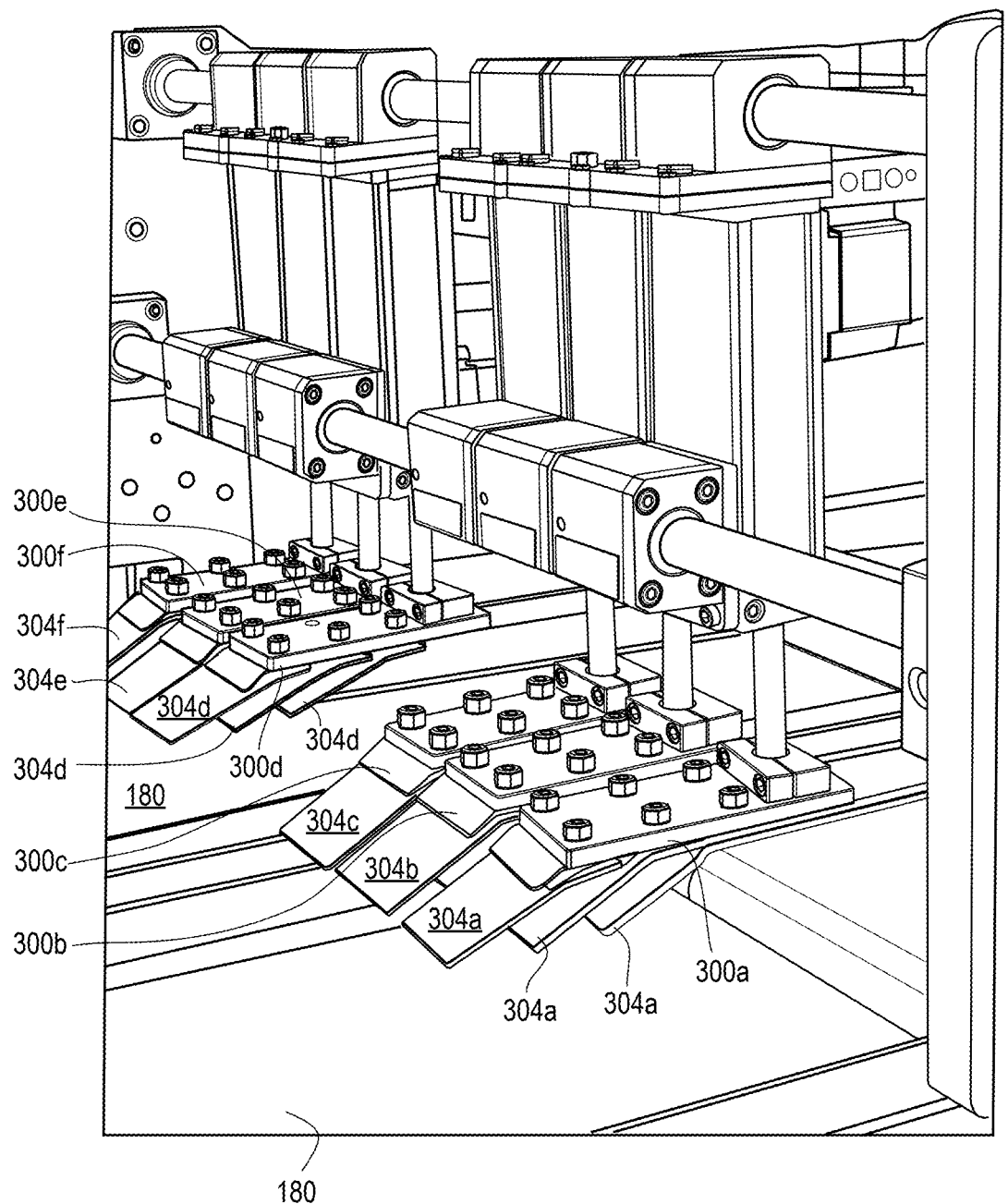
FIG. 10B shows a perspective view of an embodiment of a set of contacts that can be used with the delivery system of FIG. 3.
Figure 10C:
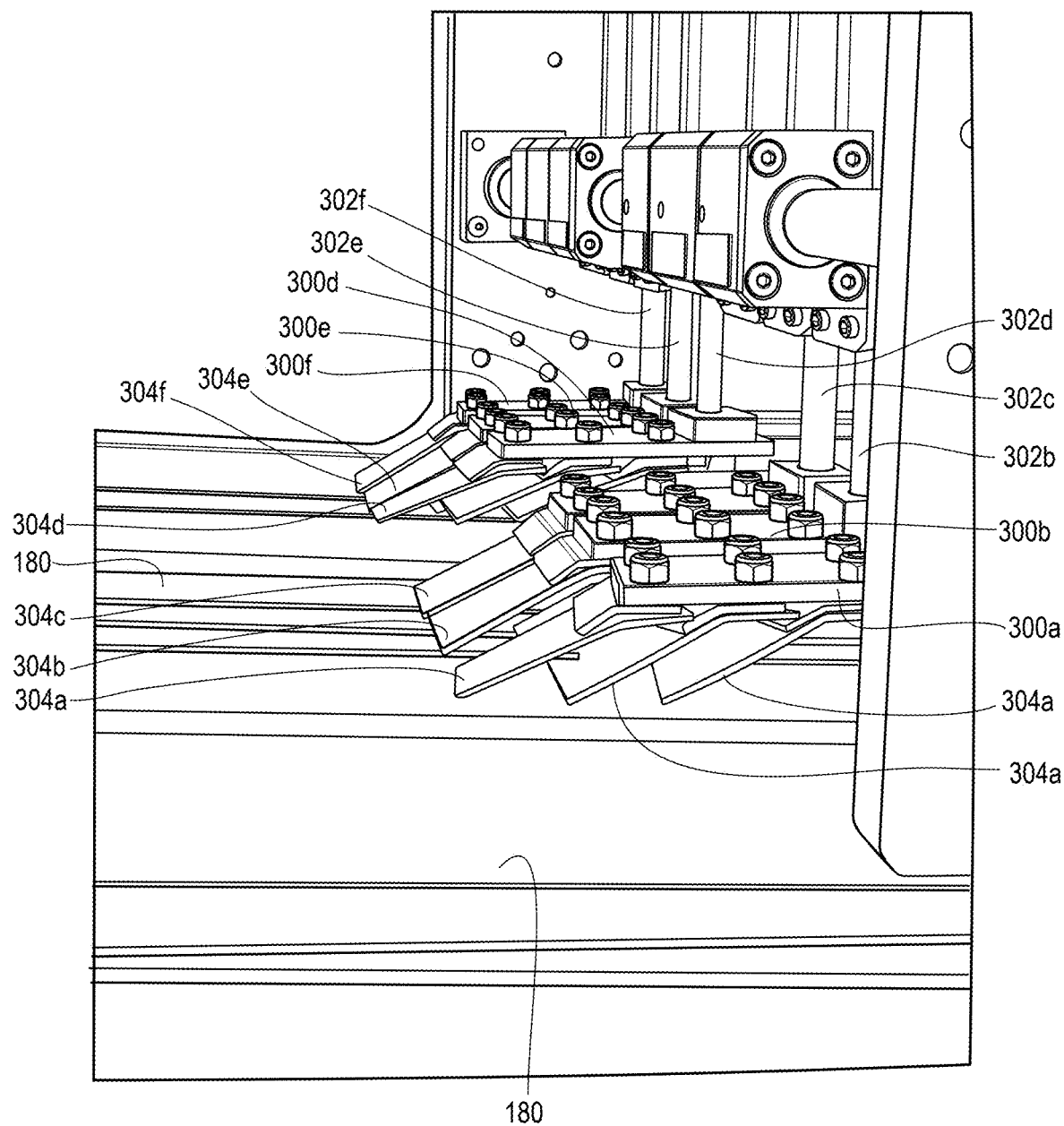
FIG. 10C shows a side view of the set of contacts of FIG. 10B.

Note that the holding mat 192 of the holding conveyor station 176 helps with preventing back pressure from hot dog buns 130 present in the area just prior to the target area from pushing hot dog buns 130 within the target area from being pushed over the gates 202. It is understood that such back pressure could result in the damage of the hot dog buns 130 present in the target area. If further control of back pressure within the area prior to the target area and the holding mat 192, hereinafter called the staging area, is desired then an additional holding structure can be introduced on and at the beginning of holding conveyor station 176. As shown in FIGS. 10B and 10C, the additional holding structure preferably is positioned over a front portion of the conveyor belt 180 of the holding conveyor station 176 while the holding mat 192 is positioned further downstream over conveyor belt 180 and prior to lane balancer station 204. Note that camera 172 can be used to determine the amount of product in the target area and the staging area by determining the total length of the product within each area using the concept of counting pixels within the areas in a manner similar to that described with respect to the lengths determined by cameras 170 and 172 on conveyor belt 150 as described previously. In particular, when camera 172 and PLC 174 determine a total length of product in one of the lanes of the target area that indicates the lane is filled with the product, the holding mat 192 is lowered or retained at a lowered position so that no product can enter the target area from the staging area. When all lanes within the target area are not completely filled as determined by camera 172 and PLC 174, then the holding mat 192 is raised or retained in a raised position so as to allow product to enter the target area. In a similar manner, when camera 172 and PLC 174 determine a total length of product in a particular one of the lanes of the staging area is above a threshold length indicating that undesirable back pressure will be experienced in the particular lane, the additional holding structure associated with the particular lane is lowered and contacts product in the particular lane so that no further product can enter the particular lane. When the measured length in the particular lane is below the threshold length, the additional holding structure associated with the particular lane is raised or retained in a raised position so that product can enter the particular lane of the staging area. When all lanes within the target area are not completely filled as determined by camera 172 and PLC 174, then the holding mat 192 is raised or retained in a raised position so as to allow product to enter the target area. The additional holding structure may have a similar structure as holding mat 192 in that is supported above the lanes of the bun feed grouper station 146 by a rotatable shaft, like shaft 194. The holding structure can include a mat that is folded on itself in a manner similar to mat 196 and its attachment to bolts 198 of metal flange 200. As described, the holding mat 192 and the additional holding structure are operated independent from one another so that they are not in unison. Note that when the target area has a length of approximately 18.5 inches, the threshold length for a lane containing the food products individual hot dog buns, clusters of four hot dog buns, individual hamburger buns, or clusters of four hamburger buns is such that two to three of such food products are near, but don't exceed the threshold.

There are various alternative embodiments for the holding mat 192 and the additional structure. For example, the single piece mat 196 can be replaced with multiple mats, such as ten mats that are spaced from one another along the shaft 194, wherein each mat is folded upon each other like mat 196 and attached to the flange 200 via a bolt 198. The individual mats are made of the same material as the mat 196.

The additional structure can be made of multiple holding structures 300a-f as shown in FIGS. 10A and 10B that are aligned with each other along the width of the conveyor belt 180. Each holding structure 300a-f can go up and down independently with respect to each other via rods 302a-f that are attached to each holding structure 300a-f, respectively, and are controlled by the PLC 174 (not shown). Each holding structure 300a-f is positioned over a lane upon which food will pass. Each holding structure 300a-f has at least one set of angled contacts 304a-f that jut downward from a base of the holding structure and toward the downstream direction of the conveyor belt 150. Each of the angled contacts has an identical rectangular shape, made of the same material, such as flexible sanitary plastic, and are aligned with each other along the direction of travel of the conveyor belt 150. There are three contacts in each set of contacts and each contact is spaced from an adjacent contact by approximately 1 inch. An example of a set of contacts is shown in FIGS. 10B and 10C. In this example, each holding structure is can go to a down position to contact a hot dog bun 130 or can go to an up position where a hot dog bun 130 can pass the holding structure. In the manner described previously, a holding structure associated with a particular lane of the staging area goes to a down position when the threshold length has been reached or surpassed and to an up position when the total length is below the threshold length.

For the sets of hot dog buns 130 that are at the lane balancer station 204 and within the gap between the left guides 158 and 210, the central guides 160 and 212, and the right guides 162 and 214, the sets of hot dog buns 130 designated as being unacceptable for packaging are removed by the lane balancer station 204. In particular, the paddles 216 of the lane balancer station 204 are moved quickly to the right so that the unacceptable sets of hot dog buns 130 located between paddles 216 are moved out of the lane and the machine and into a storage bin (not shown) for reuse and/or a refuse/trash bin.

After the sets of hot dog buns 130 are removed from the lane and the conveyor belt 208, the next sets of hot dog buns 130 enter the lane balancer station 204 for rebalancing as mentioned previously. After being processed by the lane balancer station 204, the sets of hot dog buns 130 are delivered to the turning station 226. As shown in FIG. 14, the turning station 226 includes a conveyor belt 228 similar to conveyor belt 180 described previously. The entire length of the conveyor belt 228 has the left metal guides 210a-c, the central metal guides 212a-c, and the right metal guides 214a-c positioned above the top surface of the conveyor belt 228 so as to define left and right lanes. For each lane, a turner 230 is positioned above the conveyor belt 228. As shown in FIG. 14, each turner 230 has a motor 232 which rotates a spindle (not shown) that is attached to an engager 234. As shown in FIG. 14, the engager 234 has an inverted U-shaped that has three walls, a rectangular-like left side wall 235, a rectangular-like right-side wall 237 parallel to the left side wall 235, and a rectangular-like rear wall 239 that is integrally attached to the left side wall 235 and right-side wall 237. All three walls 235, 237, and 239 are attached to a top piece 241. As shown in FIG. 14, the free ends of the left side wall 235, right-side wall 237 and the top piece 241 are flayed outwards. Each engager 234 defines a cavity that is sized so that a set of hot dog buns 130 is received therein and is engaged by the left side wall 235 and the right-side wall 237.

Figure 14A:
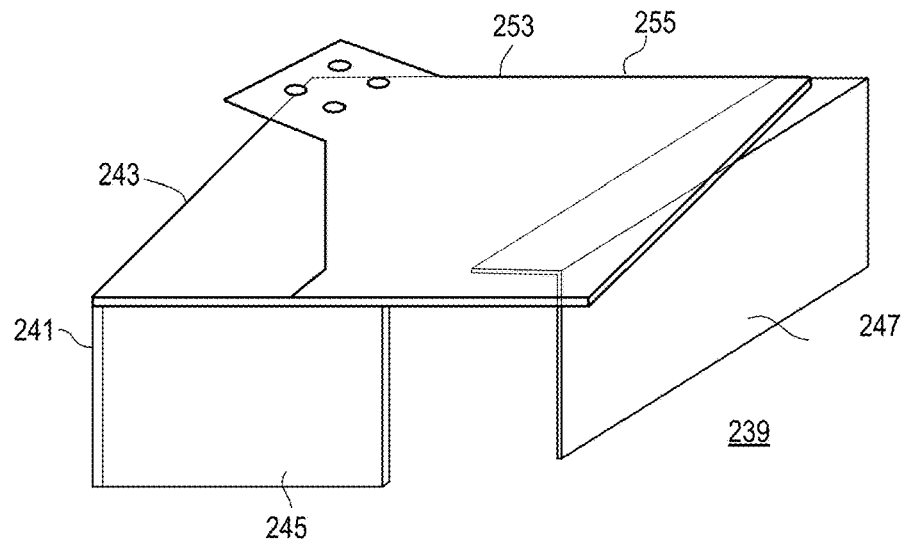
FIG. 14A shows a perspective and schematic view of an embodiment of an engager to be used with the turning station of FIG. 3.
Figure 14B:
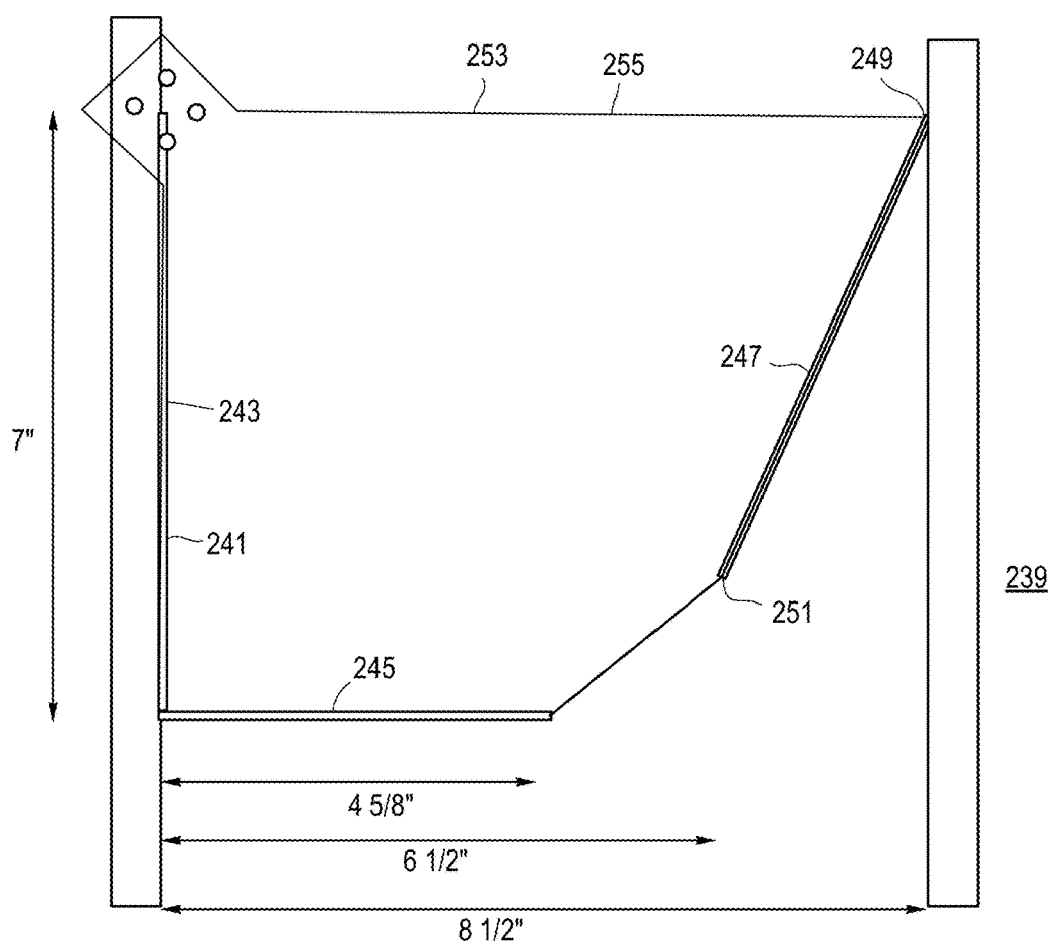
FIG. 14B shows a top view of the engager of FIG. 14A.

An alternative shape for an engager 239 to be attached to the spindle of the turner 230 is shown in FIGS. 14A and 14B. The engager shown has an L-shaped metal piece 241 that define a side wall 243 with a length of approximately 7 inches and a rear wall 245 with a length of approximately 4⅝ inches. The engager includes a metal side wall 247 that has one end 249 positioned 8.5 inches from the side wall 243 and another end 251 positioned 6.5 inches from the side wall 243. The angle of side wall 247 helps to begin rotating the set of hot dog buns 130 as it hits the side wall 247 and aligns with it. The metal piece 241 and the side wall 247 are attached to a top plate 253 so as to define a cavity and an opening 255 that receives the food product from the lane balancer station 204. The metal piece 241 and the side wall 247 have a height of approximately 3 inches. The top plate 253 is attached to the spindle.

Figure 14C:
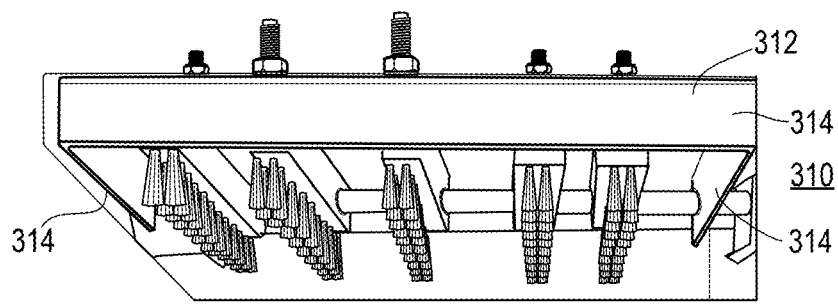
FIG. 14C shows a perspective view of another embodiment of an engager to be used with the turning station of FIG. 3.
Figure 14D:
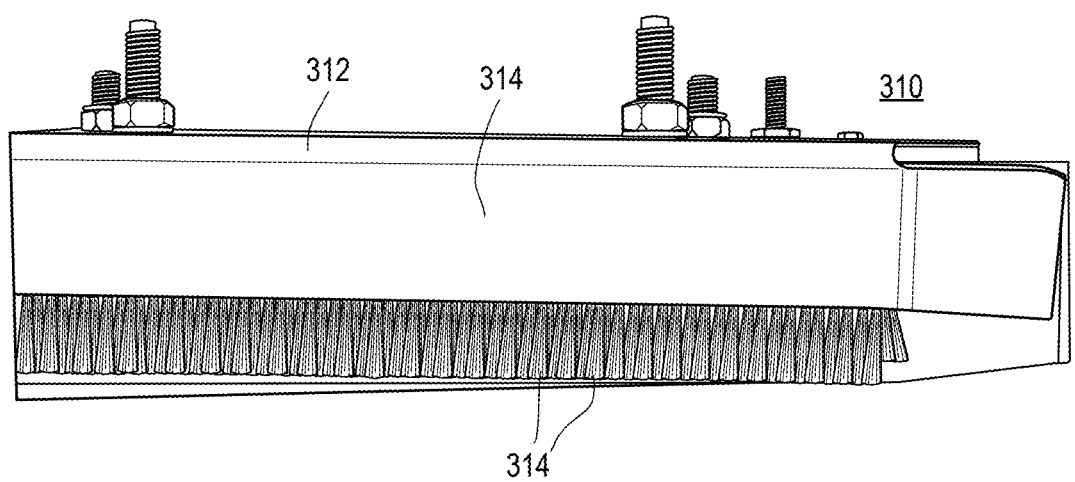
FIG. 14D shows a side view of the engager of FIG. 14C.

An alternative shape for an engager to be attached to the spindle of the turner 230 is shown in FIGS. 14C and 14D. The engager 310 has a square or rectangular base 312 that has a rectangular downward pointing wall 314 that encompasses the perimeter of the base 312. The wall has a height of approximately 5 inches. Mounted to the bottom of the base 282 is a 5 by 20 or 6 by 20 grid of equally spaced clusters of bristles 314. Each bristle is made of FDA approved nylon having a depth of one inch. In operation, when the engager 310 is moved down the clusters of bristles 314 engage the exterior of the hot dog buns 130 so that the hot dog buns 130 rotate in unison with the spindle of the turner 230 and so that there will be little, if any damage, to the hot dog buns 130 during the turning process.

In operation, the conveyor belt 228 moves the sets of hot dog buns 130 in the lanes to be underneath the cavity of the engager corresponding to the lane and then stops. At this position, the PLC 174 determines whether any of the set of hot dog buns 130 underneath the engagers were previously designated as not being properly oriented. For a set of hot dog buns 130 so designated, the corresponding engager are rotated from their initial position shown in FIG. 12 and lowered to engage the set of the hot dog buns 130 so that hot dog buns 130 are placed in the cavity of the engager and longitudinal ends of the hot dog buns are visible from a front opening of the engager. Upon engagement, the engager is rotated to the θ=0° position shown in FIG. 12 and defined in FIG. 2. Thus, the set of hot dog buns 130 are properly oriented. Once the set of hot dog buns 130 is properly oriented, the engager is raised to its initial position. Note that the conveyor belt 228 is moving at a constant speed during the entire process of delivering the buns to the turning station 226, moving the buns into the cavities of the engagers and having the engagers orient and disengage the buns. After proper orientation at the turning station 226 is achieved for the set(s) of hot dog buns 130, the conveyor belt 228 is activated and moves the set(s) of hot dog buns 130 to a flipping station 236. Note that the conveyor belt 228 is moving at all times and can be accelerated or decelerated depending on the food item being processed in the turning station 226.

Figure 15A:
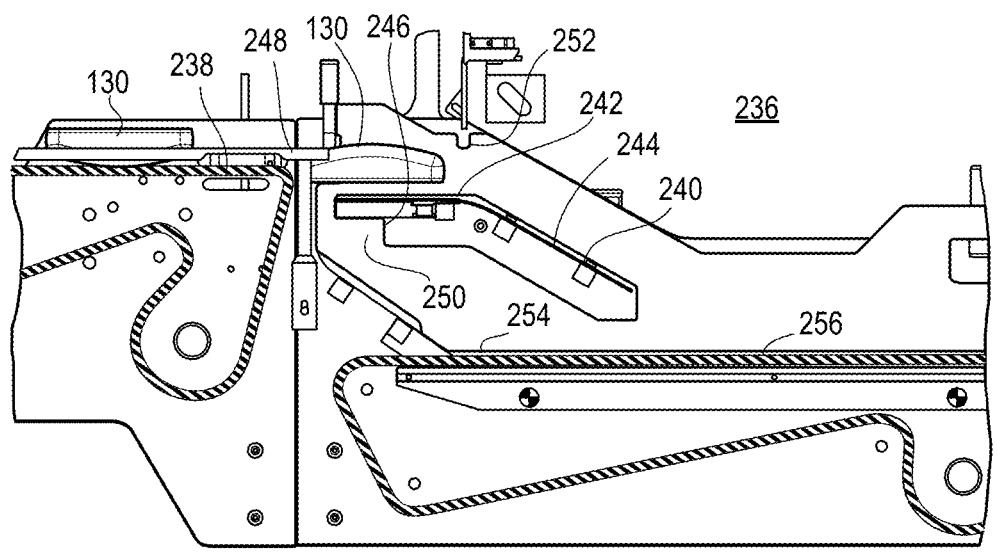
FIG. 15A schematically shows a cross-sectional view of a flipping station of the delivery system of FIG. 3 while performing a first operation.
Figure 15B:
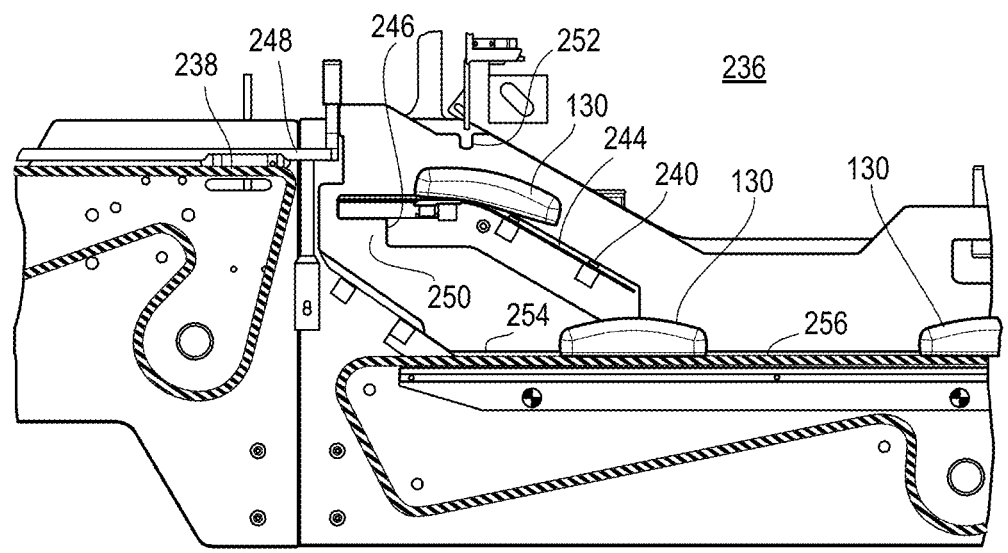
FIG. 15B schematically shows a cross-sectional view of the flipping station of FIG.-15A while performing a second operation.

As shown in FIGS. 15 and 15A-C, the flipping station 236 includes a conveyor belt 238 that defines a moving surface to receive the sets of hot dog buns 130 from conveyor belt 228. As shown in FIGS. 4 and 15A-C, each lane includes a ramp 240 that has a flat landing area 242 and a slanted sliding surface 244. The landing area 242 has a length that is at least one half the length of a set of hot dog buns 130, and the sliding surface 244 has a length of approximately 10 to 12 inches and is angled approximately 30 to 40 degrees relative to the landing area 242. The landing area 242 is parallel to the moving surface of the conveyor belt 238 and is located approximately 1 to 1.5 inches below the moving surface of the conveyor belt 238. The free end 246 of the landing area 242 is spaced from the front end 248 of the conveyor belt 238 by approximately 3.5 inches for a set of hot dog buns 130. Thus, the ramp 240 is spaced from the moving surface of the conveyor belt 238 so that a gap 250 is defined between the moving surface and the ramp 240. The ramp 240 is adjustable in that it moves laterally via a servo motor (not shown) and thus the size of the gap 250 is adjustable. The size of the gap 250 is dependent on the lengths of the food item being flipped and adjusted so that when the food item is contacted by a pin 250 to be described hereafter, the center of mass of the food item is positioned over the gap 250. In other words, the size of the gap is slightly less than one half of the length of the food item processed by the flipping station 236. As shown in FIGS. 15A-B, the moving surface of the conveyor belt 238 is moving at a sufficient speed so that a food item, such as a set of hot dog buns 130, travels past the gap 250 and lands on the landing area 242 of the ramp 240.

Figure 15C:
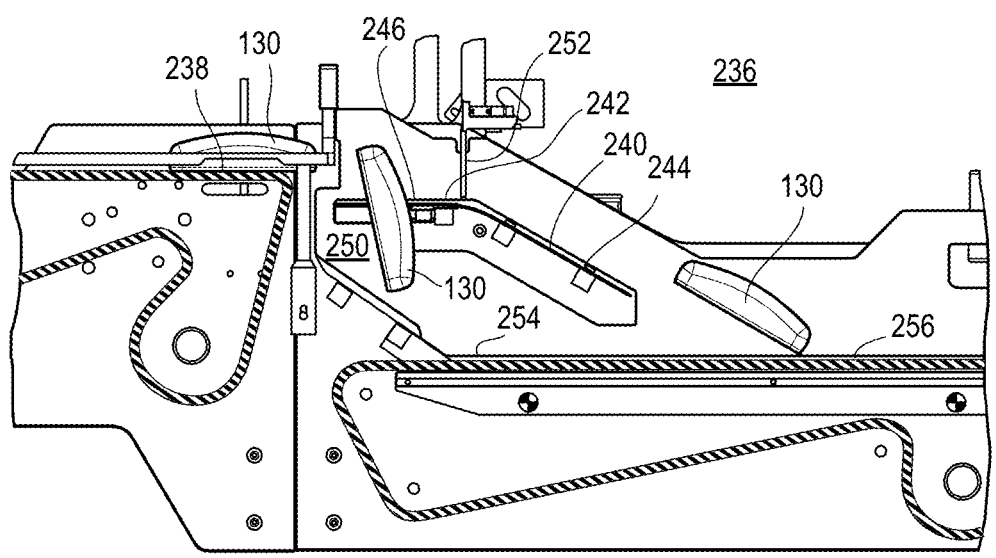
FIG. 15C schematically shows a cross-sectional view of the flipping station of FIG. 15A while performing a third operation.

As shown in FIG. 15C, when a set of hot dog buns 130 has previously been identified as being upside down is moving towards the gap 250, a contact surface of a pin 252 that is positioned past the gap 250 at a contact position and is positioned above the ramp 240 so that the upside-down set of hot dog buns 130 is deflected backwards into the gap 250 and the upside-down set of hot dog buns 130 rotates 180° from the moment of contact with the pin 252 to when it lands right-side up on a landing surface 254 of a conveyor belt 256 located below the ramp 240.

When a set of hot dog buns 130 has previously been identified as right-side up and is food item is present on the conveyor belt 238 and is moving toward the gap 250, pin 252 will be moved or remain at an up position shown in FIGS. 15A and 15B. The right-side up set of hot dog buns 230 travels over the gap 250 and lands on the landing area 242 and then slides down the sliding surface 244 and drops onto the landing surface 254 of conveyor belt 256 and lands so as to remain in the right-side up position. The angle of the sliding surface 244 is chosen so that the food item does not flip over when it is deposited on the landing surface 254.

After being processed by the flipping station, the sets of hot dog buns 130 are moved to conveyor belt 222 (see right portion of the top view of FIG. 5 as shown in FIG. 5I), which feeds the sets of hot dog buns to a bagger 258. Note that at the beginning of the conveyor belt 222, a holding mat (not shown) like the holding mat 192 of the holding conveyor station 176 can be positioned over and across the width of the conveyor belt 222 to help reduce back pressure for hot dog buns 130 further down on the conveyor belt 222. Furthermore, metal gates (not shown) can be placed after the holding mat of the conveyor belt 222 and across the width of the conveyor belt 222 and aligned with the lanes of the conveyor belt 222 to provide further reduction in back pressure. The metal gates can pivot in unison upwards to allow hot dog buns 130 to pass or can pivot downwards to block the hot dog buns 130 from passing.

As shown in FIG. 5I, there is a digital camera 220 that is similar to cameras 170 and 172 and which is positioned over the conveyor belt 222 of a downstream exit conveyor grouper station 224. The conveyor belt 222 is similar in structure to conveyor belt 108 discussed previously. The camera 220 takes a digital image of the sets of hot dog buns 130 on a top surface of the conveyor belt 222. Note that camera 220 can be replaced with at least 15 high resolution, high accuracy, high speed photo eyes or photoelectric sensors that are aligned with one another across the width of the conveyor belt 222. In addition, the photo eyes or photoelectric sensors can be used in conjunction with the camera 220. The digital image from the camera 220 and/or the readings from the photo eyes or photoelectric sensors are sent to the PLC 174, which identifies each set of hot dogs 130 previously given a unique identifier and so the camera and the sensors are used for detecting presence of the hot dogs 130. The PLC 174 operates a holding mat (not shown) that is similar to holding mat 192 previously described. The PLC 174 is programed to allow every two consecutive sets of hot dog buns 130 to pass past the holding mat and then lower the holding mat. After the two consecutive sets of hot dog buns 130 are a certain distance past the holding mat, the holding mat is raised so that two more consecutive sets of hot dog buns 130 pass past the holding mat and the process is repeated. Each grouping of two consecutive sets of hot dog buns 130 are then packaged in a common bag by the bagger 258. If a different number of food items are to be packaged in a common bag, the timing of the raising and lowering of the holding mat can be adjusted.

Figure 16A:
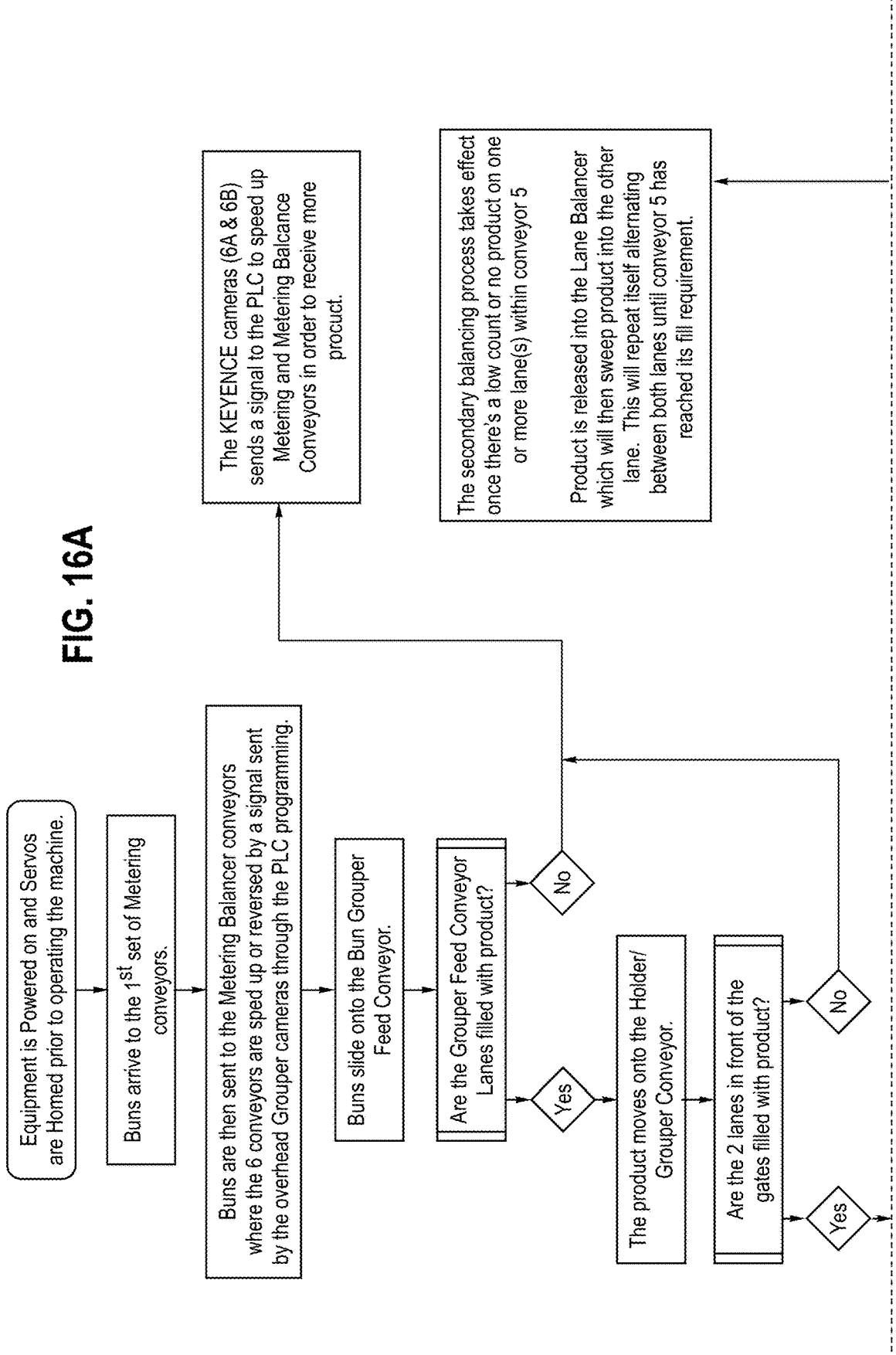
FIG. 16A shows a left portion of the flow chart of FIG. 16.
Figure 16B:
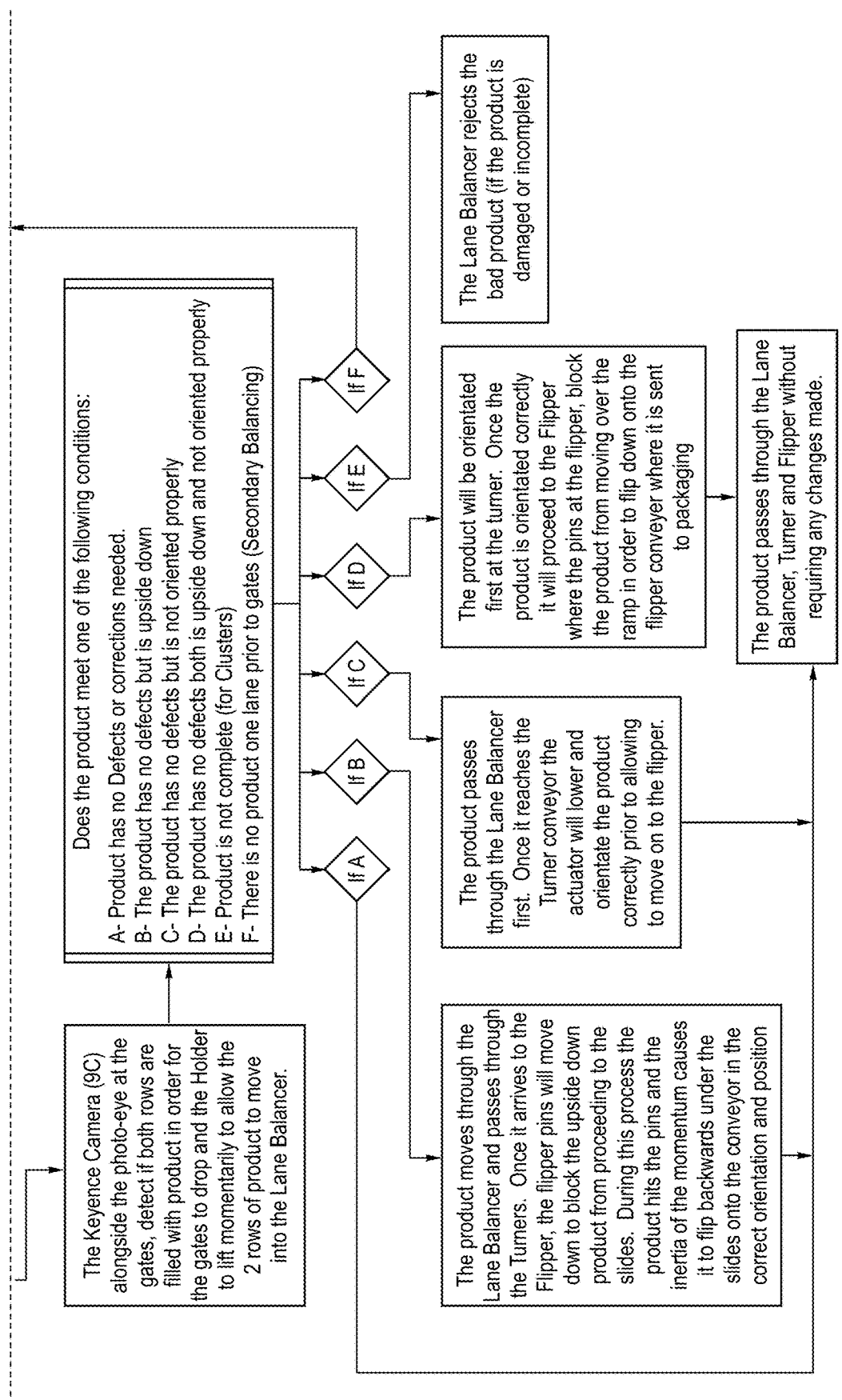
FIG. 16B shows a right portion of the flow chart of FIG. 16.

The above processes for delivering the set of hot dog buns 130 is summarized in the flow chart of FIGS. 16 and 16A-B. After the appropriate adjustments made regarding lane configurations, conveyor speeds, paddle positioning, ramp angles, and type of food, thee above processes can be applied to other foods, such as 1) single hot dog buns, 2) other types of sets of hot dog buns having 2, 3, 5, etc. buns in a set., 3) single hamburger buns, and 4) sets of hamburger buns having 2, 3, 4, etc. buns in a set. The one caveat to the above statement is that in the case of single hamburger buns the angular orientation processes and the turning station 226 do not need to be implemented due to the symmetric circular shape of a single hamburger bun. As explained previously, singular hot dog buns and 2×2, 3×3, etc. sets of hot dog buns and hamburger buns do not need to be turned in the turning station 226.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

We claim:
1. A delivery system comprising:
   a surface comprising a surface upon which a food item is placed;
   an array of sensors positioned above the surface and which takes multiple readings of the food item on the surface; and
   a processor that analyzes the multiple readings and generates a height profile for the food item and determines a characteristic of the food item based on the height profile, wherein the characteristic is selected from the group consisting of 1) whether the food item is right side up or upside down, 2) whether the food item is misoriented; 3) whether the food item is missing a portion of food; and 4) whether the food item is damaged.

2. The delivery system of claim 1, wherein the characteristic is whether the food item is right side up or upside down, wherein the delivery system further comprises a flipper station that receives the food item determined to be upside down and manipulates the received food item to be right-side up.

3. The delivery system of claim 2, wherein the flipper station defines a gap that the upside-down food item flies over to be contacted by a contact surface, which cause the food item to land right-side up.

4. The delivery system of claim 3, wherein the contact surface is movable from a first position wherein the food item flying over the gap does not contact to a second position wherein the food item flying over the gap contacts the food item.

5. The delivery system of claim 4, wherein the contact surface comprises pins.

6. The delivery system of claim 3, where a size of the gap is adjustable.

7. The delivery system of claim 1, wherein the food item is selected from the group consisting of a hot dog bun, a hamburger bun, a cluster of hot dog buns, and a cluster of hamburger buns.

8. The delivery system of claim 7, further comprising a bagger that receives the food item and packages the food item in a bag.

9. The delivery system of claim 1, wherein the characteristic is whether the food item is misoriented, wherein the delivery system further comprises a turning station that receives the food item determined to be misoriented and rotates the food item to be properly oriented.

10. The delivery system of claim 9, wherein the turning station comprises an engager that rotates and comprises bristles that engage the food item during rotation.

11. A method of delivery comprising:
    placing a food item on a surface;
    taking multiple readings of the food item on the surface;
    analyzing the multiple readings and generating a height profile for the food item and determining a characteristic of the food item based on the height profile, wherein the characteristic is selected from the group consisting of 1) whether the food item is right side up or upside down, 2) whether the food item is misoriented; 3) whether the food item is missing a portion of food; and 4) whether the food item is damaged.

12. The method of claim 11, for the characteristic being whether the food item is right side up or upside down, when the food item is determined to be upside down, causing the food item to fly in the air and to land right-side up.

13. The method of claim 12, comprising causing the food item flying in the air to contact a contact surface that results in the food item to land right-side up.

14. The method of claim 11, wherein the food item is selected from the group consisting of a hot dog bun, a hamburger bun, a cluster of hot dog buns, or a cluster of hamburger buns.

15. The method of claim 14, further comprising packaging the food item in a bag.

16. The method of claim 11, wherein the characteristic is whether the food item is misoriented, wherein the method comprises rotating the food item determined to be misoriented until the food item is properly oriented.

* * * * *